March 8, 1927. 1,620,336
O. FOURNIER
STEP AND REPEAT MACHINE
Filed Sept. 2, 1924 21 Sheets-Sheet 3

Inventor:
Oscar Fournier
Wood + Wood
Attorneys

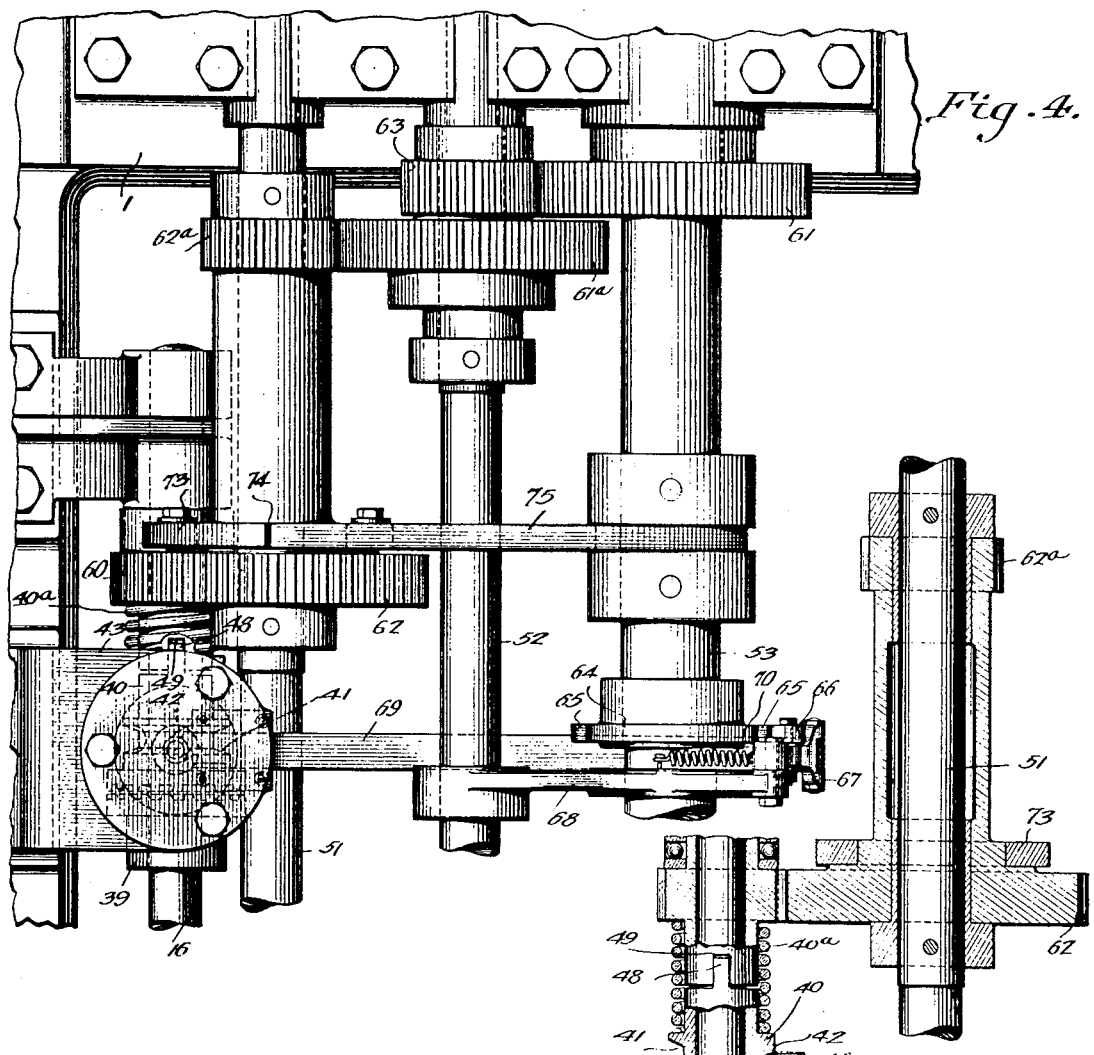
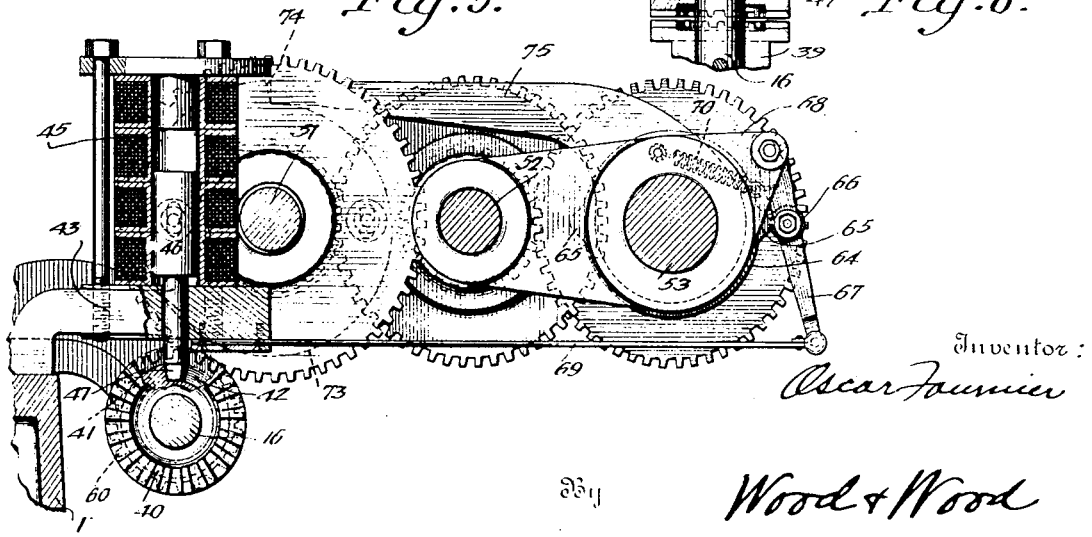

March 8, 1927.

O. FOURNIER 1,620,336

STEP AND REPEAT MACHINE

Filed Sept. 2, 1924    21 Sheets-Sheet 5

Inventor
Oscar Fournier
By Wood & Wood
Attorneys

March 8, 1927. 1,620,336
O. FOURNIER
STEP AND REPEAT MACHINE
Filed Sept. 2, 1924 21 Sheets-Sheet 7

Inventor:
Oscar Fournier
Wood + Wood
Attorneys

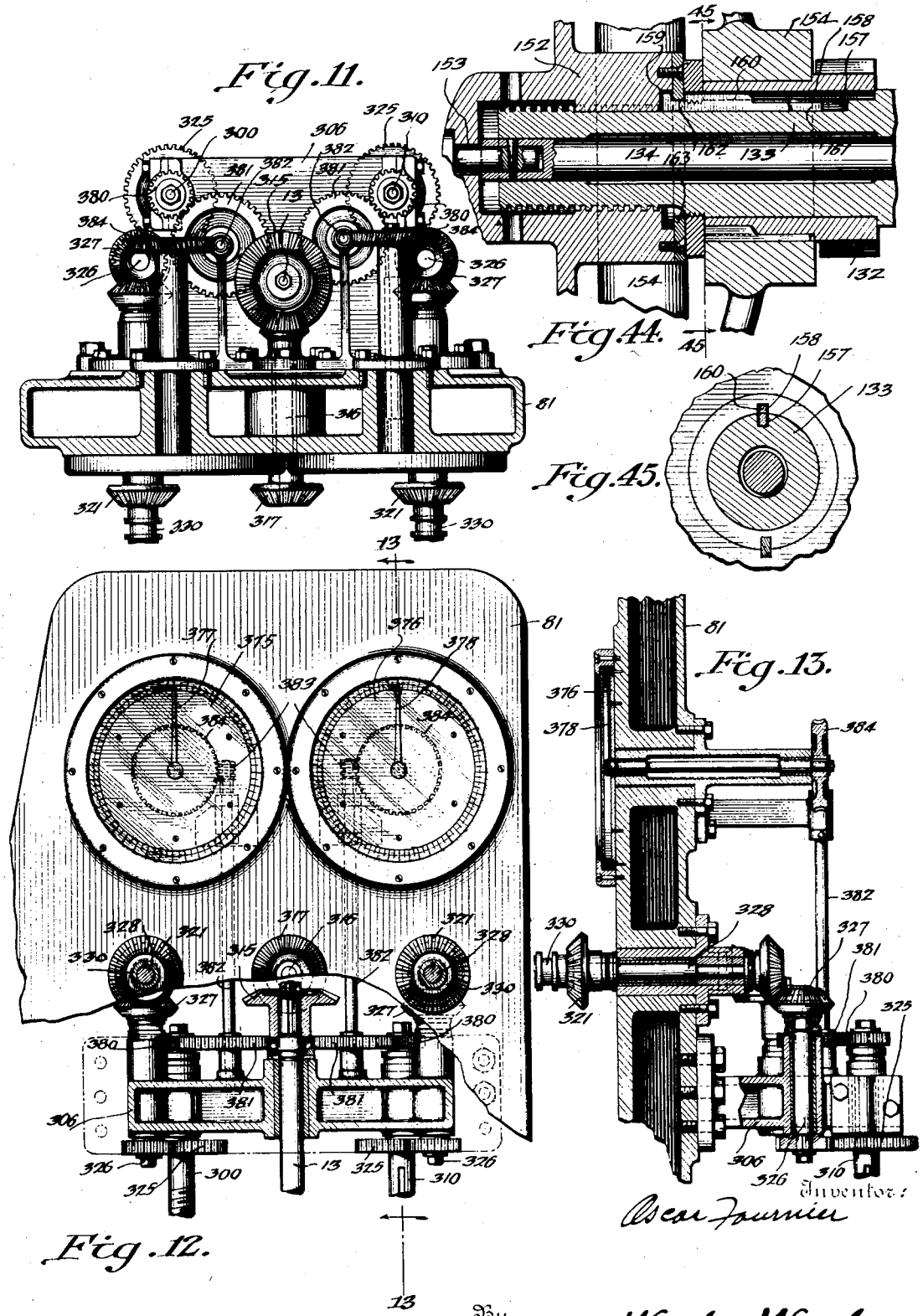

March 8, 1927.   1,620,336
O. FOURNIER
STEP AND REPEAT MACHINE
Filed Sept. 2. 1924    21 Sheets-Sheet 9

Inventor:
Oscar Fournier
By
Wood & Wood
Attorneys

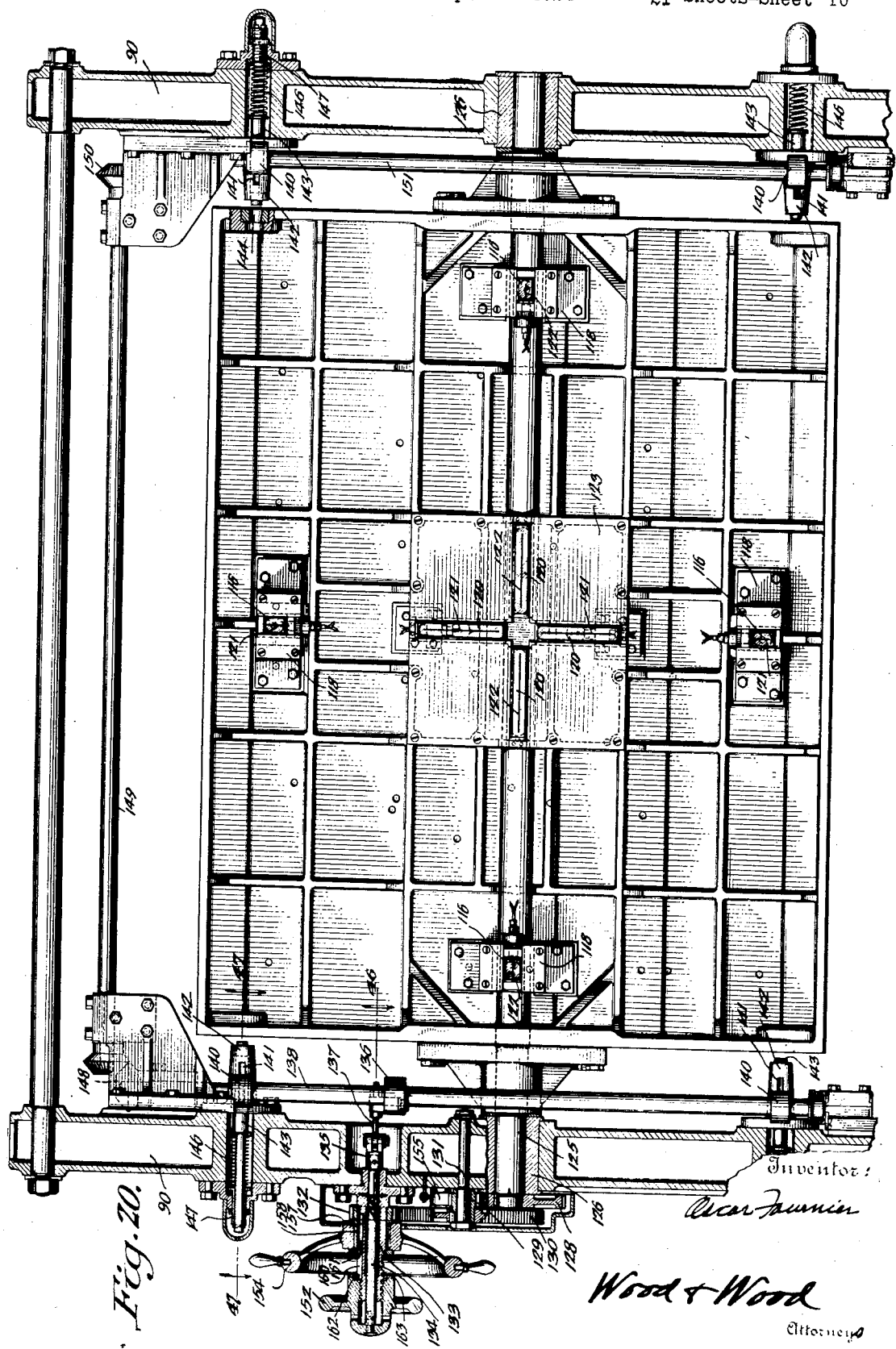

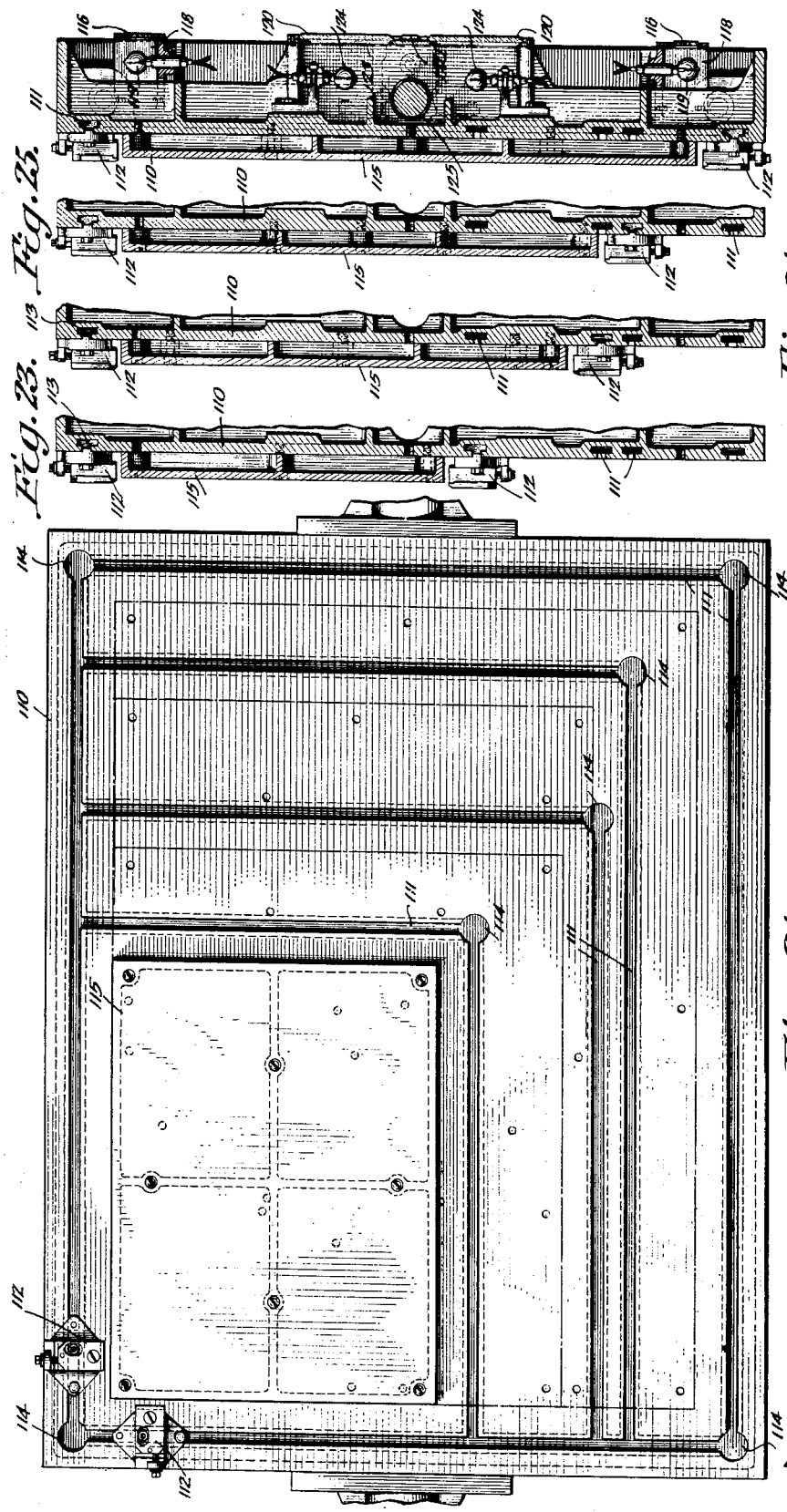

March 8, 1927. 1,620,336
O. FOURNIER
STEP AND REPEAT MACHINE
Filed Sept. 2, 1924 21 Sheets-Sheet 12
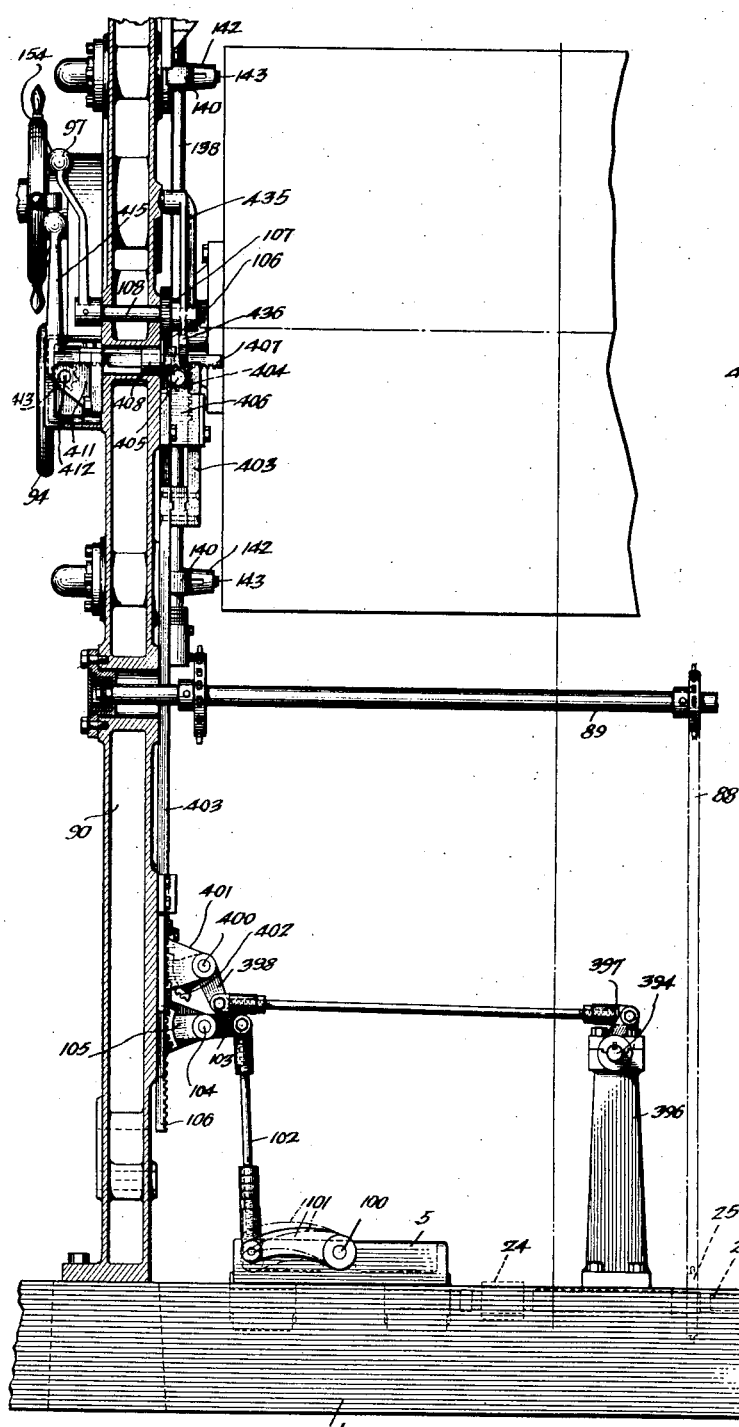
Fig. 26.
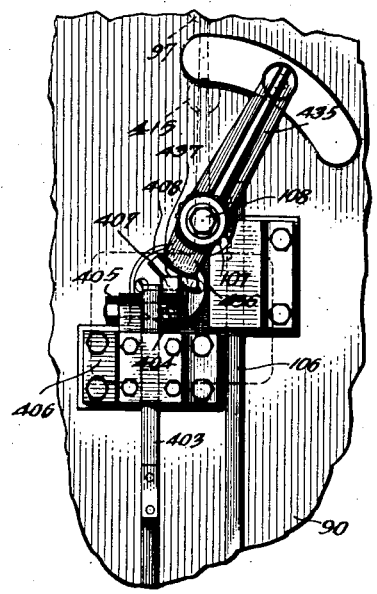
Fig. 27.
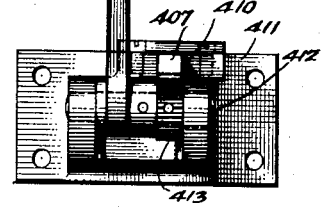
Fig. 27.ª
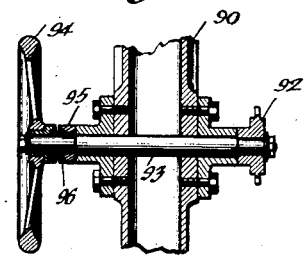
Fig. 28.
Inventor:
Oscar Fournier
By Wood + Wood
Attorneys

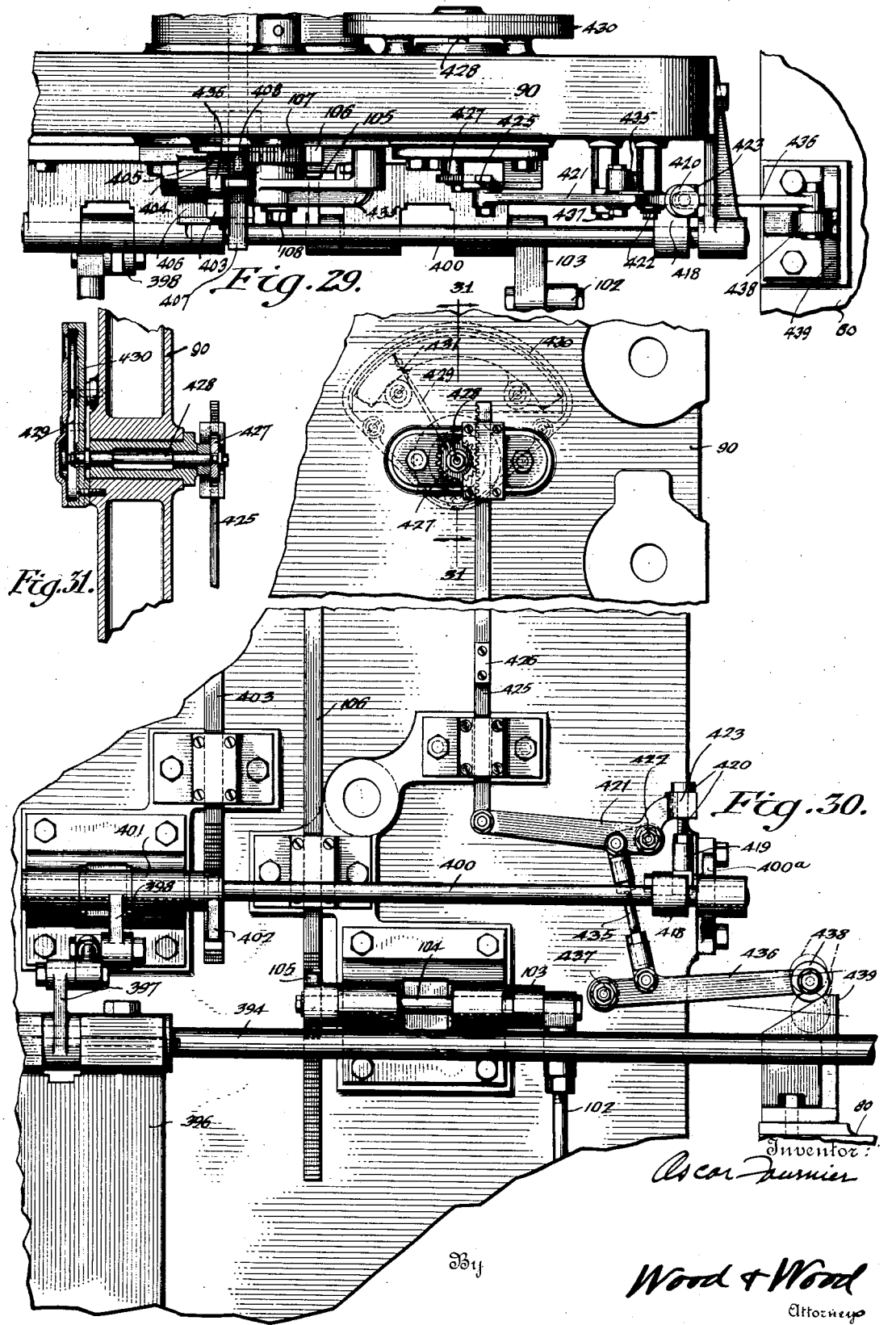

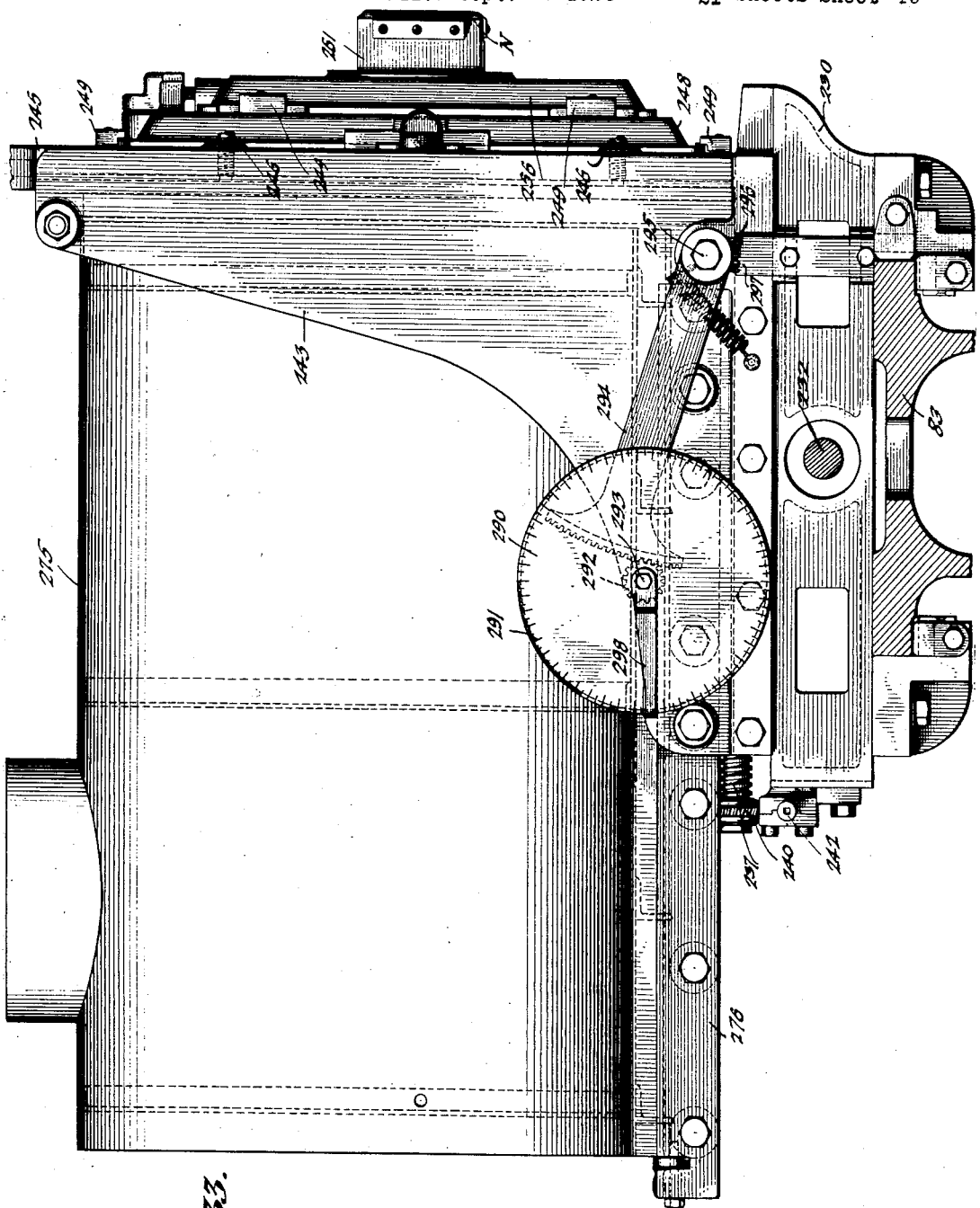

March 8, 1927. 1,620,336
O. FOURNIER
STEP AND REPEAT MACHINE
Filed Sept. 2. 1924   21 Sheets-Sheet 16
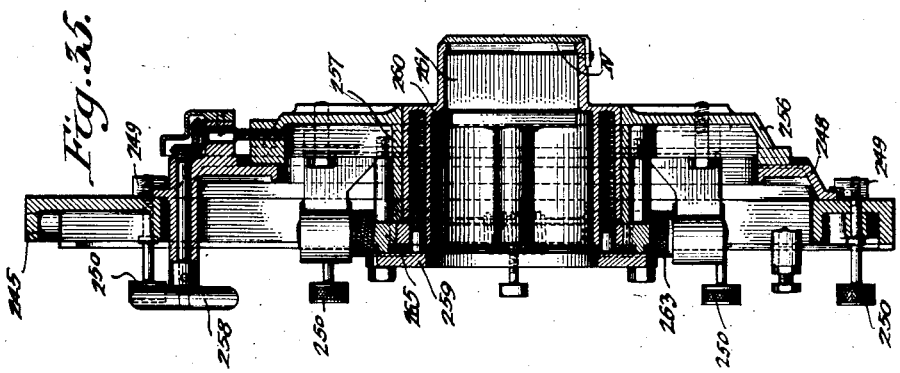
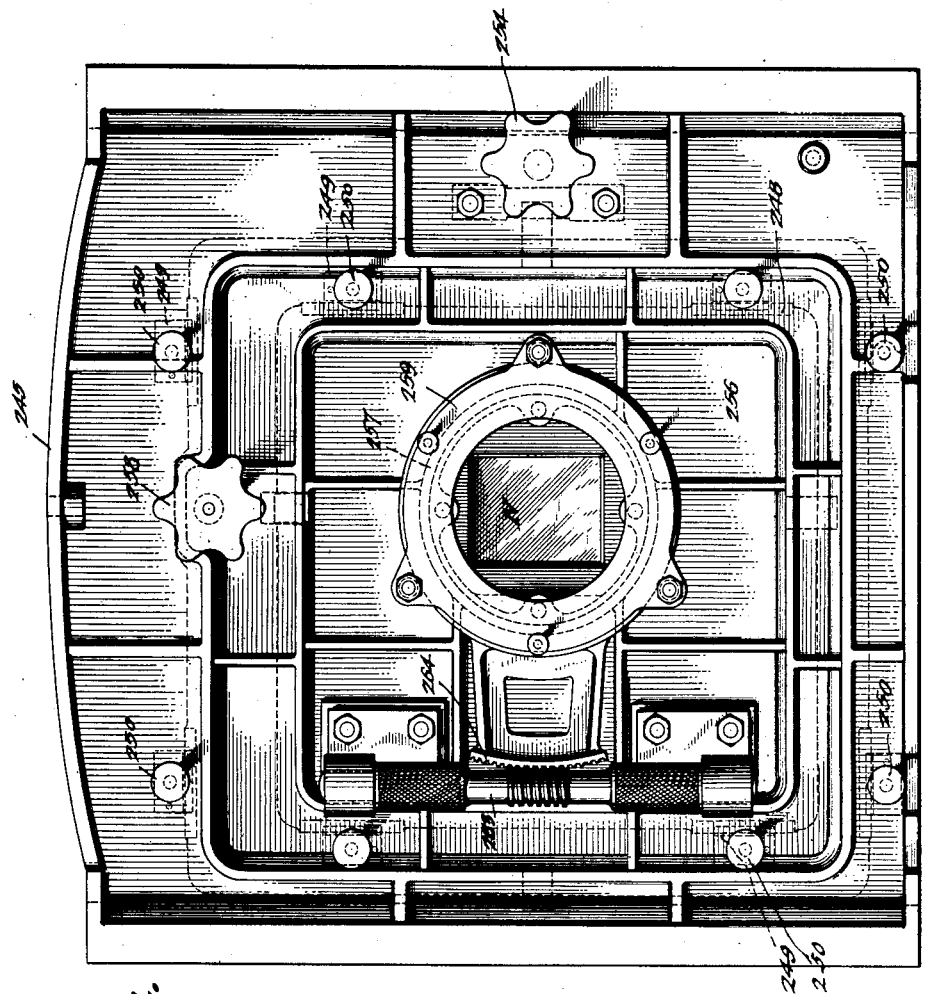

March 8, 1927. 1,620,336
O. FOURNIER
STEP AND REPEAT MACHINE
Filed Sept. 2. 1924  21 Sheets-Sheet 17
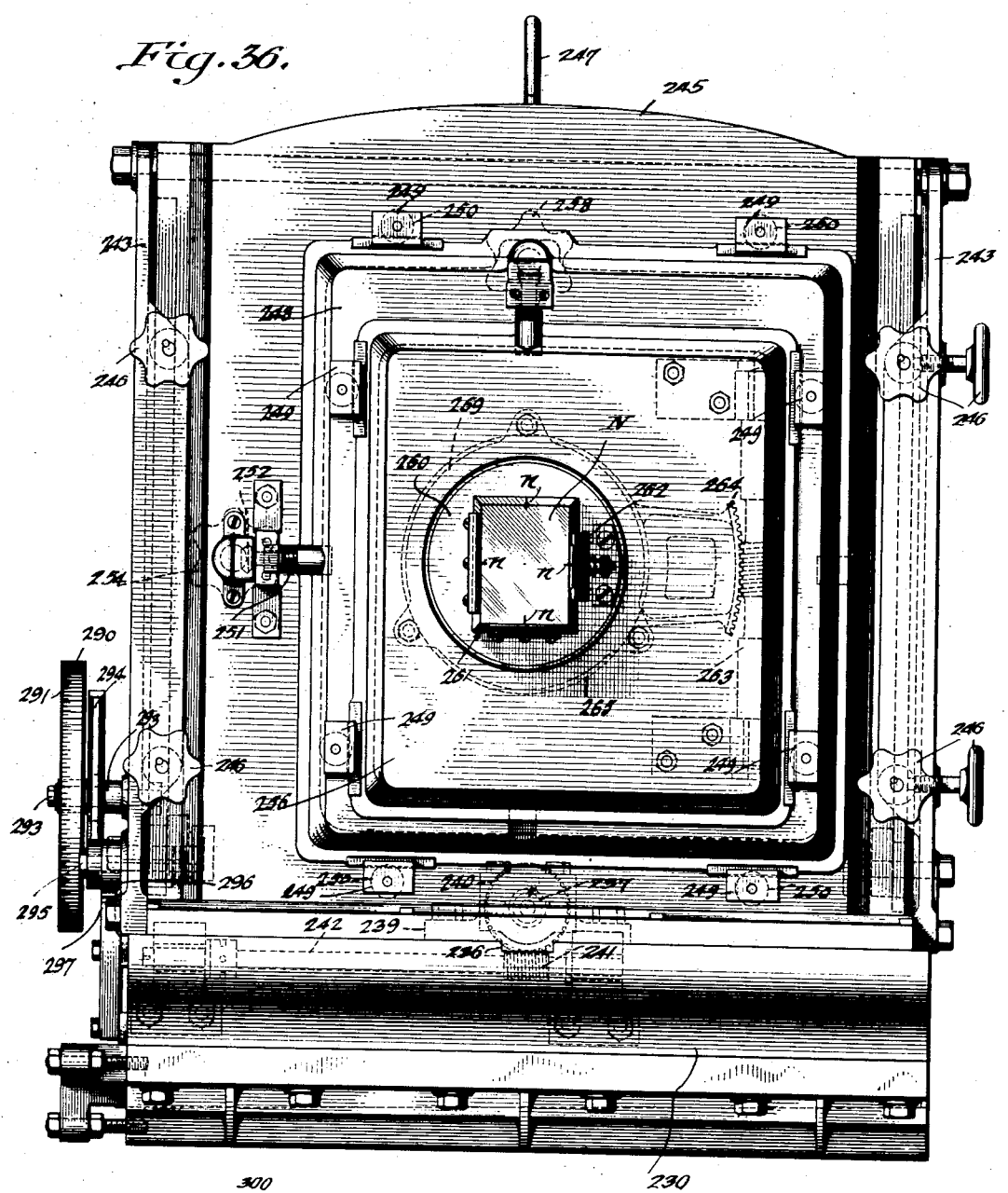

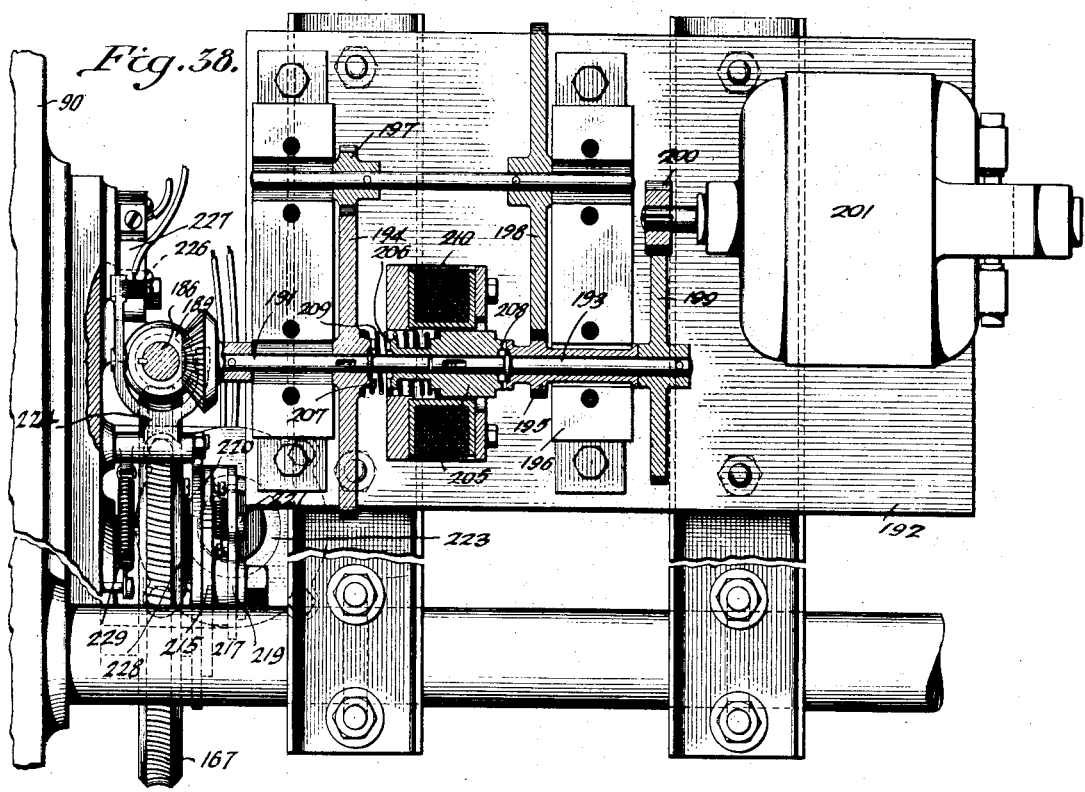
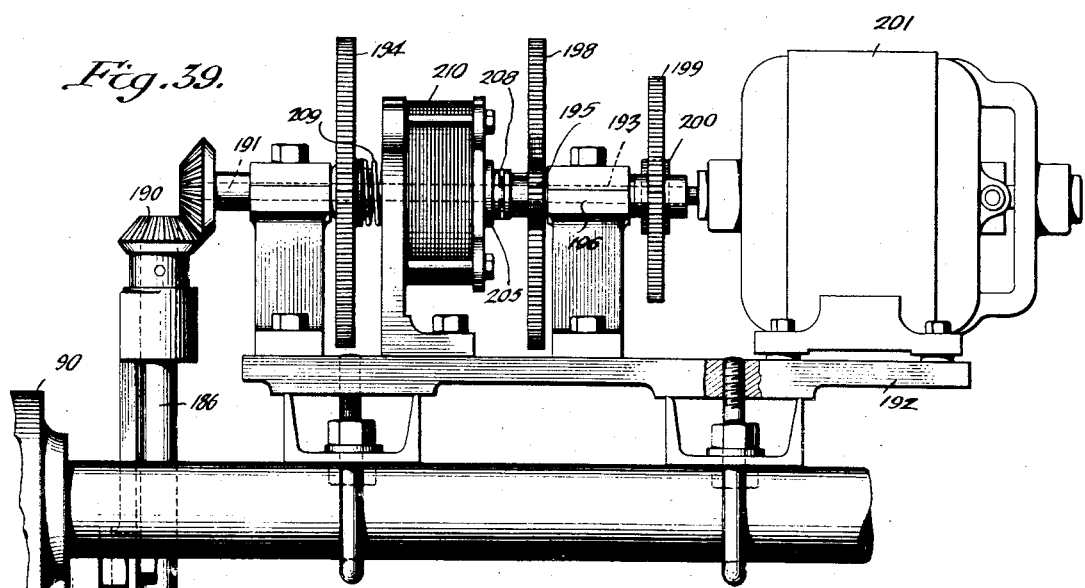

March 8, 1927. 1,620,336
O. FOURNIER
STEP AND REPEAT MACHINE
Filed Sept. 2. 1924 21 Sheets-Sheet 19
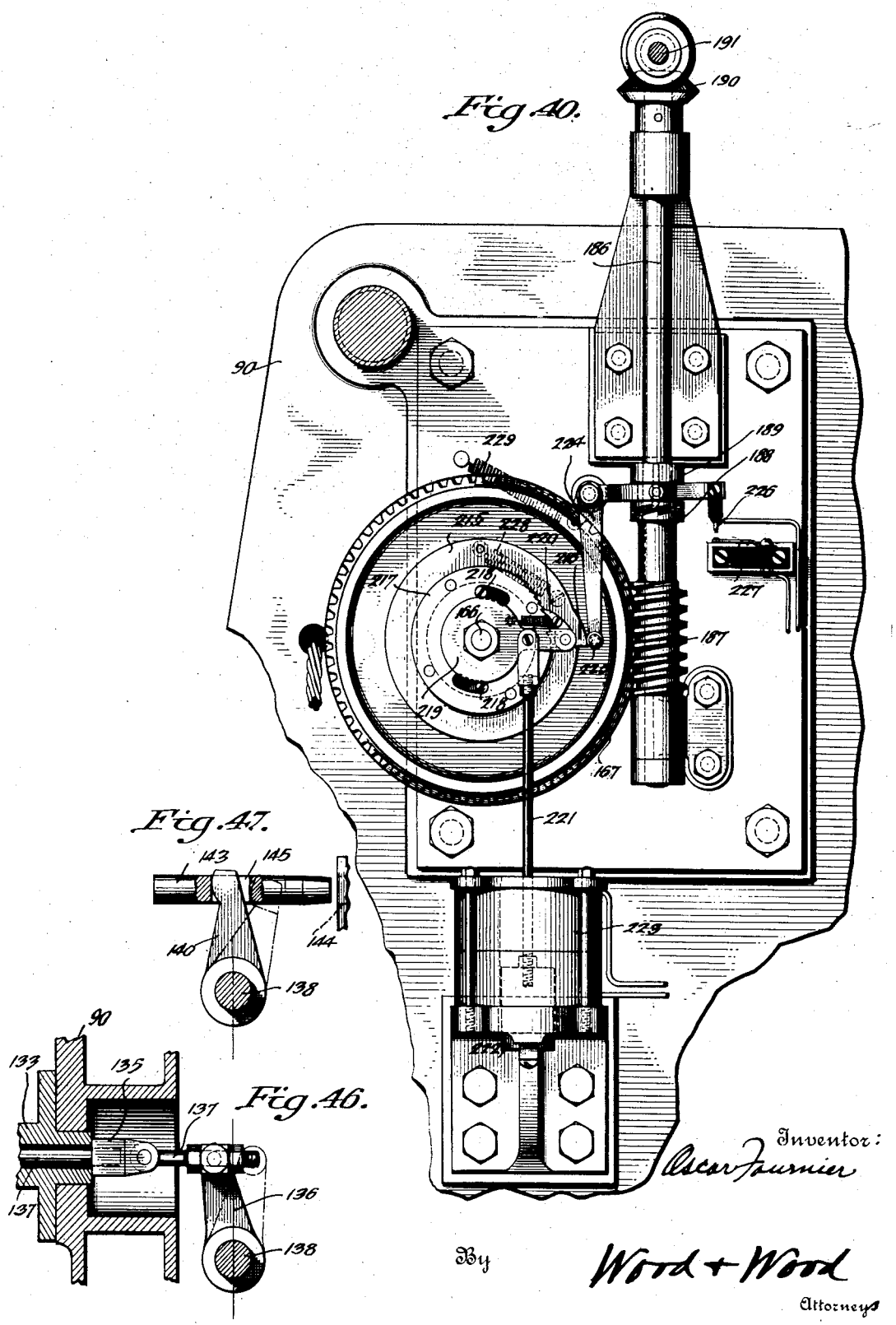

March 8, 1927. 1,620,336
O. FOURNIER
STEP AND REPEAT MACHINE
Filed Sept. 2, 1924 21 Sheets-Sheet 20
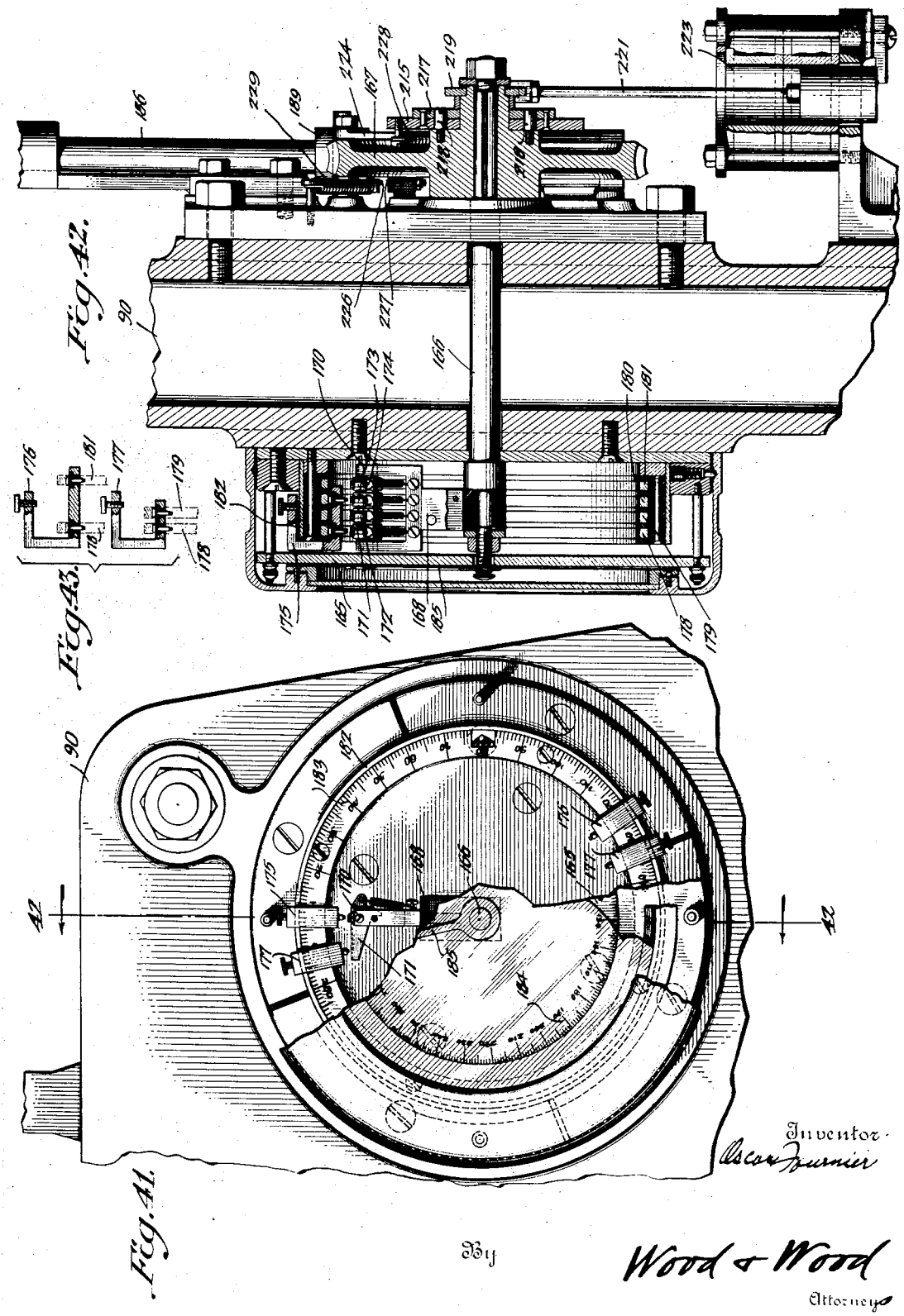

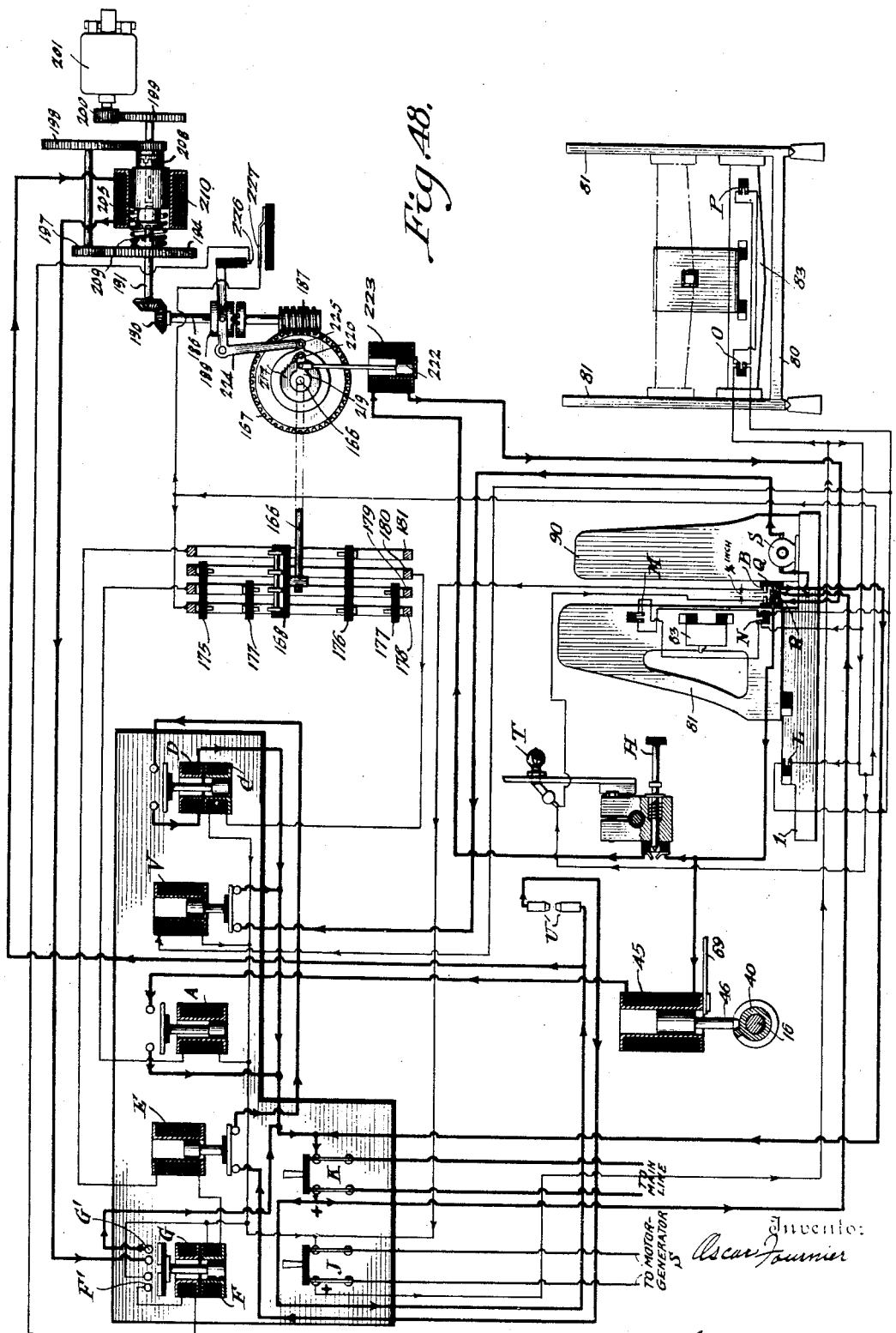

Patented Mai 8, 1927.

1,620,336

UNITED STATES PATENT OFFICE.

OSCAR FOURNIER, OF SYMMES TOWNSHIP, HAMILTON COUNTY, OHIO, ASSIGNOR TO THE UNITED STATES PLAYING CARD COMPANY, OF NORWOOD, OHIO, A CORPORATION OF OHIO.

STEP AND REPEAT MACHINE.

Application filed September 2, 1924. Serial No. 735,277.

This invention relates to the photographic art and particularly to a machine for photographically transferring images in duplicate to a sensitized plate, which plate after development is used for printing. The apparatus provides a negative carrier in the form of a translatable frame for holding a developed negative, and means for projecting light therethrough, and in addition provides means for universally micrometrically adjusting the negative relative to a stationarily supported plate having a light sensitized coating thereon, to which plate the image or images of the negative are to be photographically transferred in predetermined spaced relation.

This application includes improvements on a machine described in Patent No. 1,509,806 to Oscar Fournier for "photo-printing machine", dated September 23, 1924, and includes certain general and special features.

An object of the invention is to provide a first separate power operated mechanism by which the negative carrier frame may be translated away from and returned to a given point spaced from a stationary support upon which the sensitized plate is held, and to further provide a second power operated mechanism adapted to be coupled to the negative carrier frame at the given point for separately translating the frame away from and toward the point, between the point and the sensitized plate. For example, the negative carrier may be translated by one power operated mechanism to the point, this mechanism disconnected and the second power operated mechanism connected and the carrier further advanced beyond the point toward the sensitized plate.

Another object is to provide means for preventing operation of one of the frame translating mechanisms when the carrier is coupled to the other.

Another object provides means whereby the coupling position of the negative carrier frame is indicated to the operator so that the coupler elements may be properly engaged.

Another object of the invention is to provide electrically controlled antomatically operable timing mechanism for operating one of the frame translating mechanisms, by means of which timed relatively slow and fast motions of the movable frame in forward and reverse directions, through relatively small distances are obtained. In one of the movements the negative is brought toward and against the sensitized plate, held thereagainst during a predetermined period while the exposure is made, then returned to the initial position, spaced from the tumbler, which position corresponds to the coupling position.

Another object is to provide an improved support for holding the sensitized plate, this holder being herein designated the tumbler, said tumbler having plane parallel faces, at relatively opposite sides, means on one face for attaching a sensitized plate, and the other face provided with a series of translucent ground glasses having hair lines thereon collinearly related, comprising an arrangement of two systems lying at right angles to one another with the surfaces of all glasses and sensitized plate in parallelism, this for the purpose of centering the sensitized plate with the negative.

Another object of the invention is to provide a safety interlock for the tumbler rotating and locking means for protecting the tumbler rotating mechanism against forced operation when the tumbler mechanism is in locked position.

Another object of the invention is the provision of an electrically controlled timing starting mechanism for the purpose of tripping the timing mechanism to initiate and control short distance reverse movements of the movable frame.

Another object of the invention is the provision of an improved negative adjusting mechanism or negative holder whereby the negative may be moved in micrometric degree in three planes at right angles to each other, as well as axially rotated, all in planes parallel to that of the faces of the tumbler, and sensitized plate thereon.

Another object of the invention is the provision of improved beam and rider reversing clutch mechanisms controlled by levers, the control being so arranged that the directional swing of a given lever from normal or neutral position, will obtain corresponding movement of beam or rider to adjust the negative mounted upon the rider.

Another object of the invention is the provision of means manually operable for obtaining translation of beam and rider in reverse directions, in conjunction with clutch controlled means for obtaining corresponding movements of beam and rider by power, in addition to an interlock between said mechanisms to prevent simultaneous actuation thereof. To this end two clutches are provided, one for controlling power translation of beam and rider and the other for connecting a setting lever with respective mechanisms. The interlock is provided to prevent simultaneous operation of these clutches so that only one can be actuated at a given time.

Another object of the invention is to provide positional recording means for beam and rider whereby the exact position of either may be indicated to the operator, so that he may chart the readings for the purpose of again setting the machine at those positions when negative and sensitized plate are substituted in a subsequent operation.

Another object of the invention is to provide means for coupling and uncoupling the movable frame with its short distance translating mechanism.

Another object is to provide recording means for the coupler mechanism, including a dial and pointer operable to indicate to the attendant that the coupling mechanism is in coupling position which corresponds to an initial position of the movable frame, in which the negative carried thereby is spaced a short distance from a tumbler face.

Another object of the invention is the provision of an interlock between the movable frame clutch actuating mechanism and the frame coupling and release mechanism whereby power actuated movement of the movable frame is prevented when the same is coupled to its short movement translating mechanism.

Other objects and certain features and advantages will be disclosed in the description of the drawings forming a part of this specification, and in said drawings:

Figures 4, 5 and 6 are respectively a top plan, vertical section and diagrammatic plan of the short movement frame translating mechanism.

Figure 11 is a plan section of the positional recording mechanism for beam and negative.

Figure 12 is a front view partly broken away to show construction of mechanism of Figure 11.

Figure 13 is a vertical sectional view on line 13—13 of Fig. 12.

Figure 20 is a sectional elevation illustrating the tumbler mounting, and tumbler rotating means, viewed from the ground glass slide of rear of the tumbler.

Figure 21 is a face view of the plane face side of the tumbler, showing a platen attached thereto, for the reception and support of the sensitized plate.

Figure 22 is a central vertical cross-section of the tumbler.

Figures 23, 24 and 25 are fragmentary sections similar to Fig. 22, showing attachment of platens of various sizes.

Figure 26 is a vertical section through the front tumbler supporting frame, illustrating the movable frame actuating a coupler or control mechanisms, as well as an interlock for these control mechanisms.

Figure 27 is a detail face view further illustrating the interlock.

Figure 27ª is a detail view illustrating the mounting of the coupler mechanism actuating lever.

Figure 28 is a detail vertical section of the movable-frame, translating handwheel, and mounting therefor.

Figure 29 is a plan view illustrating the clutch and coupler interlock and coupler alignment recording means for the coupler mechanism.

Figure 30 is an inside face view of the front tumbler supporting frame, illustrating the relations of the clutch operating mechanism to the coupler and alignment recording mechanisms.

Figure 31 is a vertical sectional view on line 31—31 of Fig. 30.

Figure 32:
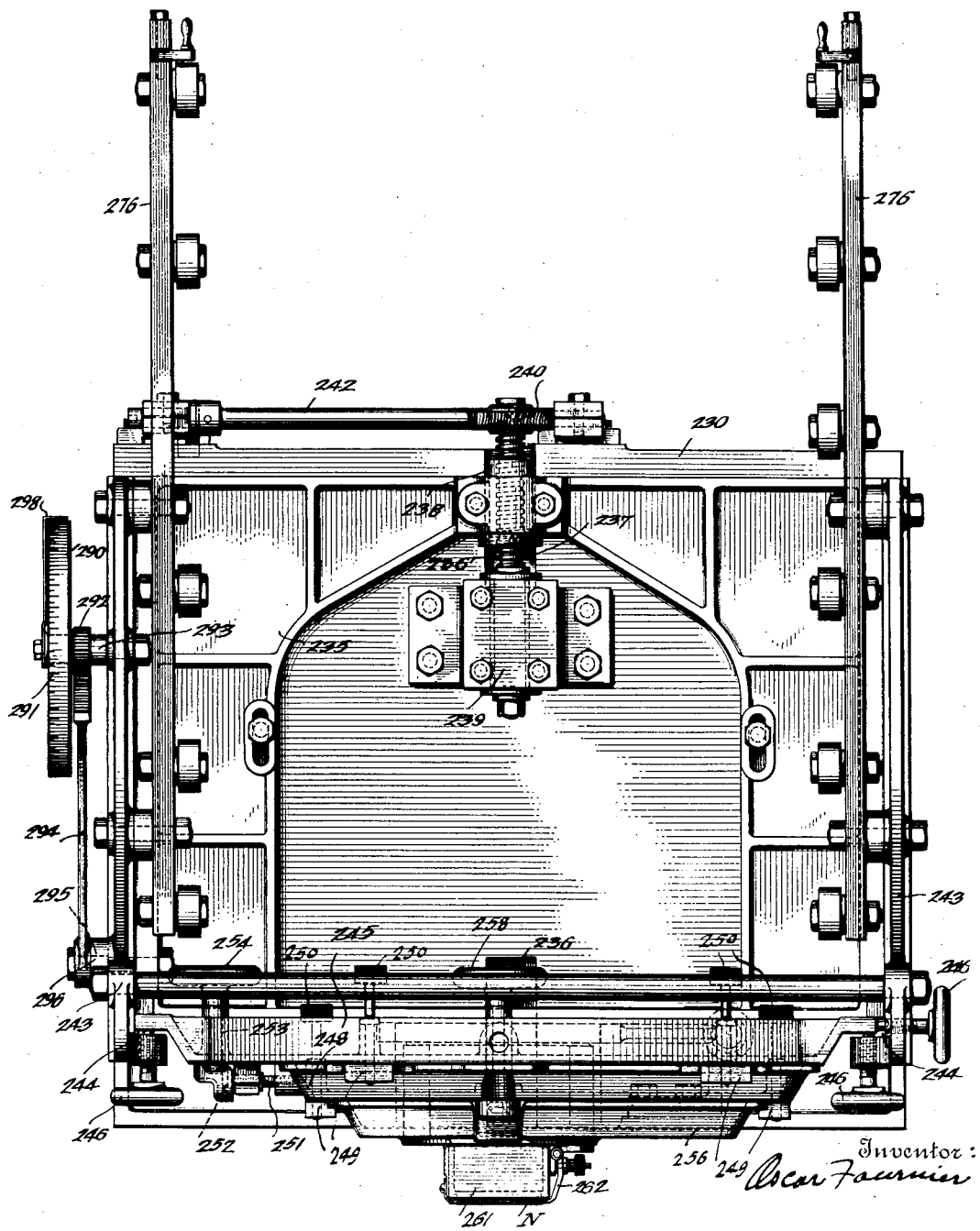

Figure 32 is a plan view of the assembled rider and negative carrier.

Figure 33 is a side elevation of the rider and negative carrier, the beam being shown in section.

Figure 34 is a rear elevation of the detached negative holder.

Figure 35 is a vertical central section of Fig. 34.

Figure 36 is a front elevation of the assembled rider and negative carrier.

Figure 37 is a detail sectional plan, showing the driving connection for the rider translating screw shaft.

Figure 38 is a plan view partly in section, illustrating the short movement and dwell timing mechanism.

Figure 39 is a side elevation of the mechanism of Fig. 38.

Figure 40 is a side elevation of the timer starting mechanism.

Figure 41 is a front elevation of the timer starting mechanism dial.

Figure 42 is a vertical section approximately on line 42—42 of Fig. 41.

Figure 43 includes elevations partly in section, of the movable contact yokes or elements.

Figure 44 is a detail section of the interlock for the tumbler rotating, and locking mechanisms.

Figure 45 is a section on line 45—45 of Fig. 44.

Figures 46 and 47 are plan sections illustrating portions of the tumbler locking mechanism.

Figure 48 is an electrical diagram illustrating the timer control circuits for short movement of the movable frame.

The main parts of the machine are:

A stationary base frame; a movable frame slidable longitudinally of the base frame; a beam vertically slidable upon the movable frame; a rider and negative carrier slidable crosswise of and upon the beam; a negative holder upon the negative carrier removably attached thereto; a rotatable non-translatable tumbler held in supports attached to the base frame, having respectively upon its opposite parallel sides, means for supporting and centering a sensitized plate; mechanisms for manually moving and automatically timing power movements of the movable frame toward and away from the tumbler; mechanism for turning and locking the tumbler; an interlock between the tumbler turning and locking mechanisms; mechanism for connecting and disconnecting the movable frame to and from its translating mechanisms; interlocks for preventing simultaneous operation of certain control mechanisms; positional setting and recording means for adjustment of beam and negative, and coupler mechanism; and adjusting or compensating means connecting the recording, and coupler mechanism for obtaining properly coordinated movements therebetween.

Figure 1:
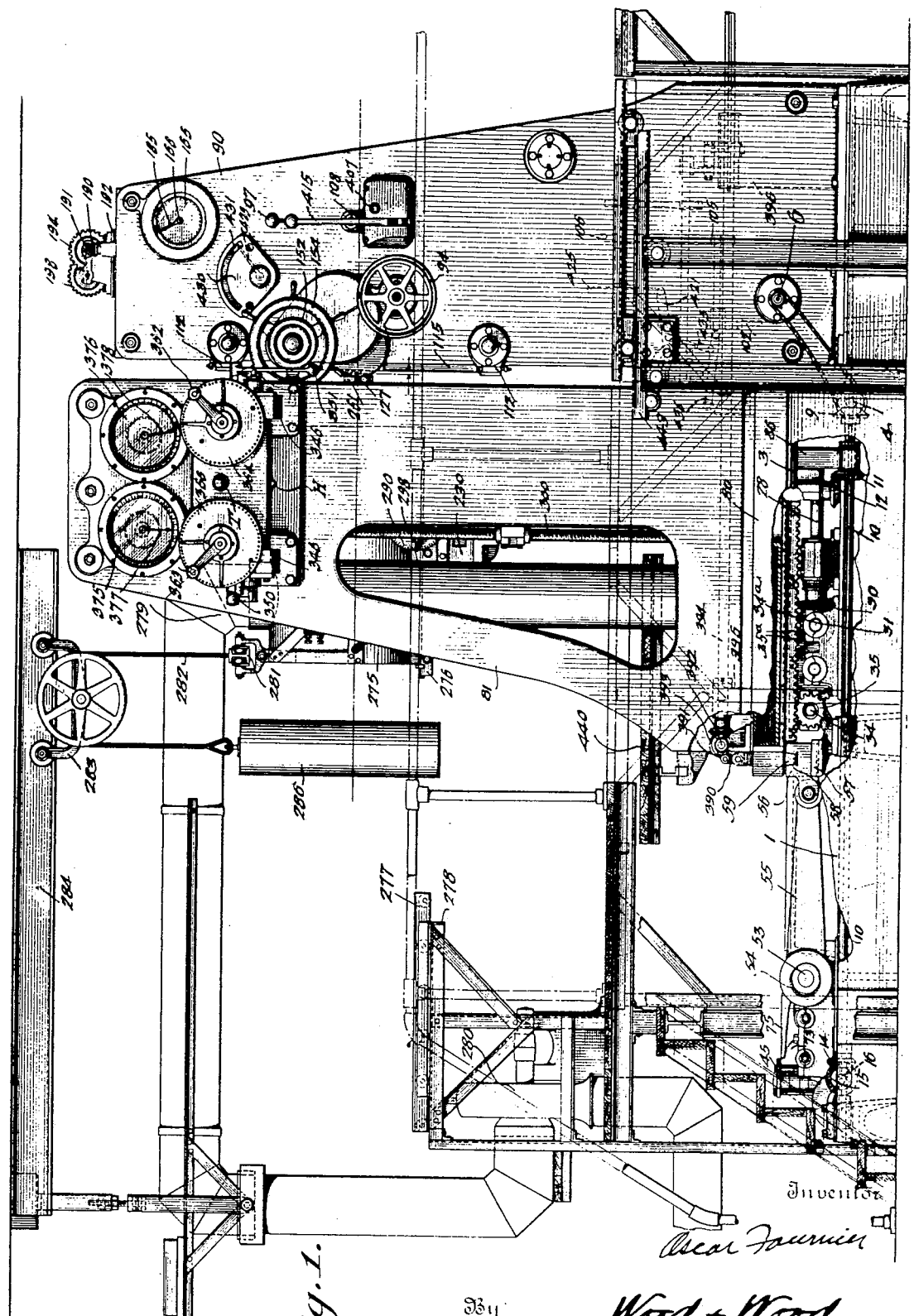
Figure 1 is a side elevation partly in section, representing a general view of the machine, parts being broken away to more clearly show portions of the coupler mechanism.

The machine comprises a base frame 1 of cored, hollow construction, consisting in this instance of two sections bolted together (see Fig. 1). At opposite sides of the frame are concaved V-shaped tracks or ways 2 disposed in parallel relation and adapted for engagement by corresponding convex inverted V-shaped longitudinally disposed projections 3, of a movable frame, adapted for translation in reverse directions longitudinally of the base. Upon the base frame are mounted in suitable bearings, shafts in geared connection for transmitting motion to the various parts of the machine.

The main drive shaft 4 is mounted adjacent one end and one side of the base frame crosswise thereof, and is held rotatably at one end in an ordinary bearing and at the opposite end in one side of a special bearing block 5 which also serves to journal and mount parts of a reversing-clutch mechanism. The main drive shaft 4 is provided with a sprocket wheel connected by a chain with the sprocket wheel mounted on a shaft 6 traversing and rotatable in one frame member or side of a tumbler supporting frame. This tumbler frame comprises two vertically disposed side walls attached to the base, between which side walls and journaled therein is a rotatable tumbler, hereinafter described under the head of "Tumbler".

On the opposite end of the shaft 6 is a spur gear meshing with a pinion of the motor 7, which is of constant speed type and provides power for driving the greater part of the mechanism. A second motor for operating a timing mechanism, mounted above the tumbler is described under the head of "Short movement and dwell timing mechanism".

The main driving shaft 4 at each extremity is provided with a bevel gear. The bevel gear 8 meshes with a companion gear 9 keyed to a shaft 10 disposed longitudinally of the frame adjacent the front guideway, suitable bearings being provided for its rotative support.

Keyed to and slidable longitudinally of the shaft 10 is a bevel gear 11 rotatable in a vertical plane, which gear is in mesh with a gear 12 keyed to a vertical shaft 13, which shaft is herein designated, the negative-adjusting power shaft. The connections of this shaft with the negative adjusting mechanism is described under the heading "Power transmission and feed for beam rider and negative carrier."

The longitudinal shaft 10 is also provided with a bevel gear 14 keyed or pinned thereto, which meshes with a companion gear 15 keyed to a shaft 16 disposed for rotation adjacent the rear of the machine and crosswise thereof. The shaft 16 has mounted thereon elements of a cam-operated, solenoid-controlled clutch, the details and function of which clutch and mechanism associated therewith, is described under the head "Short movement frame translating mechanism."

Movable frame and beam.

Mounted for longitudinal translation upon the parallel guides or ways of the base frame, is the movable frame, which is movable toward and away from the tumbler, and which comprises a hollow base casting 80 having bolted thereto spaced vertically disposed hollow side walls 81, each wall being provided with parallel guides 82 at its inner side, the guides of opposite frames being opposingly related. The side walls are preferably in the form of hollow castings, made in skeleton form to reduce weight, and on the bottom of the base frame are attached the racks with each of which is engaged one of the spur gears 35 carried by the rack-shaft mounted on the main or base frame of the machine.

As before stated, the movable frame is adapted to be translated forwardly and rearwardly to and from the tumbler respectively through comparatively long and short distances, the long distance translation away from the tumbler being, to permit unobstructed rotation of the tumbler.

In addition, a beam 83 is provided which is adapted for vertical translation upon the movable frame. The beam is mounted upon the vertical slide-ways 82 and has the form of a hollow casting provided at opposite ends with suitable guides engaged with corresponding guides of the side walls (see Figures 8 and 37). As shown in Figure 37, a vertical channel is formed at each end of the beam, the faces of which channels engage corresponding outer faces of the parallel pairs of guide ribs 82, cast integral with the side walls. One side of each channel is formed by an elongated plate 84 detachably secured by bolts. Suitable gibs 85 are also provided for engagement with the inner and lateral faces of the guide ribs, by means of which compensation for wear can be obtained, and play between beam and guides positively prevented. This is an important feature inasmuch as any play between the parts would prevent accurate adjustment and perfect alignment of the negative with the sensitized plate.

Power for translating the beam vertically in reverse directions, and for translating a negative carrier frame or rider mounted thereon, laterally in both directions at right angles to the movement, is obtained through the vertical shaft 13 mounted upon the movable frame, having its lower end stepped in a bracket or hanger 86 attached to the bottom of the frame, and its top in a shelf bearing 306. The shaft 13 passes loosely through an opening in the beam, and the lower end of said shaft has keyed thereto the bevel gear 12 in mesh with a companion bevel gear 11 slidable upon the shaft 10. Thus, constant transmission connection between the shafts 10, 13 is maintained during the movement of the frame.

Beam balancing device.

Figure 3:
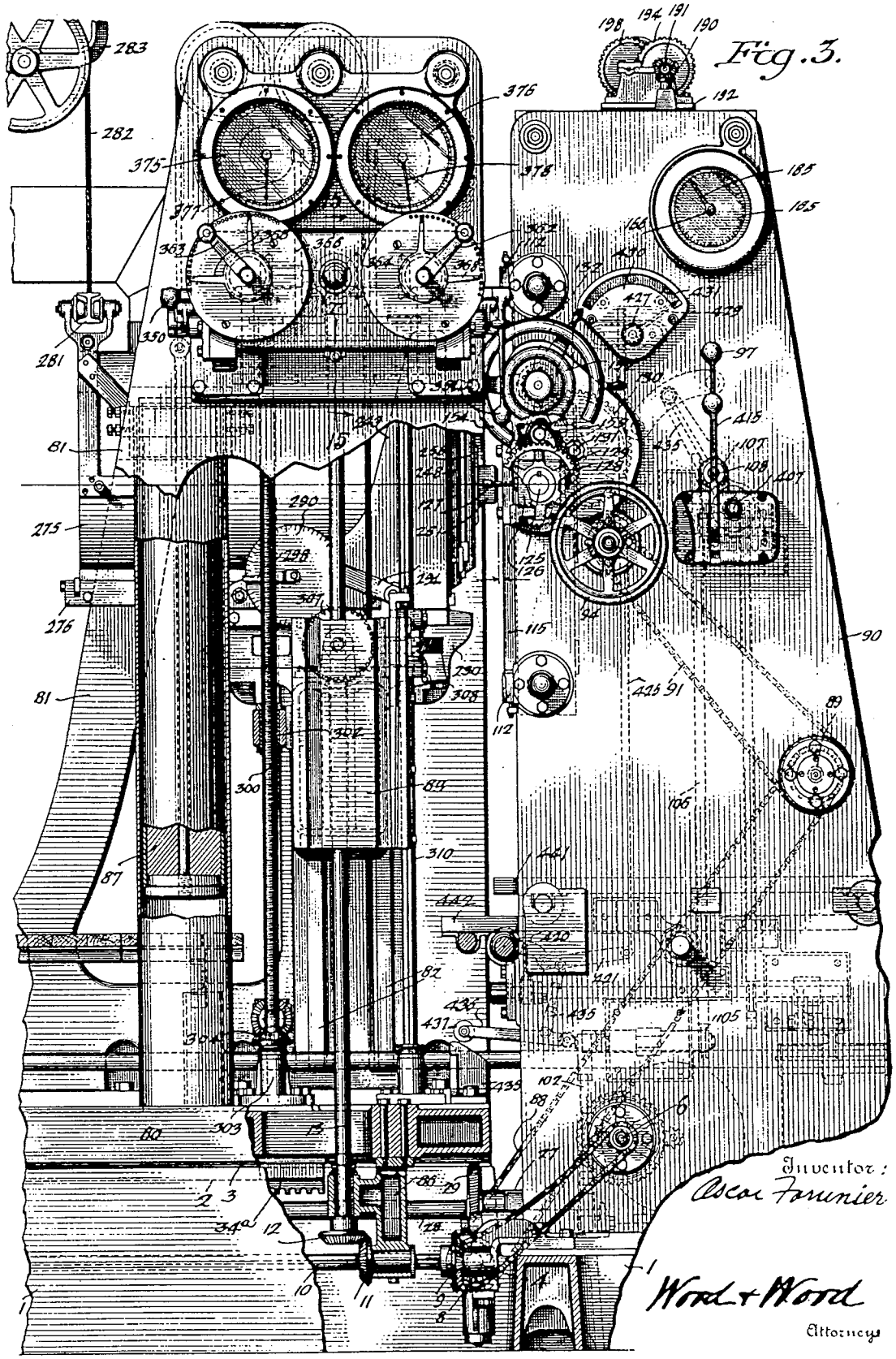
Figure 3 is a side elevation of the movable and tumbler supporting frames, parts being broken away to show the beam rider and transmission shafts associated therewith.
Figure 8:
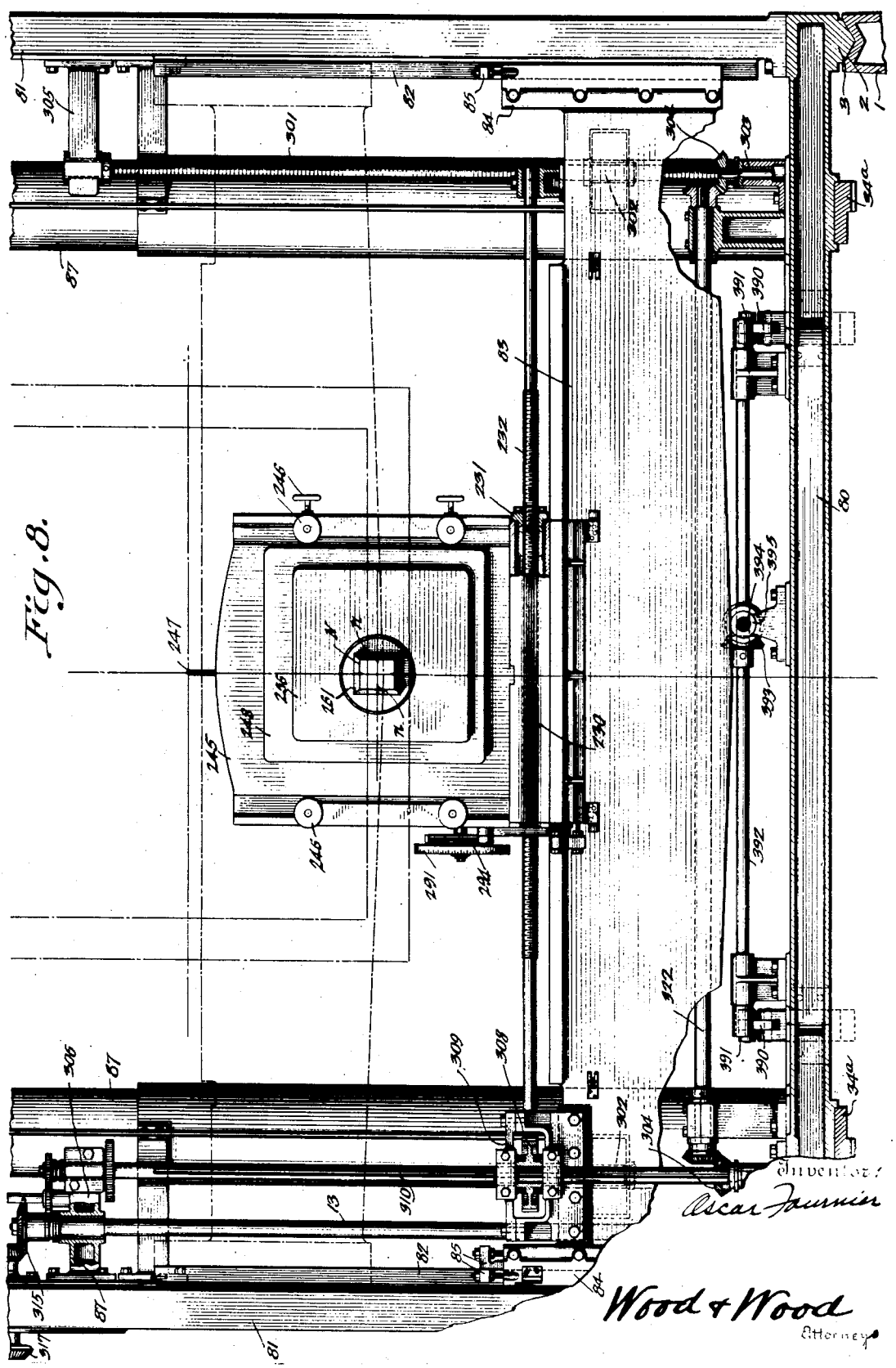
Figure 8 is a sectional elevation of the movable frame, illustrating the beam, transmission shaft associated therewith, and rider and negative carrier slidable thereon.

The beam and mechanism mounted thereon is counter-balanced by two weights 87 disposed at relatively opposite sides of the movable frame between and adjacent its side walls (see Figures 3 and 8). Cables are attached to the top of the beam adjacent its ends, and each extends upwardly and over a respective grooved pulley mounted on a spacer element or tie rod at the top of the frame. Each cable extends downwardly from its pulley and has attached at its lower end a weight, in this instance in the form of a cylindrical barrel as a receptacle which can be filled with a proper amount of suitable material to provide a counter-balance of proper mass. The weight is slidable in a casing attached vertically to the bottom casting of the frame, and each casing is removably held by suitable clamps to the side wall 81. The weight of each counter-balanced member is one-half of the combined weight of beam, and parts mounted thereon.

Long movement frame translating mechanism.

This mechanism is provided for translating the movable frame horizontally through a relatively great distance to permit rotation of the tumbler. The beam is translatable vertically in both directions, and the rider is slidable upon the beam in opposite directions at right angles to beam movement. As a result of these movements, the negative attached to the carrier which is in turn attached to the rider, can be moved in opposite directions and adjusted in three planes at right angles to one another, that is, vertically, laterally and longitudinally with respect to the tumbler. In addition, as hereinafter described under the heading of "Negative holder", the negative can be rotated in a plane parallel to that of the faces of the tumbler, thus obtaining in conjunction with the movements before mentioned universal micrometric adjustment for the negative.

Figure 2:
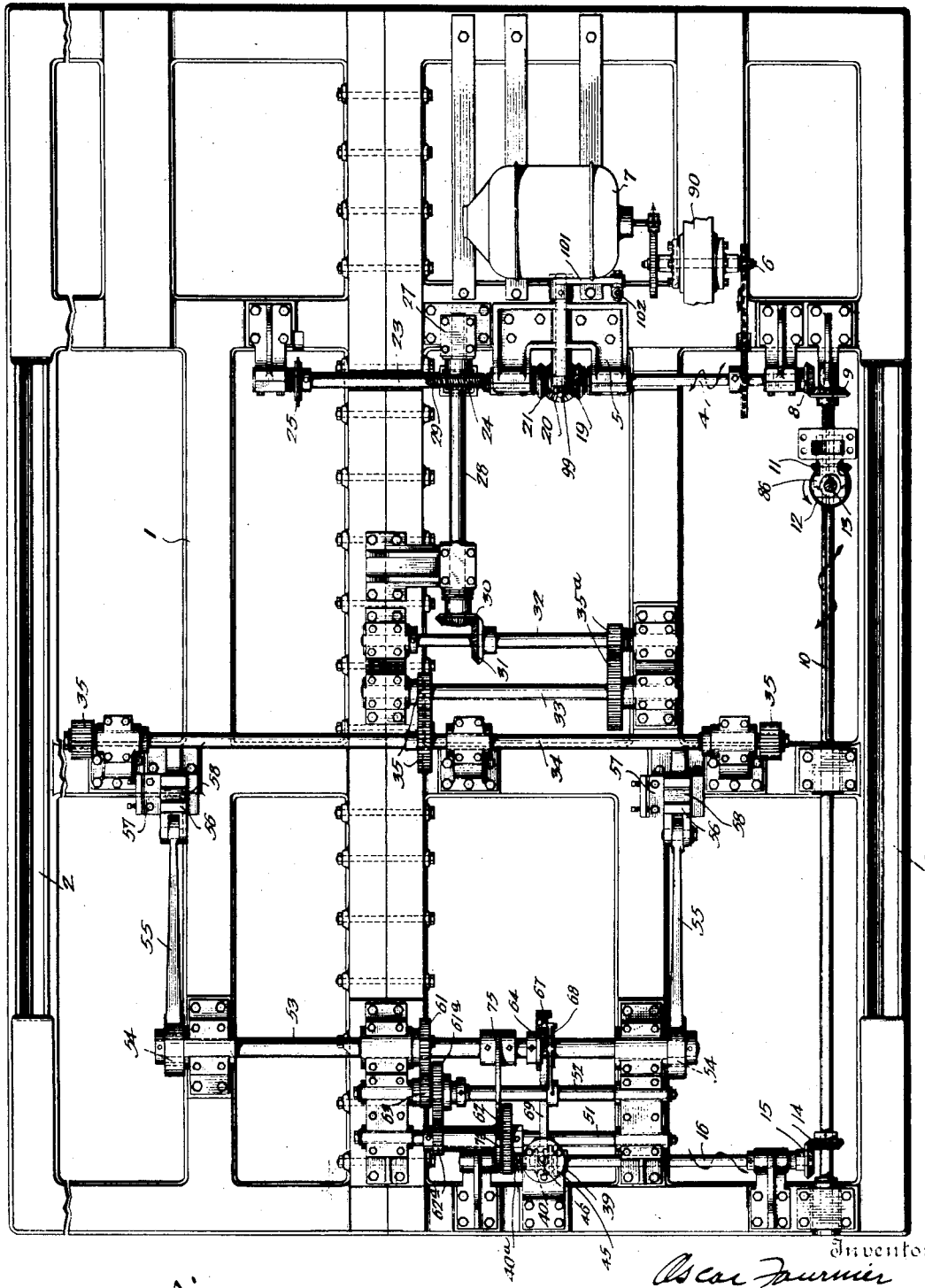
Figure 2 is a top plan view of the base frame and power distribution for short and long movement frame translating mechanism.
Figure 7:
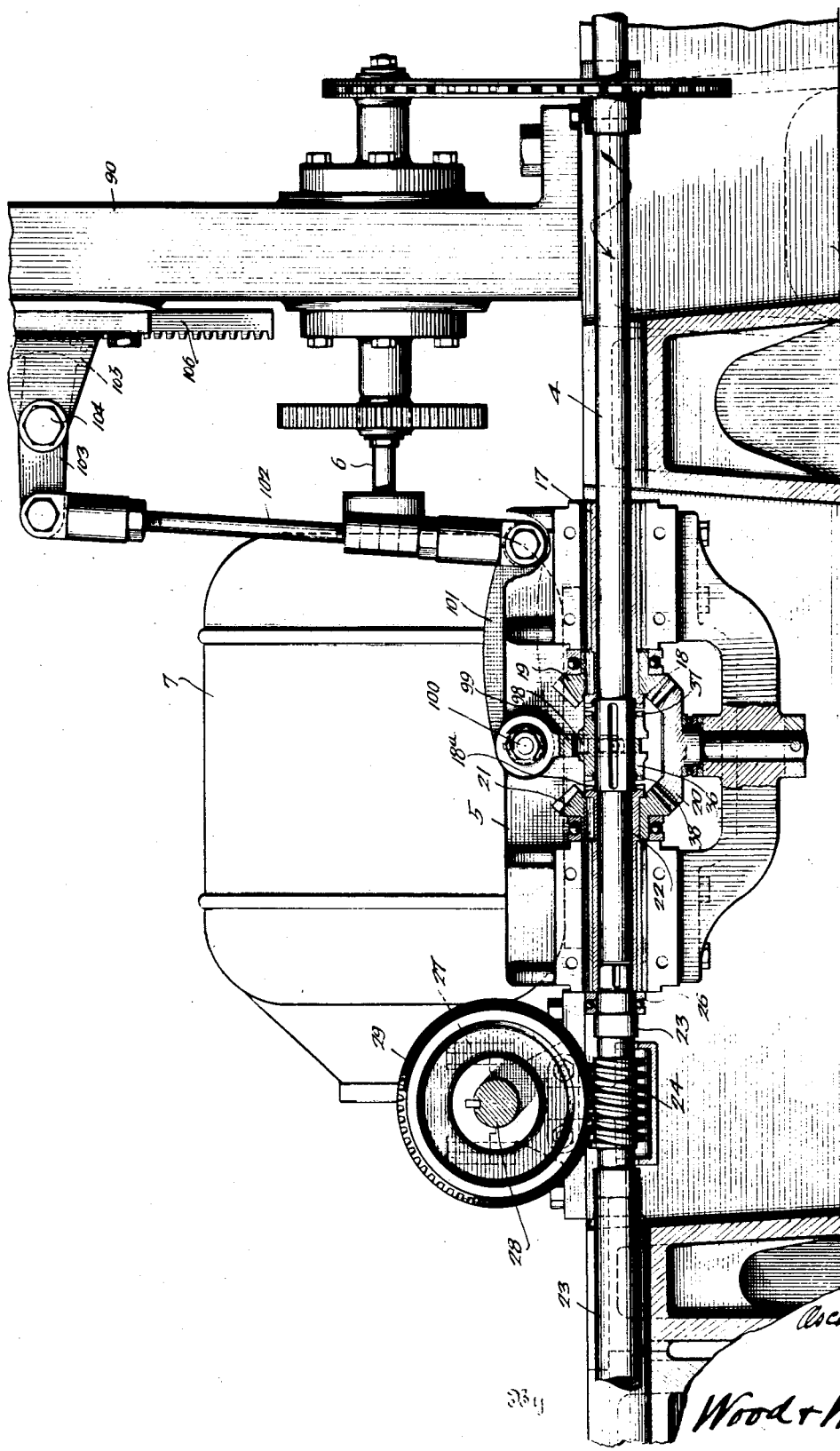
Figure 7 is a vertical longitudinal section of the transmission mechanism and reversing clutch for long movement frame translation.

Referring to Figures 2 and 7, the main drive shaft 4 is rotatably mounted in a sleeve 17 at one side of the special bearing block 5, said sleeve being in turn rotatable in a suitable bushing held by the block and being provided on its inner peripheral edge with radial clutch teeth 18. Keyed to the sleeve adjacent a shoulder formed by the flange which carries the clutch teeth, is a bevel gear 19 meshing with a companion gear 20 mounted for horizontal rotation upon a shaft, stepped in a lower bearing as part of a frame bolted to the block 5. With the gear 20 is meshed a third gear 21 opposingly related to the first mentioned gear 19. This gear 21 is keyed to a sleeve 22 mounted for rotation within a suitable bushing held at the opposite or inner side of the bearing block. The inner end of the shaft 4 is rotative within this sleeve and said sleeve has thereon radial clutch teeth 18$^a$ opposingly related to the teeth 18. The sleeve 22 is keyed at that end opposite the gear, to a shaft 23 which shaft has a worm or screw 24 integral therewith. The sleeve 22 forms a rotatable bearing for one end of the shaft 23 and this shaft is rotatably mounted in a suitable bearing at its other end. A sprocket wheel 25 is keyed to the shaft adjacent its inner bearing, with which sprocket is engaged a chain 88 also engaging a second sprocket mounted on a cross shaft 89 carried by the tumbler frame walls 90. At the opposite end of this shaft adjacent the front tumbler frame wall is a sprocket wheel having a chain 91 is connection with a sprocket wheel 92 keyed to a cross shaft 93 (see Figure 28) and at the outer end of this cross shaft is rotatably mounted a clutch element to which is keyed a hand wheel, 94. This translatable clutch element is engageable with a companion clutch element 95 keyed to the shaft, and the clutch element and hand wheel are translatable against the action of a spring 96 toward the clutch element, for driving engagement therewith. By means of the wheel and sprocket chain connections, the shaft 23 may be rotated manually for translating the movable frame, and the hand wheel is always disengaged when not in use.

A suitable thrust bearing 26 (see Figure 7), is provided between the worm and the end of the bearing block 5. An oil receptacle surrounds the screw 24 and is attached to and supported by the lower portion of the bearing 27 in which is rotatably mounted one end of the shaft 28 to which is keyed the worm wheel 29 meshed with the screw 24. The shaft 28 is disposed longitudinally of the frame at the approximate middle thereof and has at its opposite end a bevel gear 30 meshing with the gear 31 carried by a short cross-shaft 32 rotatably mounted in bearings upon the frame.

Parallel with this shaft are two other shafts, both mounted in suitable bearings of the frame. One of the shafts 34 extends across the frame and has at each outer extremity a spur wheel 35 which is adapted for engagement with a rack 34$^a$ carried at the under side of the movable frame, two of these racks being provided, in parallel relation. The intermediate shaft 33 has geared connection with the other shafts, this geared connection indicated at 35$^a$, being in the nature of speed reducing train interposed between the rack shaft 34 and the worm drive shaft 28. Between the bevel gears 19 and 21 and slidably keyed to the main drive shaft 4 is a clutch member 36 having teeth 37, 38 adapted for alternate engagement with the teeth 18, 18$^a$, respectively, of the sleeves 17, 22. This clutch mechanism acts to obtain power transmission to, and reverse direction of rotation of the rack shaft 34 to correspondingly reverse the direction of translation of the movable frame.

The reversing clutch is actuated by a hand lever, 97, at the front side of the tumbler frame, (see Figure 26). Engaged at opposite sides within the central groove 98 of the clutch member 36 are the pins of a fork 99 keyed to the inner end of the rack shaft 100, at the opposite end of which is pinned a lever 101 connected at its outer end to a link 102, the opposite end of which link is pivoted to a lever 103 attached to a shaft 104 rotatable in a bearing, projecting laterally from the side frame. At the opposite end of this shaft is a gear segment 105 engaged with the teeth of a rack-rod 106 which rack is held in suitable bearings upon the side frame for vertical translation. The upper end of this rack-rod is provided with teeth engageable with a spur gear 107 mounted for rotation in a vertical plane, upon a horizontal shaft 108. This shaft extends through the frame, has the operating handle 97 pinned thereto and is adapted to be locked, to prevent its rotation and consequent actuation of the clutch 36 when the short distance frame translating mechanism is operative, or set for operation. This locking mechanism will be described under the heading of "Interlock for clutch, actuating, and frame coupling and release mechanisms".

By proper manipulation of the power and reversing clutch and mechanism associated therewith, the movable frame may be translated in opposite directions over relatively great distance in both directions either by power or manually.

A mechanism will now be described for translating the movable frame in opposite directions through a relatively short distance, at relatively different rates of speed.

A time controlled device for starting and stopping the operation of this mechanism

*Short movement frame translating mechanism.*

This mechanism is for the purpose of imparting regular, relatively slow motion to the movable frame, in forward and reverse directions through relatively small distance, to bring the negative from what will be hereinafter referred to as its "initial" position, forwardly against the sensitized plate and rearwardly therefrom again to the initial position. In the present design of the machine the distance of movement in each direction is approximately one-quarter of an inch. While the negative is in its initial position the same may be adjusted positionally relative to the sensitized plate or to the hair lines of the tumbler, after which it is urged forwardly against the plate, where it remains during exposure. The negative is also in this initial position during the centering operation. The negative is held against the sensitized plate during a certain timed interval, and while thus held an exposure is made and an image transferred to the plate. For this purpose a light U is used and is lighted during that definite period of time, (see diagram Figure 48). Mechanism, as timing mechanism, electrically controls the mechanism now to be described, which control is obtained through a clutch, engageable and disengageable by solenoid action. In one operaton the solenoid plunger is raised, releases the clutch and connects power with the movable frame translating mechanism, after which, at the end of a predetermined period the solenoid plunger is automatically dropped, the clutch withdrawn and power disconnected.

Referring to Figures 4, 5, 6, and 1, the shaft 16 has keyed or pinned thereto a stationary toothed clutch member 39. Adjacent this clutch and in opposition thereto is slidably mounted a companion spring pressed clutch member 40 provided with a circumferential cam groove 41. A major portion of the groove lies in one vertical plane while a minor portion 42 of the groove adjacent one extremity, lies in another vertical plane and at an angle to the major portion. Mounted upon a shelf or support 43 carried by the frame, is a solenoid 45 having a plunger 46 tapered as at 47 at its lower end, the tapered portion being engaged or engageable with the cam groove, as most clearly shown in Figures 5 and 6.

The cam groove of the clutch member 40 is so designed that the major portion of the groove lies in one plane and only a small minor portion lies laterally of that plane. The end of the pin is thus, during the major portion of the rotation of the cam, engaged within the long or major groove, and only at or near the end of the rotation does the pin engage the lateral or offset minor portion. The result is that as the cam approaches the end of the rotation in a clockwise direction the same is translated upon the shaft and the clutch teeth disengaged thereby stopping motion of the frame moving mechanism at one of its limits of motion, either forwardly or rearwardly.

The sleeve extension of the clutch member 40, has diametrically related fins or projections 48 slidably engaged within corresponding slots 49 of the sleeve extension of a spur gear 60 rotatably mounted upon the shaft 16. This construction permits the necessary translated movement of the clutch member, and maintains driving connection between said member and gear at all times.

Mounted parallel with the clutch drive shaft 16 are three shafts, respectively, 51, 52, 53, the innermost 53 being of the greatest length and extending almost entirely across the frame. This shaft is held rotatably in bearings carried by the frame, and at each extremity has mounted non-rotatively thereon an eccentric disk 54 (see Figures 1 and 2). Upon each eccentric disk is mounted what is herein termed an eccentric arm or link 55 pivotally connected at its opposite end with a slide member 56 held for sliding motion only in a bearing 57 rigidly mounted upon the top of the frame adjacent the rack shaft 34. Each slide is provided with a transversely tapered groove 58 in its top which groove is adapted for engagement by the tapered lower end of a vertically slidable coupling pin 59 mounted at the rear end of the movable frame. Mechanism is provided for manually simultaneously raising or lowering these pins to disconnect or uncouple the frame from, and to connect or couple it with the slide members 56 which form part of the short movement control mechanism. The disconnection is made for the purpose of allowing the slidable frame to be translated either manually or by power rearwardly, in order that the tumbler may be turned, and after such turning or adjusting of the tumbler, the frame is again moved to its forward or initial position at which position the pins are engaged with the grooves of the block.

Mounted for rotation upon the shaft 51 and upon suitable bearing bushings pinned to the shaft, is a sleeve, (see Figures 4 and 6) having gears at its opposite ends, one of said gears 62 meshing with the gear 60, and the opposite gear 62ª meshing with a gear 61ª carried upon a sleeve mounted rotatively upon the shaft 52. Upon this sleeve is also a gear 63 meshing with the gear 61 keyed to the shaft 53. The driven clutch shaft 16 and eccentric shaft 53 are thus connected by a train of reducing gears, the shafts 16, 53 each carrying single gears, respectively 60, 61, in train with the gears 62, 62ª, 61ª, 63, carried by the sleeves upon the intermediately disposed shafts 51, 52. The shafts 51, 52 are non-rotatably held.

As shown in the drawings, Figures 4, 5, 6, 1 and 2, the mechanism is at rest and this position corresponds to either of the short movement positional limits of the movable frame. The clutch member 40 is held in retractive position by the solenoid-plunger 46. When the solenoid is energized the plunger is raised, spring 40ª presses the clutch 40 into engagement with its companion clutch 39 and operation of the mechanism begins.

In order to temporarily prevent the solenoid-plunger 46 from falling, when its coil is de-energized, a device is provided for positively holding said plunger in its raised position until it is desired to have its lower end again engage the cam groove. For this purpose there is mounted upon the eccentric shaft a disk 64 having diametrically related radial periperal projections 65 alternately engageable at each half revolution of the disk, with the roller 66 carried by a lever 67 pivoted at its upper end to the bracket 68 mounted upon the shafts 52, 53. This lever has pivotally connected at its lower end a flat locking member or slide 69 having its opposite end slidably held against the bottom of the bracket 43 by suitable guide. When the clutch is engaged, the outer extremity of this slide is immediately adjacent one side of the plunger (see Figure 5).

A retraction spring 70 is connected with the lever 67 and frame 68, the action of which is to translate the locking member to bring its outer end portion below the end of the plunger when the plunger is raised and when the disk has rotated sufficiently to disengage either of its projections 65 from the roller 66. The gearing ratio between the clutches and eccentric shafts is such that the slide is forced into locking position and retracted to initial or unlocking position twice for every complete revolution of the eccentric shaft. The timing arrangement is such that the slide is thrown to locking position substantially immediately after the solenoid is raised, and retracted to its initial position, shortly after the power is connected through the clutch. This allows the lower end of the solenoid plunger to engage and ride into the groove during the continued rotation of the clutch member 40. The clutch shaft 16 in this instance makes ten complete revolutions to one revolution of the eccentric shaft 53, an 180 degree rotation of the eccentric shaft corresponding to the movement of the movable frame to one of its limits. For example, if the frame is in the initial position and the solenoid is actuated, the plunger is raised, clutch engaged, shaft 16 makes five complete rotations, and the clutch is disengaged, leaving the frame in its forward position and with the negative against the sensitized plate. Upon the second actuation of the solenoid the clutch is again engaged and the cycle repeated, retracting the frame to its initial position, with the negative spaced away from the sensitized plate. The initial position of the negative relative to the sensitized plate is shown in Figures 1 and 3, in which the negative, in this design of machine, is spaced about one-quarter of an inch away from the sensitized plate. As described under the head "Micrometric adjustment for negative," the negative holder can be adjusted to cause the negative to engage the sensitized plate with the proper pressure when in its forward position.

In order to prevent counter rotation of the cam clutch 40 from initial or unclutched position, due to the forward pressure of the inclined side of the minor groove portion 42 against the plunger the circular boss provided by the gear 62 has adjustably mounted thereon a disk 73, having a substantial radial peripheral notch 74 against which is engaged or engageable the free end of a pawl 75 swingingly mounted upon the eccentric shaft 53. When the clutch shaft rotates in clockwise direction the disk rotates in a counter-clockwise direction and the pawl at all times lies against the outer periphery of the disk. At the end of the cycle or in other words, when the cam has reached released position, the pawl drops again against the shoulder and thus prevents counter-rotation above mentioned. The disk may be angularly adjusted and set by means of headed screws.

The above described mechanism provides a means for translating the movable frame toward and away from the tumbler through a relatively short distance, and further provides means whereby the movements are accurately controllable. The main object is to provide means whereby relatively short uniform motions of the negative toward and away from the sensitized plate may be obtained. Means for timing the movements of this mechanism are described under the headings "Short movement and dwell timing mechanism," and "Timer starting mechanism."

*Tumbler.*

The improved tumbler, (see Figures 20 to 25, inclusive), comprises a hollow rectangular box-like metal casting, open at one side of greatest area, and closed at the opposite side to provide a plane face of like area. Means is provided for securing a sensitized metal plate or emulsion plate to this plane face side of the tumbler, upon which plate images are to be photographically transferred, the plate being thereafter developed and used as a printing plate in the manner fully described in the copending application heretofore mentioned.

The outer face of the closed side 110 of the tumbler frame is provided with a series of T-grooves or slots 111 in rectangular formation, adapted to slidably receive clamping members 112, which members are designed to compressively engage over and pinch the edges of the sensitized sheet and thereafter be manipulated to stretch the sheet tautly. In order to adapt the tumbler for the reception and support of sensitized plates of different dimensions, the grooves are arranged in groups, forming rectangles of various sizes, all grooves communicating in a manner to permit the introduction and adjustment of the clamp bases 113. Openings 114 of greater width than the widest portions of the T-slots are provided at the intersection of pairs of rightangularly disposed slots, and into these openings the movable inner clamping element of the clamp member is introduced, the clamp then being slid to position. A series of platens 115 of different dimensions, are provided, any one of which may be attached by screws in proper position. The essemblies of different size platens are shown in Figures 22 to 25, inclusive.

At the opposite side of the tumbler is means for centering or aligning the edge marks of the negative with respect to axes of the tumbler, which operation is preliminary to the photographic transfer of the image to the emulsion plate and is performed for each substituted negative. To this end the tumbler at the open side is provided with diametrically related cross or hair lines, with which the diametric edge marks of the negative are made to accurately coincide in the preliminary centering or aligning operation. The lines are drawn on translucent slides or ground glasses the members of each series of these glasses are mounted with all lines in collinear relation. The arrangement comprises two systems or series of glasses, each composed of four members, each system or series lying at right angles to the other and along lines corresponding to the horizontal and vertical axes of the tumbler.

A pair of glasses 116 having their hair lines collinear are disposed along the vertical axis of the tumbler (see Figure 20), and at right angles to a pair similarly placed along the horizontal axis. Each slide is beveled at its outer face and edges, and the longitudinally beveled edges are frictionally engaged with dovetail grooves of plates, removably attached at the outer faces of hollow substantially rectangular casings 118 bolted to the tumbler, projecting at right angles therefrom, and having openings at the outer sides, over which the slides are disposed. Incandescent light bulbs 119 are held by the frames with the centers of the bulbs in substantial alignment with the centers of the slides, (see Figure 22), whereby the lines of the glasses are illuminated, and can be seen by the operator from the rear of and through the negative, during the preliminary centering operation.

Centrally of the frame and disposed in pairs at right angles to one another are mounted other hair-line marked ground glasses 120 as members of respective rightangularly disposed systems of glasses before mentioned, each pair having their hair lines collinear with corresponding pairs, thus forming substantially two systems of collinear broken lines respectively comprising lines 121, 122, lying along the axes of the tumbler. These central glasses are mounted in a manner similar to the others in a slotted plate, 123, attached to projections of the frame, and the chamber formed beneath is illuminated by lamps 124.

The outer surfaces of all translucent aligned slides lie strictly in the same plane and the sensitized surface of an emulsion plate, when attached to the tumbler platen plate, is parallel with the plane of the outer surfaces of the slides.

In the operation of centering, the tumbler frame is first turned with its ground glass side toward the negative, the negative is then translated or properly manipulated in each direction to align its edge marks with corresponding marks of the tumbler, both vertically and horizontally, after which the movable frame is retracted, the tumbler is rotated to bring the sensitized plate in opposition to the negative, the frame is brought forwardly and photographic transfer of images is begun by bringing the negative opposite that portion of the plate, at which the first image is to be transferred, and then advancing the negative against the plate.

*Tumbler rotating and locking mechanism.*

The tumbler is mounted on and between spaced supports or frames, for symmetrical rotation about its axis, to alternately dispose of its parallel faces in opposition to the negative, (see Figures 3 and 20). Bolted at opposite ends along its central horizontal rotative axis are bearing brackets, through which brackets and hollow portion of the tumbler extends a central shaft 125, non-rotatable with respect to the tumbler but having its opposite ends rotative in bearings 126, as horizontally slidable and adjustable bushings carried by the tumbler supporting side frames. These slidable bearings or bushings are held against outward displacement by a plate, bolted to the front edge of the frame or to that edge in opposition to the movable frame. Slight adjustment of these bushings or bearings horizontally in forward or reverse directions is obtained through a screw 127. The tumbler is rotatable in these slidable bearings, and means is provided for manually rotating, and locking and unlocking the tumbler, as well as for locking the rotating means, when the tumbler-locking means is in locking position (see Figures 3 and 20).

Upon the front end of the tumbler shaft is keyed a spur gear 128 in mesh with a small companion spur 129 having a hub extension keyed within the bore of a third spur gear 130. A stub shaft 131 traverses the bore of the smaller gear and the side frame, to secure the two gears in operative position. The gear 130 is in turn meshed with a smaller gear 132 having a sleeve extension rotative upon the counter-turned portion of a stub shaft 133 which shaft has a flange at one end bolted to the side wall, disposing the shaft in a horizontal position parallel with and above the tumbler shaft. A counter-turned portion of the stub shaft provides a shoulder against which the gear abuts, and at the opposite side of the flange is an extension which engages an opening in the frame to steady the shaft. The stub shaft is centrally bored and within this bore is a slidable rod or plunger 134 having pinned to its outer end a forked head 135 between the arms of which is pivoted a bolt 137 threaded at its outer end. (See Figures 20, 46, 47.) The outer threaded end of this bolt or link 137, is attached by nuts to a block pivoted at the outer end of a crank lever 136, which lever is fixed to and extends horizontally from the rotatable mounted vertical shaft 138 lying immediately adjacent and parallel with the inner wall of the front frame.

This shaft is journaled at the top and bottom in suitable bearings and above and below the arm 136 has pinned thereto horizontally projecting arms 140, two in all. Each arm has its outer end engaged through and slidable in a slot 141, of a horizontally disposed tubular guide casting 142. Slidable within each casting is a bolt 143, the outer end of which is tapered and is engageable with a correspondingly tapered opening 144 in the tumbler frame. The inner end of each arm slidably engages a slot 145 in the bolt 143 and when the shaft 138 is rotated the arms are also rotated in a horizontal plane and act simultaneously to translate or retract the bolts, by engagement with the end walls of the slots. Each bolt is counter-turned to form a shoulder and each is surrounded by a coiled expansion spring 146 which tends to force the bolt toward and into the opening of the tumbler frame and so does when the shaft is released for rotation. The outer end of each bolt passes through a guide and spring-tension adjusting bushing or sleeve 147 which has threaded engagement with the bore of a bracket bolted at the outside of the frame. The outer end of this sleeve is notched or slotted for engagement by a screwdriver or similar implement by which the bushing may be rotated and the tension of the spring varied. A cap encloses the outer end of each bolt and spring adjusting means, and has threaded connection with the tubular projection of the bracket. The springs as before stated, are arranged to throw the bolt inwardly into engagement with the frame openings when the shaft is released and allowed to rotate. In this design there are four bolts, two at each side of the tumbler, engageable with the tumbler adjacent the extremities of its vertical end faces. All bolts are simultaneously operable. The upper end of the shaft 138 has keyed thereto a bevel gear 148, meshing with a companion bevel gear carried by a rotatable horizontally disposed cross shaft 149, located above tumbler frame and supported in the same bearings which support the upper end of the vertical shaft 130. This shaft 149 extends parallel with the axis of the tumbler across the frame and is at its opposite end provided with a bevel gear 150, meshing with a companion gear carried by a second vertical shaft 151 mounted like the corresponding shaft 138. It will be seen that when the front shaft is operated its companion shaft will be similarly actuated either to release or engage all bolts simultaneously.

The stub shaft 133 is screw-threaded exteriorly at its outer end, and has in threaded engagement therewith the hub of a hand wheel 152 in the outer end wall of which and centrally thereof is swiveled as at 153 the end of the shaft operating link 134. When this hand wheel is rotated and fed inwardly from its position in Figure 20 the link is translated inwardly to release the shaft and allow the springs to drive the bolts into locking engagement with the frame. In Figure 20 the bolts are withdrawn and the tumbler is free for manual rotation, which is accomplished through the hand wheel 154 keyed to the sleeve extension of the spur gear 132. The tumbler can be locked at points intermediate its vertical positions by a spring actuated pawl 155 (see Figures 3 and 20) engageable with the teeth of the spur gear 128. In this manner the tumbler can be locked in a horizontal position to facilitate the attachment of the sensitized plate to the platen.

*Interlock for tumbler rotating and locking mechanisms.*

This mechanism has the nature of a safety device or interlock, for protecting the tumbler rotating mechanism against forced operation when the tumbler locking mechanism is in locked position, thus avoiding such strains upon the rotating mechanism as would be injurious (see Figures 44—45). To this end, the stub shaft 133 has a radial groove 157 lengthwise thereof and the gear 132 has a similar groove 158 parallel with the shaft groove. The grooves can be aligned or registered as shown, to form a socket, bridging or intersecting the meeting line of the bearing surfaces of the gear and stub shaft. The hub extension of the outer hand wheel 152 is bored in its inner face to provide a circular socket 159 into which extends one relatively broad portion 160 of a key or feather, which portion is substantially equal to the sum of the depths of the grooves, 157, 158. The feather also has a relatively narrow inner portion 161, of slightly less depth than that of the groove. The feather adjacent its outer broad end and in its outer edge is notched as at 162 and this notch is slidably engaged with the periphery of an opening of an annular plate 163 overlapping the socket 159 and removably attached to the face of the hub.

A loose or sliding connection is thus provided between the feather and the hand wheel, as a result of which the hand wheel may be rotated while any portion of the feather is engaged in the slot or slots, the movement of the feather being only translative. With the feather or key positioned as in Figure 20, the tumbler is unlocked and may be rotated by wheel 154. Figures 44, 45 show a locked position of both tumbler and tumbler rotating mechanism. As the hand wheel is translated inwardly to locking position the broad portion of the feather engages the opening formed by both slots and locks both hand wheels against rotation, to the stub shaft. Thus, the grooves can be aligned or registered to form a socket bridging or cutting the meeting bearing surfaces of the gear and stub shaft, and when the feather is in its innermost position, and the operator attempts to turn the tumbler, there will be no liability of straining or otherwise injuring the tumbler rotating mechanism, the gearing ratios of which are designed for obtaining a powerful leverage upon the tumbler shaft. Moreover, the resistance met with in attempting to turn the larger hand wheel will act as a signal to apprise the operator of the locked condition, and he will then manipulate the outer hand wheel and withdraw the bolts before again attempting rotation of the tumbler.

Short movement and dwell, timing mechanism.

This mechanism is for the automatic time-control of the short movement frame translating mechanism, to obtain forward and reverse movements of the movable frame and negative carried thereby, whereby the negative is brought toward the emulsion or sensitized plate, held thereagainst during a definite exposure period, and retracted to initial position, wherein the front face of the negative is spaced away from the front face of the sensitized plate. The operation of this mechanism is initiated and controlled by a control push-button, or switch, H mounted at the front of the movable frame in a position conveniently accessible to the operator.

Adjustable electric circuit controlling contacts are provided, which can be set in a predetermined manner for engagement by movable circuit making contact member, which is rotated by a motor. Transmission connection between said motor and movable contact member is controlled by a clutch mechanism, in conjunction with gearing, to obtain alternate slow and fast motion of the movable contact member and to time its motion between the adjustable, normally stationary, contacts. This timing mechanism is started by operating a main switch and is thereafter automatically controlled by relay magnets throughout a complete cycle, during which the negative approaches and engages the emulsion plate; an arc light is turned on, and the negative remains engaged with the plate for a predetermined interval of time, after which the light is turned off and the negative returned to initial position.

Referring particularly to Figures 38 to 43, inclusive, the mechanism is mounted adjacent the top, and near the front side of one of the tumbler supporting frames 90 at the outer and inner sides thereof. A dial plate 165 is mounted in spaced relation to and at the outer side of the tumbler frame in a position to be observed from that side of the machine upon which are mounted the various control levers, setting mechanisms and positioned recording dials. Traversing the frame is a shaft 166 hereinafter referred to as the dial shaft (see Figures 41 and 43 inclusive). At the inner end of this shaft is keyed a worm gear 167 and upon the outer end is keyed a timer arm 168. The timer arm is constructed partly of insulating material such as fiber, is attached non-rotatably to the shaft and has attached at its outer end a frame (see Figures 41, 42, 43). Between the parallel outwardly directed arms of the frame is disposed a metallic cross-shaft 170 and pivotally mounted upon the metallic cross-shaft are a series of metallic contact fingers, respectively 171, 172, 173, 174. The fingers are spring actuated and are urged against stops, which limit movement in one direction against spring action. Each contact finger is adapted during rotation of the timer arm to engage a headed pin or pins of conducting material held in insulating plugs carried by one of the arms of a series of adjustable U-frames or yokes, respectively 175, 176, 177, by which means circuit is made selectively between pairs of pins. One arm of each yoke lies at the inner and one at the outer side of a series of separately insulated rings respectively 178, 179, 180, 181. The outer arm of each yoke has engaged therewith a set-screw engageable with outer retaining ring or band 182, surrounding the other rings and insulated therefrom. This band is held non-rotatably within the bore of a ring in turn attached by screws to a base plate which base plate is in turn attached by screws to the frame, thus permitting the assembly, as a unit, to be removed. The set-screw in the outer arm of each yoke is designed for clamping the yoke in a predetermined position and the inner arm carries two contact pins radially disposed with respect to the axis of the dial shaft and aligned in direction of the shaft axis. Each pin is adapted to positively engage one of the rings. There are three types or arrangements of pins, two of the yokes, 177 each, having two pins respectively engaged with rings 178, 179 and two other frames 175, 176 with pins engaged respectively with rings 178, 180 and 179, 181. The rings are mounted side by side in a vertical plane and concentric with the axis of the dial shaft and each ring is insulated from the other, and all rings are insulated from other conducting parts. A circuit between pairs of rings is obtained by engagement of pairs of pins, with pairs of fingers of the timer arm. Each ring has soldered thereto a wire forming a part of the main circuit which circuit is illustrated in the electrical diagram, Figure 48, and will be described under the head "Timer control circuit." The outer metallic ring 178 is provided with graduations 183, preferably corresponding to seconds and fractions of a second, by means of which the various yokes may be positioned in a predetermined manner. These graduations correspond to similar graduations 184 upon a visible dial. A detachable cover surrounds the contact mechanism and can be conveniently removed to permit access to the yokes.

At the outer end of the contact shaft 166 is a pointer 185 which rides over the outer dial, by means of which the operator can note the position of the contact arm and fingers thereon.

At the rear of the tumbler frame and lying between the dial shaft worm gear and against the frame, is a vertically disposed plate upon which is mounted a vertically disposed shaft 186, this shaft being rotatably held at opposite ends in bearings bolted to the plate. Upon this shaft is rotatably mounted a screw or worm 187 in mesh with the worm gear 167. The worm has a sleeve extension circumferentially flanged at its upper end, and this flange has provided upon its outer face, clutch teeth 188 adapted for engagement with the teeth of a companion translatable clutch member 189, circumferentially grooved and slidably keyed to and rotatable with the vertical shaft. When the clutch members are engaged the worm gears and timer shaft can be driven.

At the upper end of the shaft 186, (see Figures 38, 39) is a bevel gear 190 engaged with a companion bevel gear fixed to a short horizontal shaft 191, rotatably mounted in and projecting at each side of a bearing, which bearing is attached to a horizontally disposed plate 192. This plate is attached to and bridges channel beams fastened horizontally between and to tie rods which hold the side walls or tumbler supporting frames 90, together and in spaced relation. A second shaft 193, coaxial with the shaft 191, is mounted in and also projects at each side of a second bearing 196. The shafts are connected by reducing gear train, including a relatively large spur gear 194, being keyed to the shaft adjacent its bearing. A relatively small gear 195 has its sleeve extension rotatable upon the shaft 193 and in the bearing 196. Parallel with the first mentioned shafts is a second shaft carrying gears 197, 198, meshed respectively with the gears, 194 195. At the outer end of the rear shaft 193 is pinned a spur gear 199, meshing with a pinion 200 on the shaft of a preferably separately energized constant speed motor, 201, the current to this motor being suitably controlled by a hand switch, not shown. This gearing is arranged, in conjunction with the means now to be described, for obtaining varying speeds of the timer shaft. A clutch plunger 205, is keyed to and slidable upon the rear shaft 193. The clutch has a tubular extension having a terminal flange upon which are radial clutch teeth, 206 engageable with clutch teeth 207, carried by the hub extension of the front gear 194. This clutch element also has clutch teeth 208 at its opposite end engageable with corresponding teeth on the sleeve extension of the small sleeve gear 195. An expansion spring 209 is interposed between the front gear 194 and a circumferential shoulder upon the clutch member, and the spring surrounds the clutch and lies partly within the bore of a solenoid 210, of which the clutch forms the movable core or plunger. The plunger, when the solenoid is de-energized, occupies the position shown in Figure 38, in which position it is yieldably held by the coil spring. The plunger is, therefore, operable against the action of the coil spring to directly couple shafts 191, 193, for rotation in unison to obtain higher speed rotation of the timer shaft during translative movement of the movable frame to initial position, after the exposure. This relatively greater speed of rotation of the timer shaft is obtained by moving the clutch to the left, and while the solenoid remains energized this position of the clutch is maintained. Upon de-energization of the solenoid the spring retracts the clutch to the position shown in Figure 38 and thus obtains a slow movement of the timer shaft. The end portions of the shafts act to slidably support the plunger.

*Timer starting mechanism.*

This mechanism is for the purpose of tripping the timer mechanism to initiate and control short distance reverse movements of the movable frame (see Figures 40, 42).

Upon a cylindrical extension of the gear 167, is rotatably mounted a cam disk 215 having a peripheral projection 216 terminating at one end in a radial shoulder, and providing an inclined portion and a notch or "fall." This disk is rotatable in limited degree upon the cylindrical extension, and has attached thereto a segmental ratchet wheel 217 providing only that number of teeth necessary to obtain a limited rotative movement and angular displacement of the shoulder or "fall" of the disk, through pawl action. The movement of the plate is limited by pins 218 traversing arcuate diametrically related slots. On the outer end against the shoulder formed by counter-turning the sleeve extension of the worm, is swingingly mounted an arm 219 having at its outer extremity a spring-actuated pawl, 220, engageable with the teeth of the ratchet wheel. Attached to this lever intermediate its pivot and the pivot of the pawl is a rod 221 connected with the plunger 222 of the solenoid 223. Normally the plunger is in its lower position, and upon solenoid energization the plunger and arm are raised, and the disk rotated in counter-clockwise direction from its position in Figure 40, which represents the initial position. This position of the mechanism at a moment of actuation also corresponds to the initial position of the negative and movable frame in which the negative is spaced approximately one-quarter of an inch from the sensitized plate.

Pivoted to the base plate above and adjacent the worm wheel is a bell crank lever 224, one arm of which has at its lower extremity a roller 225 engaged with the periphery of the disk. The other arm is of forked construction, providing two arms or branches of unequal length lying at opposite sides of the slidable clutch member, with which they are operatively connected by trunnions or pins extending inwardly, and lying within the groove. At the outer end of the longer arm is mounted an insulated metallic contact 226, suitably electrically connected in the circuit in the manner shown in the diagram, Figure 48. This contact is engageable with a spring contact 227, mounted on a suitable insulating base attached to the frame.

In the normal position of this mechanism shown in Figure 40, the roller is engaged with the cam projection, the clutch is disconnected, the power switch is opened and the movable frame is in initial position. When the solenoid is energized its plunger moves upwardly a relatively short distance in limited degree, and causes a counter-clockwise rotation of the cam against the action of the coil spring 228. The projection 215 moves away from the roller, the lever arm and roller are forced inwardly by the action of the spring 229 and the clutch 189 is engaged as well as the switch contacts. The clutch and switch elements remain engaged during that period of time corresponding to the setting, or spacing of the adjustable contacts 175, 176, 177. At the end of the complete excursion of the contact arm, as indicated by the pointer, 185, the projection of the cam engages the roller and actuates the lever to separate clutch 189, and contact elements 226, 227, thus interrupting power and stopping the timing mechanism.

The distance between the first two contacts 177, 175 see Figures 41, 48, corresponds to the movement of the negative toward and against the sensitized plate, the arc light being turned on when the second contact 175 is reached. The spacing between the second and third contacts 175, 176, corresponds to the exposure period. When the third contact 175 is reached the light is turned off and when the fourth 177 is reached fast return movement of frame and negative to initial position begins. Thus in this embodiment of the invention arrangement is made for turning on the arc light immediately after the negative engages the sensitized plate, maintaining the light during exposure and turning off the arc light immediately after exposure. More detailed explanation of these matters will be made in reference to the diagram.

The above described mechanism provides means whereby the negative can be brought forward against the sensitized plate held against the same for a predetermined period of time, which corresponds to the exposure period, and retracted to initial position, such movements being accurately timed during each cycle.

*Negative adjusting mechanism.*
*(Negative carrier.)*

The negative carrier is mounted upon a base or "rider" 230 in the form of a hollow casting suitably gibbed to and transversely slidable along and upon the top face of the vertically movable beam 83 (see Figures 33–36). This rider carries a removably attached screw-threaded nut 231 (see Figure 8) engaged by the threads of a horizontally disposed feed screw 232, rotatably held at its opposite ends in bearings mounted upon the top of the beam, the feed screw being spaced above the beam.

Slidable upon the top of the rider 230 in a direction at right angles thereto is an open frame 235 which is provided on its bottom with aligned guide lugs engaging corresponding grooves 236 in the top of the rider. The frame is thus mounted and guided for translative movement longitudinally of the machine toward and away from the tumbler. A feed screw 237 is rotatably non-translatably mounted in a suitable bearing 239, carried by rider (see Figure 32) and said screw engages a threaded nut 238 immovably engaged in the slidable frame.

At the end of the shaft 237 is non-rotatably attached a worm wheel 240, engaged with the companion worm 241, fixed to the horizontal shaft 242, mounted at the rear of and parallel with one side of the rider. The outer end of this shaft has a square opening into which a key can be inserted for rotating the shaft to correspondingly rotate the worm wheel and screw shaft in micrometric degree, and to correspondingly translatively adjust the frame 235.

Mounted in parallel relation with, and bolted at opposite sides of the open frame, and extending outwardly therefrom are side frames 243, each providing a vertical groove 244 adjacent its front edge and at its inner side. These vertical grooves are opposingly related and provided for the reception of an open plate or frame 245 as a detachable base of a negative holder, upon which are mounted negative adjusting elements, one of which carries the negative. This plate is adapted to be conveniently introduced into and withdrawn from the grooves so that the holder may be removed for the purpose of attaching a negative. Clamping screws 246 are also provided for securely holding the plate in the grooves 244. The screws are preferably disposed so that pressure can be applied in right angular direction. A ring or eye 247 is secured at the upper end of the plate and is adapted to be engaged by a hook carried by a suitable hand operated chain hoist, traveling upon a beam supported on the ceiling.

The negative holder proper, comprises the removable open plate or frame 245 above referred to, and against the front face of and bridging the opening therein is slidably attached for crosswise movement in a vertical plane, a second open frame 248. This frame is mounted in clamping guides 249, carried by the removable base plate 245, and is further provided with aligned guide projections engaged with corresponding grooves of the plate. The guides 249 are clamped against the frame, after adjustment, by hand screws 250 accessible from the rear of the plate. (See Figures 34, 35.) This second frame 248 is translatable in micrometric degree by means of a screw-threaded shaft, 251, (see Figure 36), in threaded engagement with the frame and rotatable in bearings carried by the plate, the outer end of the screw having a bevel gear 252, thereon engaged with a bevel gear carried by a shaft 253, which traverses the plate and has attached to its rear end a hand wheel 254 accessible from the opposite or rear side of the plate for rotating the screw shaft 251.

Slidably attached by clamp guides against the front face of the second open frame 248 for sliding movement at right angles thereto, is a third frame 256 providing a circular opening as the bore of a circular boss 257 projecting rearwardly and horizontally from the frame at right angles thereto and preferably integral therewith. This third frame is also micrometrically adjustable with respect to the second frame by means of a hand wheel 258 also accessible from the rear of the base. This hand wheel operated adjusting device is similar in structure and action to that operated by wheel 254.

Rotatably mounted in the circular opening of the boss, and held against displacement by a locking ring 259, is a hollow cylindrical element 260 having a rectangular box-like chamber 261, extending forwardly from its front face, the cylindrical and rectangular chambers being continuations of one another and in communication forming a passage wherethrough light may be projected. The element has a circumferential flange at its inner end as a shoulder engageable with the end face of the boss 257, to prevent outward translation. A ring 259 is bolted to the frame, and has pins engaged in corresponding bores of the element 260. Expansion springs within the bores, abut these pins and the end walls of the bores to yieldably force the flange against the extension 257. Thumb-screws lock the annulus against rotation after adjustment. Over the rectangular opening of the chamber 261 and against the front face of the rotatable element is removably attached the edge marked negative N, the marks thereon being indicated at n. The negative may be attached in any suitable manner but preferably in the manner shown herein, two adjacent edges being engaged beneath the overhanging edges of stationary clips, (see Figure 36), and the opposite parallel side being engaged by the outer edge of a hinged plate 262, which is clamped against the negative by means of a screw. The negative is thus securely held but may be readily moved, by means of the cylindrical element, the negative may be rotated about its axis in a vertical plane. The rotation is obtained in micrometric degree by turning a worm shaft 263 mounted vertically at the rear of the frame 256, the worm being engaged with the teeth of a gear segment 264, integral with and extending radially from an annulus 265, keyed to the circumferential flange of the element 260. (See Figures 34 and 35).

In conjunction with the horizontal movements of the main frame, vertical movements of the beam, horizontal movements of the rider on the beam, and adjustments obtainable on the negative holder, the negative may be moved in three planes at right angles to one another, that is, vertically, laterally and longitudinally, with respect to the tumbler. The negative can be rotated axially in a plane parallel to that of the faces of the tumbler, can be brought toward and away from the tumbler faces, and can be adjusted vertically and longitudinally with respect thereto, all adjustments being obtainable in micrometric degree.

A substantially cylindrical light chamber 275 of sheet metal construction (see Figures 33—32), rests upon rollers, carried by parallel channel irons 276, bolted to and extending rearwardly from the frames 243. The chamber is adapted for the support of a light at its interior, said light, of the arc type, being shown only in the diagram. During the centering operation, the light chamber is translated rearwardly and disposed upon rollers, carried by channel irons 277, (see Figure 1), supported upon a platform 278, at the rear of the machine. A vent opening is provided at the upper part of the chamber and with this is connected a pivoted suction pipe 279 adapted to be swung in a horizontal plane. This pipe is for the purpose of removing heat generated by the arc light, for which purpose a fan 280 is provided. The rear end of the chamber has rollers engaged with an I-beam 281 held at the lower end of cables 282, passing over sheaves rotatable on a frame 283 having rollers engaged with the flanges of an I-beam 284 attached to the ceiling. A counterweight 286 is attached to the opposite end of the cable and is adapted to properly support the chamber during removal and replacement.

*Positional setting and recording means for longitudinal adjustment of negative carrier.*

Figure 19:
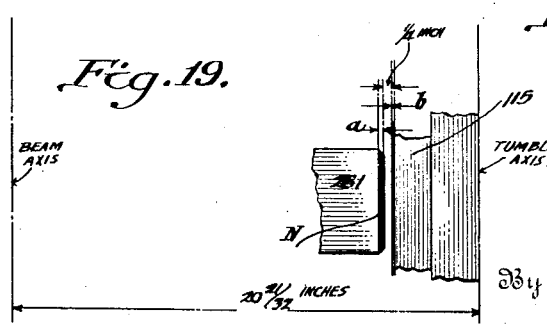
Figure 19 is a diagram illustrating the initial setting of the machine after positioning the negative and sensitized plate.

Longitudinal movement of the carrier frame 235, is provided, in order that proper adjustments may be made to compensate for the differences in thickness of negatives and emulsion plates, this being necessary inasmuch as the short motion of the movable frame is fixed by the degree of eccentricity of the eccentric disks 54. At limit of forward movement, the negative must be engaged with the sensitized plate under a predetermined pressure, which must not be great enough to break the negative. In order that this adjustment may be made micrometrically and in a predetermined manner, and the setting recorded, so that when an adjustment is disturbed or changed for any reason a similar adjustment may be obtained, a rotatable dial 290 is provided having peripheral graduations 291 thereon, the distance between the graduations in this instance corresponding to one thousandth of an inch linear travel of the carrier. The degree of linear movement of the carrier toward or away from the faces of the tumbler is registered upon this dial, and the dial readings correspond to a setting, made when the distance from the front face of the negative to that of the sensitized plate is approximately one-quarter of an inch and when the distance between tumbler and beam axes is 20-21/32 inches (see Figure 19).

The dial is of hollow cylindrical formation and is provided with a central hub bore within which is non-rotatively engaged the sleeve of a spur gear 292, said gear rotatably engaged upon a stub shaft 293 extending laterally from the side of the negative carrier. This gear meshes with a circular segmental rack at the end of an arm 294, which arm is pivoted upon a stub shaft 295 extending laterally also from the side of the carrier. Attached to and movable with the arm is a segmental spur gear 296, the teeth of which are engaged with the corresponding teeth of a short stationary rack 297, bolted to the side of the rider. (See Figures 32, 33, 36.)

It will be seen that when the negative carrier is translated as a result of the adjustment of the screw shaft 242 at the rear of the rider, the arm will be rotated and through geared connection with the dial will cause rotation thereof, the graduations of which pass the stationary pointer 298 mounted upon the outer end of the non-rotatable stub shaft upon which the dial is rotatably mounted. In making an initial setting, (see Figure 19), the thickness *a*, *b*, respectively, of the negative and emulsion plate are measured by micrometer and the values representing such thicknesses added, after which the worm shaft that operates the dial and translates the negative carrier, is adjusted so that the number on the dial, corresponding to the value of the above mentioned sum, coincides with the bevel edge of the stationary arm. This adjustment is made when the movable frame is at the rearmost limit of its short movement and, in this particular design of machine, when the horizontal distance between the center lines or axes of the beam and tumbler equals 20 21/32 inches. For purposes of illustration, the assumed thickness of the negative .25 plus that of the emulsion plate 0.03125 equals 0.28125. With the adjustment of the negative carrier, to give a dial setting of 0.28125, and with this assumed thickness of negative and plate, the distance between the surfaces of the negative and sensitized plate will be substantially equal to the length of movement of the movable frame as controlled by the degree of eccentricity of the disks 54.

When either the negative or emulsion plate of the machine is replaced the machine should be reset.

*Beam and rider driving mechanisms, and reversing clutch mechanisms for respective control thereof.*

The beam is raised and lowered in micrometric degree by means of two screw shafts or screws 300, 301, having right and left hand threads respectively, engaged with corresponding nuts 302 held in brackets projecting horizontally from one side of the beam (see Figures 3 and 8). The lower ends of these screws are rotatably stepped in respective pedestal bearings 303 and each screw at its lower end has a bevel gear 304 keyed thereto and suitably rotatably mounted upon the top of the bearing 303. These bevel gears mesh with corresponding gears at opposite end of a shaft 322 horizontally rotatably mounted in bearings supported upon the base 80. The screw shafts are thus simultaneously operable. The upper end of the left threaded screw is rotatably held in a bracket bearing 305, and the upper end of the right threaded screw shaft is rotatable in and projects above the shelf bearing 306 (see Figures 8, 11, 12 and 13). Rotatably mounted horizontally upon the beam is the rider or negative carrier screw shaft 232. This shaft is driven through two spiral gears 307, 308. (See Figures 8, 37), one, 307, keyed to the end of the shaft 232 for rotation in a vertical plane, and the other, 308, horizontally rotatably mounted in a bearing 309 attached to the side of the beam and non-rotatively keyed to and slidable vertically upon the shaft 310, by which means constant driving connection is maintained. The shaft is stepped in a pedestal bearing of the movable frame and is held rotatably in the shelf bearing 306 with its upper end projecting thereabove, as in the case of the right threaded beam translating screw 300. At the upper end of the shaft 13 above the shelf bearing is a bevel gear 315 meshing with a companion bevel gear carried at one end of a horizontal shaft 316 which transverses the frame and is held in a suitable tubular bearing bolted to the frame. At the outer end of this shaft is a bevel gear 317 meshing with a companion gear carried by a horizontally disposed shaft 318, rotatable in bracket bearings bolted to the front of the frame. At each end of this shaft is a bevel gear 319 adapted for engagement with two bevel gears 320, 321 forming part of the reversing clutch mechanism for respective control of beam and rider mechanisms. Power is in this manner transmitted from the shaft 13 to the gears of two independently operable reversing clutch mechanisms. The gears 319 are driving elements for reversing clutches through one of which reverse movements of the beam are obtainable and through the other, reverse movements of the rider and negative carrier. These clutches are operable independently by hand levers disposed in accessible positions at the work side of the machine, and the said levers when operated also actuate additional clutches, which operate in conjunction with setting-levers in a manner more fully described below.

Figure 10:
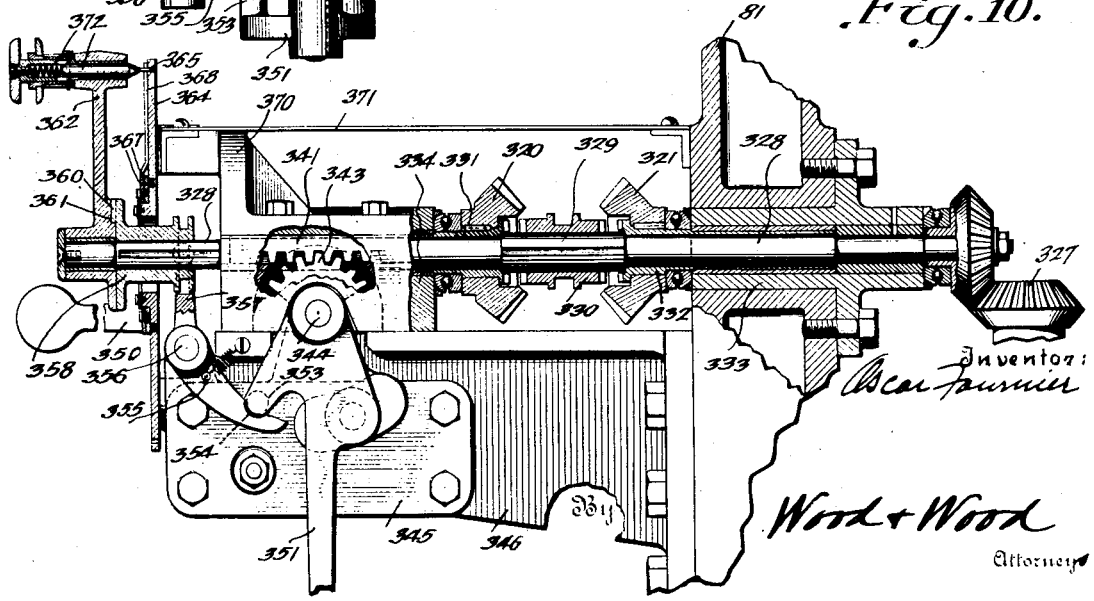
Figure 10 is a vertical sectional view approximately on line 10—10 of Fig. 9.

Adjacent the upper end of each shaft 300, 310, below the shelf bearing, is keyed a spur gear 325 (see Figures 11, 12, 13) which meshes with a spur gear keyed to the lower end of the short vertical shaft 326 held rotatively in the shelf bearing. At the upper end of each shaft is a bevel gear 327 and each gear meshes with a companion gear keyed to the end of a horizontally disposed clutch shaft 328 rotatively mounted in and traversing the side frame, and projecting outwardly therefrom at the front side a considerable distance. (See Figure 10.) Upon each of these shafts are mounted the parts of a reversing clutch, and beyond each reversing clutch, adjacent the outer end of each shaft, is mounted a setting lever, and slidable clutch member cooperable therewith, the details of which are described below under the heading, "Interlocks for setting-levers, and beam and rider reversing clutches."

Figure 9:
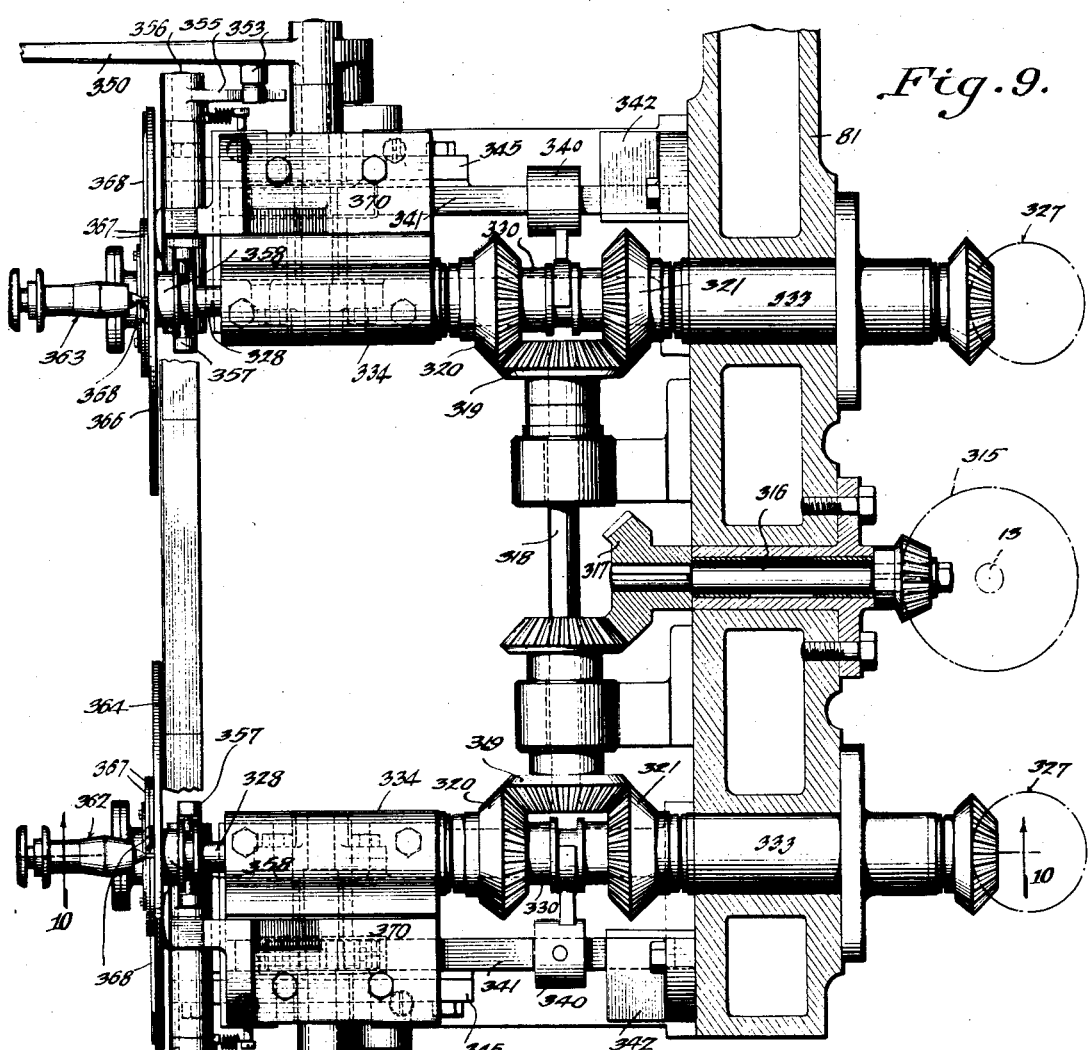
Figure 9 is a sectional plan illustrating the reversing clutch mechanisms for respective control of beam and rider driving mechanisms.

Both shafts 328 (see Figures 9, 10) and mountings therefor are similar, the structure of one only will therefore be described in detail. The shaft is supported at its inner end within a bearing bushing carried by a tubular bracket bolted to the frame, is counterturned to form various stop shoulders, and centrally has an enlarged cylindrical portion 329, longitudinally grooved for engagement by a key carried by a shiftable clutch member 330, by which means the member is splined to the shaft. The clutch member has radial teeth upon its opposite end faces, alternately engageable with corresponding teeth of sleeves respectively, 331, 332, rotatable upon the shaft and within bushings carried respectively by the tubular bearing 333, and a bearing block 334 supported upon the top of a bracket, extending horizontally from the front side of the frame. To these sleeves are keyed the respective bevel gears 320, 321, one at each side of the shiftable clutch member and against the shoulder formed upon corresponding sleeves by the terminal heads or flanges upon which the clutch teeth are formed. Thrust bearings are interposed between each gear and adjacent bearing side face.

Figure 14:
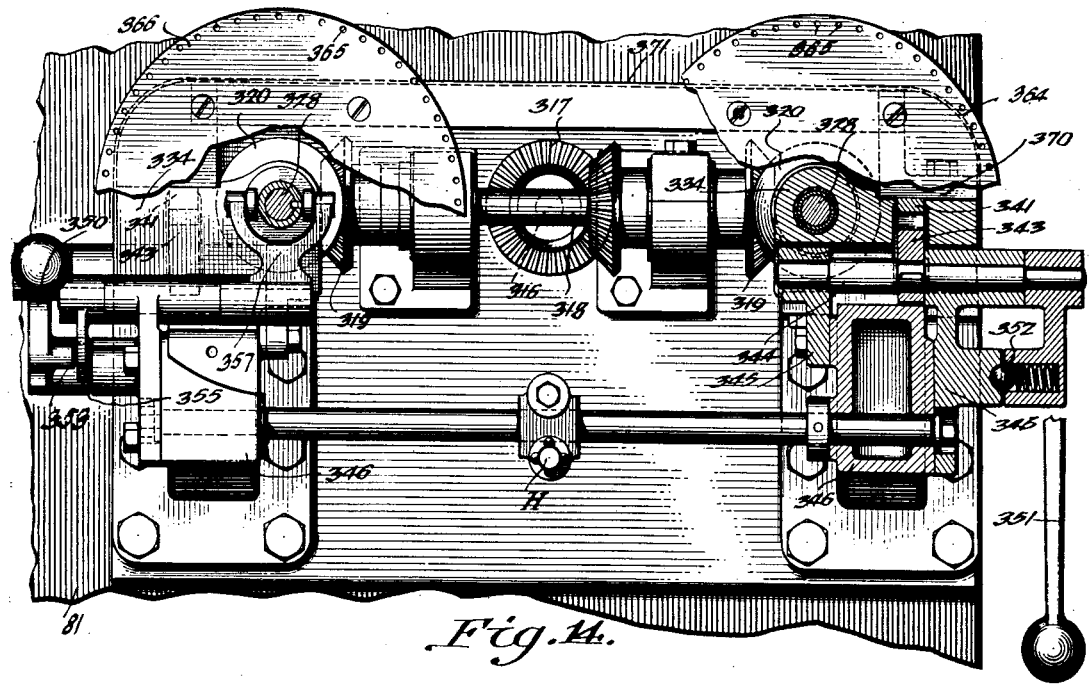
Figure 14 is a front view partly in section, further illustrating the structure of Figures 9 and 10.
Figures 15, 18:
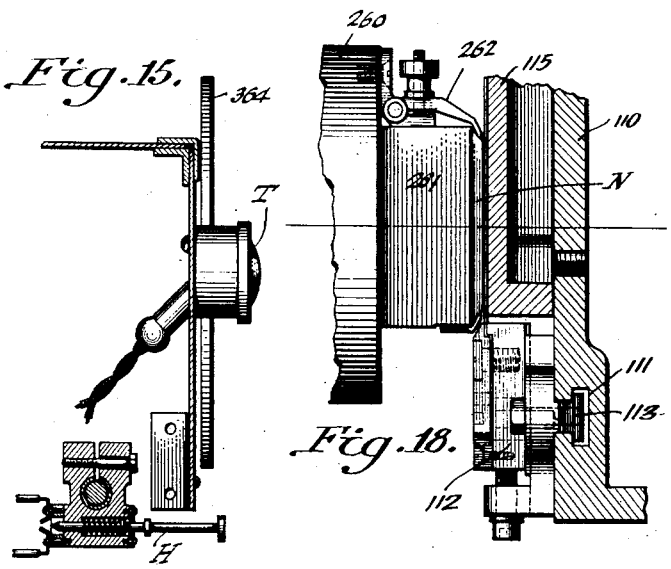
Figure 15 is a vertical sectional view on line 15—15 of Fig. 3, illustrating the structure of the starting push button and the mounting of the red light.
Figure 18 is a plan view illustrating the relation of the negative to the sensitized plate, in an extreme lateral position.
Figure 16:
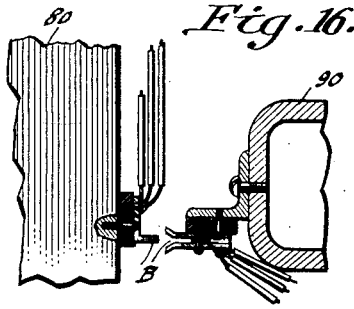
Figures 16 and 17 are respectively a plan, and side elevation of one of the limit or emergency switches.
Figure 17:
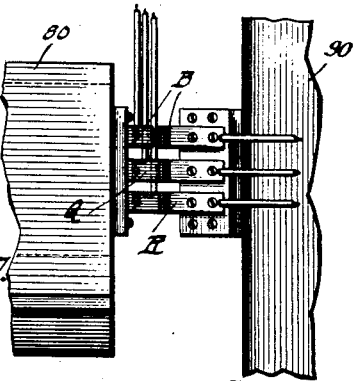

Both gears are in constant mesh with the gear 319 and receive power through this gear. The slidable clutch element is centrally circumferentially grooved and the forked end of a shifter arm 340 is engaged therein. This arm is pinned to a shiftable rack bar 341 mounted for horizontal translation in the bearing blocks 334, 342. Engaged with the teeth of this rack bar are the teeth of a segmental spur gear 343 keyed to a horizontally disposed cross-shaft 344, at a right angle to the shaft 328, and held rotatably in bearings formed in plates 345 bolted to the side of the bracket 346. (See Figure 14). To the outer end of this shaft is keyed an operating lever. There are two of these levers, respectively 350, 351, one of which 350, normally lies horizontally and the other 351 vertically, these positions corresponding to a neutral position of the shiftable transmission clutch element. The lever 350 controls beam operation and the lever 351 rider operation. By swinging these levers in relatively opposite directions from the positions shown, reverse movements of either beam or rider may be obtained, corresponding to the directions of swing of respective levers.

The relative angular relation of the levers, thus assists or guides the operator in proper selections. When horizontally disposed lever 350 is swung upwardly the beam moves upwardly a corresponding movement of beam being obtained when the lever is moved downwardly from initial position. Corresponding crosswise movements of the rider are obtained by swinging the vertically disposed lever 351 forwardly and rearwardly.

*Interlock for setting-levers and beam and rider reversing clutches.*

This mechanism is provided to prevent simultaneous actuation of two clutches and provides means whereby one of said clutches is always operative. The purpose of one of the clutches is to obtain through a common shaft, power translation of the beam, (or rider) in opposite directions, and the other, to connect this shaft with a setting-lever in order that the operator may move the beam, (or rider) manually in predetermined degree. One of these clutches should always be disengaged when the other is engaged, and this safety device as an interlock is provided for that purpose. With this arrangement, the operator can obtain relatively rapid translation of beam or rider by power to within a short distance of the desired final position, after which power may be disconnected and the operation continued manually by the lever to bring the beam or rider to the exact desired position. Each lever 350, 351 adjacent its pivot is broadened, (see Figures 10 and 14) and has a tubular extension projecting inwardly, within the bore of which is an outwardly spring pressed ball 352, engageable with a socket of the bracket 345, for holding the lever in neutral position. A pin 353 also projects from this broadened portion of the lever and has a roller thereon which, in neutral position of the lever engages a notch 354 formed in the upper face of a curved latch finger 355 keyed to the outer end of a rotatable shaft 356 mounted in a bearing of the plate 345. Keyed to the opposite end of this shaft is a sleeve having integral therewith a radially disposed fork 357, the arms of which provide rollers engageable with the side faces of the groove of a clutch element 358, keyed to and slidable upon the outer end of the shaft 328. This slidable clutch member has an outer terminal circumferential flange (see Figures 9 and 10) provided on its outer face with a radial tooth 360 engaged or engageable, with a corresponding socket 361, in the vertical inner face of a flange, concentric with the hub of the rider setting lever 362 which lever is rotatably secured on the outer end of the shaft. The similar beam-setting lever is designated 363. This lever 362, functions as a rider setting and operating arm, adapted to swing over a circular dial 364, plate having a circular row of openings 365 adjacent its outer edge and extending through the plates.

In this design of the machine, each dial plate 364, 366, has one hundred openings therein, equally spaced, the distance between these openings corresponding to one thousandth of an inch linear, travel respectively of either beam or rider. Each plate is provided with a central opening (see Figure 10) through which the shaft 328 and clutch element 358 project, and on its front face has a circular boss concentric with the opening, upon the periphery of which are rotatably mounted superposed rings 367 attached together by screws held by a retaining plate. Each ring has an arm 368 projecting radially therefrom, the arms being disposed at right angles to one another, with adjacent edges lying along the right angularly related diameters of the dials. The arms may be rotated and set with their outer ends in opposition to a given opening, and are frictionally held in such position by compression springs mounted in sockets of the dial plate. The setting is for the purpose of assisting the operator in locating a particular opening in the plate. The dial plate is attached to projections carried respectively by the bracket 334 and by an upper bracket 370 bolted to the top of the block. The bracket overlaps and closes the channel in which the rack 341 is held (see Figures 10, 14) and also provides means for the attachment of a sheet metal cover 371 extending over and protecting the reversing mechanisms. At the outer end of the handle or arm 362 is a spring actuated plunger 372 horizontally slidable and having a reduced cylindrical extension at its inner end, as a pin engageable with any one of the openings. The movable and stationary parts are provided with finger pieces, one of which when pulled toward the other disengages the pin from the opening.

When either clutch control lever (350, 351) is swung in either direction, the roller of the pin 353 rides out of the notch, depresses or rotates the spring retractable latch arm 355, and disengages the clutch member 358 from the setting handle or lever 352. When the lever 351 is thrown either to right or left, as viewed in Figure 10, the clutch is disengaged from the setting lever, and power translation of the rider, will take place, according to selective lever operation. In the position shown in Figure 10 the setting lever clutch is engaged and the transmission clutch disengaged and therefore the mechanism is set for manual actuation by lever 362.

By the mechanisms above described reverse movements of beam and rider may be obtained. The respective clutches are independently and selectively operable by power, or by hand levers disposed in accessible position at the work side of the machine. The interlock mechanism also prevents simultaneous clutching operation of both setting-lever, and transmission clutches. When either lever is moved from the position shown the clutches associated therewith are actuated, one for transmitting power to beam, (or rider) in one or another direction, the other being disconnected from its corresponding setting-lever.

*Positional recording means for beam and negative.*

The purpose of this mechanism is to provide means for recording the exact position either of the beam or rider, whereby either may be repositioned or returned to any desired predetermined position.

To this end, dials 375, 376 are provided, (see Figures 3, 12, 13) having markings thereon corresponding to the linear travel respectively of the beam and rider, and pointers 377, 378 ride over these dials to indicate to the operator, the exact respective positions of these parts. The transmission connection between the shafts 300, 310 and the respective pointers 377, 378 are identical. The dial pointer 377 is in geared connection with the right-threaded beam translating screw 300, and the pointer 378 with the rider transmitting shaft 310, upon which the spiral gear 308 is slidable. The upper end of each of the shafts above the shelf bearing is provided with a spur gear 380 (see Figures 11, 12, 13) meshing with corresponding spur gear 381 upon vertical shaft 382. Each shaft has at its upper end a screw 383 meshing with a worm wheel 384 attached at the inner end of a horizontal shaft 385 held rotatively in a tubular bearing bolted to the frame. At the opposite end of respective shafts, are attached pointers 377, 378 riding over corresponding dials attached to the outer side of the frame. The pointer and dials are suitably enclosed by a removable cover carrying a transparent face glass. Each dial has graduations, the distance between the major divisions thereof corresponding to one thousandth of an inch linear travel of the beam or rider, providing means whereby when translating either beam or rider by power, such translation may be rapidly made up to a certain point indicated on either of these dials whereafter power is disconnected and the operation continued by hand to bring the negative to an exact final position.

*Coupler and operating mechanism therefor.*

This mechanism comprises elements manually controllable from the front of the machine, for simultaneously operating the coupling pins 59 to respectively engage and disengage the same, with and from, the slots 58 of the slides 56 of the eccentric links 55 when the axes of slots and pins are properly aligned.

Mechanism is also provided for indicating to the operator that the axes of pins and slides are aligned, which alignment takes place when the movable frame is at initial position, or at rearmost limit of its short movement. This positive recording mechanism is described under the head of "Alignment indicating means for coupler mechanism."

Referring at present to Figures 1, 8 and 26, each coupler pin is mounted in a guide at the rear of the movable frame, and each is pivotally connected by a link 390, to an arm 391, keyed or pinned to the outer end of a horizontal shaft 392 held rotatable in bearings attached to the top of the base 80 of the movable frame. The bearings support the shaft centrally and adjacent each end, and the arms 391, are located adjacent the outer bearings at the outside thereof. At an intermediate portion of the shaft is pinned a bevel gear 393, in mesh with a companion gear pinned to a right angularly disposed shaft 394, rotatably supported in a bearing 395 attached to the base of the movable frame. A collar is pinned to the shaft adjacent the bearing, and gear and collar act to prevent translative movement of the shaft in its bearing. The shaft extends toward, between and beyond the tumbler supporting frame 90 and is slidably and rotatably supported in a bearing 396 bolted to the top of the base frame, intermediate the side walls of the tumbler frame. Slidably keyed to the shaft within a groove formed lengthwise thereof, and held non-translatably centrally of the bearing is a crank arm 397 connected at its outer end by an adjustable link, to a crank arm 398 keyed to a shaft 400, held rotatably in bearings upon the front frame. (See Figure 30.) Keyed to this shaft adjacent the outside of the bearing 401 is a gear segment 402, the teeth of which engage rack teeth of a rod 403, held vertically for translation parallel with and adjacent the clutch actuating rack bar 106. This bar 403 is composed of upper and lower sections relatively laterally offset (see Figure 26). The upper end of the upper member has teeth engaged with those of a relatively long toothed spur gear 404 (see Figures 26, 27, 29). This spur gear is rotatable upon a stub shaft 405, bolted to an upstanding ear integral with a bracket 406 attached to the inner side of the frame. A second rack 407 for rotating the gear 404 lies above the same, has teeth engaged therewith, extends horizontally through an opening in the frame, and is slidable at the inner end in a bearing 408. At the outer end, the rack is held in a guide notch 410, formed in a bracket 411 attached to the outer side of the frame. This bracket (see Figures 26, 27ª), is provided with spaced bearing extensions in which is horizontally rotatably supported a shaft 412, having a spur gear 413, keyed or pinned thereto and in mesh with teeth at the outer end of the rack or bar 407. To this shaft is also pinned the hub of the operating lever 415, which is disposed in vertical alignment with and spaced outwardly from the clutch lever 97. The rack is held in the rectangular guide notch in the upper side of the bracket, and a plate prevents its displacement. When the lever is swung through an arc of 180° from a position shown in Figures 1, 3, 26, the coupler pins 59 are simultaneously fully disengaged from their slides, the shaft having been rotated in counter-clockwise direction for their release. A cover encloses the gear rack, and a lever extends through a vertical slot therein. The levers 97 and 415 swing in vertical planes at right angles to one another.

*Alignment indicating means for coupler mechanism.*

This mechanism is provided, that the operator may know when the axes of the coupler pins are aligned with the axes of the grooves of the slides, in order that in this position the frame may be coupled to its short movement translating mechanism. A positional indicating or recording device is furnished, and also means for adjusting the relation between the coupler-mechanism and this alignment recording mechanism, whereby coordinating adjustment may be obtained, in the preliminary setting of the machine. A mark is provided on the recording dial and a pointer operable by the coupler mechanism lies thereover when the coupling pins are engaged and the movable frame is in initial position. This relation of pointer and mark also indicates that the movable frame is in its initial position, in which position the frame may be either coupled or released from its short movement translating mechanism.

At the outer end of the shaft 400, (see Figures 30, 31, 29), adjacent its outer bearing 400ª, is attached a crank arm 418 normally extending in substantially horizontal position, at the outer end of which arm is a link 419 having an axial screw-threaded socket therein. With the threads of this socket is engaged one end of a threaded and headed adjusting element 420. The head of this element is adapted to engage one element 421 of the recording operating mechanism to provide for certain adjustments between this mechanism and said coupling mechanism.

Pivoted as at 422 to the frame 90 is the lever 421, having a forked head 423 between the arms of which the shank of the adjusting element lies. At the outer end of the lever 421 is pivoted the lower end of a rack bar 425, slidably held in bearings, parallel with the side frame at its inner side and with the bar 106, and having a stop 426 thereon to limit downward movement. The upper end of this bar is provided with rack teeth engaged with the teeth of a spur gear 427. This gear 427 is keyed to a horizontal shaft 428 rotatably mounted in a tubular bearing traversing the frame. At the outer end of this shaft is non-rotatably attached a pointer, or dial finger 429, which rides over an arcuate projection formed within a hollow casing 430. Upon the surface of this projection is a mark 431 which is positioned to correspond to the aligned or coupling position of the pins and slides, when the movable frame is in initial position. The casing is closed by a suitable cover plate having an arcuate opening therein through which the mark is viewed. Adjacent the pivot on the lever 421, intermediate its pivot and the rack bar pivot is pivoted an adjusting link 435 of the turnbuckle type, the lower end of which is pivoted to a cam lever 436 which in turn is pivoted as at 437 to the side frame, and having rotatably disposed at its outer end a roller 438. This roller is engageable with an inclined surface of a casting 439 bolted to the top and at the inner edge of the movable frame.

In setting the device the frame is brought to its quarter inch or initial position, and the pointer is set to coincide with the red line, when the center line of the pins and slides are aligned and ready to be engaged. When the pins and catches are engaged adjustment is made of the element 420, so that the cam roller will clear the top of the cam block, in the present instance by not more than 1/16 of an inch. Whenever the pins are engaged, the upper surface of the forked end of the link engages the head of the adjusting screw and supports the pointer, levers and roller arms. Whenever the pins 59 are released or raised, the adjusting element 420 is raised, gravity acts, the fork 423 travels upwardly, still in engagement with the head, and the roller arm assumes a lower position, the lowermost being that substantially shown in dot-and-dash lines in Figure 30 in which the stop 426 engages the bracket therebelow and prevents further downward movement, the pointer 429 moving to the right. The uppermost setting position is also shown in dot-and-dash lines. When the pins 59 are released by operation of the lever 415, the shaft is rotated in clockwise direction, the adjusting element 420 is raised, and as the movable frame travels away from the tumbler, the pointer moves to the right from the position shown in Figure 30, the movement being due to release of the lever 421, after which this movement is procured as the levers drop by gravity.

The position of the recording mechanism shown in Figure 1 is that obtained during the setting operation, and when the pins are fully engaged.

In operation, as the movable frame travels from inner position towards the tumbler, the pointer 429 travels in clockwise direction away from the mark 431, and on reverse movement the pointer travels in opposite direction and approaches and lies over the mark when the frame is again in initial position wherein pins 59 must be disconnected by throwing lever 415, before clutch opening lever 97 can be thrown to the left to obtain rearward movement of the translatable frame.

*Interlock between movable frame clutch-actuating mechanism, and frame coupling and release mechanism.*

This device is for the purpose of preventing power actuation of the movable frame through its reversing clutch mechanism, when said frame is locked to its short movement translating mechanism. The interlock is provided between elements of the clutch operating mechanism, and coupling operating mechanism. Referring to Figures 26, 27, 27ᵃ and 29, the shaft 108 has at its inner end adjacent the gear 107, a lever 435 keyed thereto. This lever moves with lever 97, functions as an interlock between the mechanisms, and for this purpose has a short diametrically related arm or projection 436, provided with a segment, notched as at 437 in its outer curved surface. As shown in Figure 27 the notch is engageable with and by the rack 407 when the lever is in neutral position, which also corresponds to the neutral position of the clutch member 36. As shown in Figure 26 the lever 97 can only be operated after the lever 415, is thrown through an angle of 180°, at which time the outer end of the rack 407 will be disengaged from the notch 408, and positioned outwardly beyond the plane of rotation of the segment and arm.

This interlock mechanism is simple in structure and the principle can be applied as an interlock between a plurality of actuating racks placed at right angles to one another, one of the racks being translatable by a gear rotatable with the interlock lever. The lever is provided with a spring pressed ball at its outer end engageable with a corresponding socket of the frame to hold the lever in neutral position.

*Timer control circuit.*

The following described electrical control is for the purpose of automatically timing the movement of the movable frame from its one-quarter inch or initial position, toward and away from the sensitized plate, and provides means for accurately timing an exposure period during which the negative is against the sensitized plate.

Means is also provided for preventing over-translation of the movable frame in a rearward direction; over-translation of the beam in each direction; and of the rider in each direction; a series of limit or emergency switches being provided for this purpose and connected in a circuit in such manner that when the switches are closed, deenergization of a motor circuit breaking solenoid or relay is obtained, thus cutting off power to the motor. Referring to the diagram, Figure 48, a motor S, as a source of power is properly connected through the switch K with a suitable outside source. This motor is of a motor-generator type, the detail thereof not being shown herein. Moreover the connections from the generator or side of the motor-generator S to the switch J, for the sake of clarity, are not shown.

For convenience, the circuits will be traced beginning at the positive sides respectively of switches K, J. Two separate circuits are employed, one of 110 volts and the other of 10 volts. From the positive side of the 110 volt circuit at the switch K the switch is connected with that member of the switch Q carried by one of the tumbler side frames, and with the positive electrode of the arc light U. The other element of the switch Q is connected with one terminal of a push button or plunger switch H, and with the trip cam solenoid 45.

The opposite terminal of the switch H is connected with one terminal of the starting solenoid 223, and the opposite terminal of this solenoid is connected with that element of the switch R carried by the movable frame. The opposite terminal of the switch R is connected with the negative terminal of the switch K, and this terminal is also connected to one terminal of the arc-light holding solenoid D. The opposite terminal of this holding solenoid D is connected to one terminal of a switch, adapted to be closed and opened by the solenoid C, and the opposite terminal of the switch is connected to one terminal of a switch normally closed by the armature of an arc-light circuit controlling solenoid E. The opposite terminal of this switch is connected with the negative terminal of the arc-light U. The negative terminal of the switch K is also connected with one terminal of a switch G' controlled by the fast movement solenoids F, G, and the other contact of this switch is connected with one terminal of the fast movement controlling solenoid 210. The opposite terminal of this solenoid 210 is connected with the positive lead from the switch K to the positive electrode of the arc-light U. The negative terminal of the switch K is also connected with one of the switch contacts controlled by the solenoid A, the other contact of which switch is connected to the solenoid 45. This completes the main line or 110 volt circuit connections.

The relay 10 volt control circuit, beginning at the positive terminal of the switch J is connected on that side with the first ring 178 of the timer, and with the spring contact 227 of the timer circuit closing switch. From this lead, also extend leads to one element of each of the switches L, N, O. The opposite terminals of each of these switches L, N, O, are connected in parallel as shown to one terminal of the motor controlling solenoid V. The contact fingers of switches O and P of the beam are connected as shown, and the fingers of the switches M, N, are similarly connected. This positive lead from switch J is also connected with one terminal of a red light T, mounted in view of the operator at the front of the machine, and the opposite terminal of the red light is connected with that element of the switch B carried by the movable frame. The opposite terminal of this switch B is connected with the negative terminal of the switch J. The negative terminal of the switch J is further connected with one terminal of each of the solenoids F, A, V and C, and with one of the terminals of the switch F', closable by the solenoid F, the opposite terminal of this switch being connected with one terminal of the holding solenoid G. One terminal of the solenoid C is connected with the third ring 180 of the timer. One terminal of solenoid A is connected to the second ring 179, and one terminal of the solenoid E to the fourth ring 181. One terminal of the holding magnet G is connected with the contact 226 of the timer control switch, and the other terminal of the solenoid G is connected with the other terminal of the switch F'. The other terminals of solenoids F, E are connected as shown. This completes the 10 volt control circuits.

The operation of the electrical devices, beginning with the movable frame and negative at initial position, is as follows: With the switches K and J closed, and when the push button H is pressed, the 110 volt line is energized, solenoid 223 is tripped, causing clutch 189 to engage and contacts 226, 227 of the timer control switch to close, thus completing a circuit in the 10 volt line. The timer mechanism as herein shown is driven by a separately energized motor 201, but this may be connected with the other circuits if desired. The timer arm now begins to travel, and when the first contact 177 is reached, relay A is momentarily energized and the 110 volt circuit is made through the cam solenoid 45, which releases clutch 40 and allows the same to connect power with the short distance movable frame transmitting mechanism. Through control of the timer mechanism, the frame now starts slowly forward toward the plate, and when the negative properly engages the plate, clutch 40 is mechanically withdrawn and the movable frame motion ceases, with the negative properly engaged and held against the plate. During this movement, switch B is closed and circuit to the red light is made, indicating to the operator that exposure is taking place. Switches R and Q are connected whenever the frame is in its initial position, and thus 110 volt circuits are completed.

When the second contact 175 is reached, relay C is momentarily energized to make the arc-light circuit, and holding relay D thereafter remains energized during exposure period, the length of which is determined by the time of timer arm travel between the contacts 175, 176. When contact 176 is reached, relay E is momentarily energized, relay D is deenergized and the arc-light circuit is broken. At the same time, relay F is energized to close fast movement 110 volt circuit to solenoid 210, and holding relay G maintains this circuit connection. This results in faster movement of the timer arm between contacts 176, 177, and when the last contact 177 is reached, rings 178, 179, are again put in circuit, relay A is again energized, trip cam clutch 40 is released and the power connected with the short movement frame translating mechanism, to move the frame rearwardly to initial position. The timer shaft continues to rotate and eventually the clutch 189 is withdrawn, contacts 226, 227 separate and holding solenoid G is de-energized, breaking 110 volt circuit to the fast moving solenoid 210. These last operations take place when the projections 216 of the cam 215 engage the roller of the lever 224, a complete cycle of the timing mechanism having then been completed.

In case of further translations of either movable frame, beam or rider, the limit or emergency switches L, M, N, O and P come into action, to energize the motor circuit relay B, and to break the motor circuit, after which in order to start the motor again it is necessary to disengage the switch contacts by manually translating either movable frame, beam or rider.

*General operation.*

Referring particularly to Figures 1 and 48, and assuming that the proper adjustments have been made to position the negative for making its first photographic impression on the sensitized plate, the push plunger H is operated, and the timing mechanism started, the movable frame travels towards the sensitized plate from its ¼″ or initial position, the negative is engaged with the plate, and is held so engaged throughout the exposure period. The length of the exposure period, as before stated, is determined by the setting of the contacts 177, 175, 176, 177, of the timer, and after this period the movable frame is returned to initial position. If other images are to be transferred to the plate adjustment is now made of the beam and rider; first by manipulating either of levers 362, 363 manually, or by manipulating either lever 350 or 351 to transmittingly connect these mechanisms with power. Ordinarily the adjustments are made by power to within a short distance of the desired point, after which, as before stated, the negative is brought to its exact position by manipulation of levers 362, 363, and with the visual assistance of the dials 375, 376. After the negative is again properly adjusted, and it will be assumed in this instance that this is the last adjustment for this particular plate, the push plunger is again operated, and the last image photographically transferred. The movable frame again assumes its initial position. The coupler mechanism is now operated through lever 415 to uncouple the movable frame from its short movement mechanism, which uncoupling, is and must be accomplished before the clutch operated by the lever 97 can be thrown, an interlock being provided for preventing such operation of the lever 97 as above described.

The lever 97 is now thrown in counterclockwise direction from its position shown in Figures 1 and 3, by which operation the clutch 36 is thrown in a direction to obtain such rotation of the rack shaft 34 as will translate the movable frame rearwardly, the length of this rearward translation being just short of that which would close the emergency switch L. This movement must be carefully controlled by the operator. If, however, the emergency switch L, should be closed, it will be necessary to open the switch by translating the movable frame manually, a short distance forwardly before the motor S can receive power. The translation of the frame may be obtained either by power, or when the lever 97 is in neutral position through handwheel 94, which is in transmission connection with shaft 23. The translation of the frame rearwardly is for the purpose of permitting rotation of the tumbler which is then turned to an appropriate position wherein the exposed sensitized plate is removed and another plate substituted, after which the tumbler is locked with its ground glass side in opposition to the substituted negative.

The movable frame is brought forward either by hand or by power to its initial position, which initial position is indicated by the pointer coinciding with the red mark of the dial. If this forward movement of the frame is accomplished by power, the lever 97 is moved in clockwise direction, it being noted that the movement of this lever in a certain direction causes translation of the movable frame in corresponding direction. When in initial position, and after lever 97 is returned to neutral position, lever 415 may be manipulated to again couple the frame with its short movement translating mechanism. Levers 350 and 351 are now alternately actuated to bring the edge marks of the negative in opposition to and in alignment with the hair lines 121 and 122 of the ground glasses 116. In this operation the edge marks are made to coincide alternately at the extremities of the horizontally and vertically aligned systems of hair lines. This is the centering operation.

During the successive transfer of the images to the first plate, readings are taken for each position of the negative with respect to the sensitized plate, and these readings are used as guides for successively positioning the substituted negative at successive points on the second plate. This operation is accomplished preferably during the first part by power translation of either beam or rider, and the last part by manual manipulation of the levers 362 and 363. As the negative approaches a given final position the operator may, by watching either of the upper dials, know exactly when the proper openings in either of the plates 364—366 are reached by the point of the plunger 372. It will be understood that both negative and sensitized plate are changed when a different color image is to be photographically transferred. In changing the negative, the negative holder 245 may be removed. During the centering operation the light chamber 275 is removed.

The present machine, as herein constructed, is approximately 11 feet in height, and in order that the operator may be able to conveniently manipulate the various levers, raised platforms are provided surrounding the machine, and stationary platforms 440, 441 are also respectively attached to the movable frame and tumbler supporting frames between the frames. The movable frame also has pivotally attached between its vertical sides and at the outer side of each wall, movable platforms 442, 443 having their projecting portions resting on rollers carried by the tumbler frames, whereby a support is provided between the frames when the movable frame is translated to its rearmost position, this for the purpose of permitting the operator to stand between the frames and make the proper adjustments.

As before stated, by reference to previous dial readings, the positional duplication of images upon any number of printing plates may be obtained so that the photographic color images of one plate will correctly positionally correspond with the color images of each other plate as required for color printing. A systematic accurate method of regularly placing or positioning the negative is thus provided and the apparatus combines in a single organization means for obtaining the above results, and also means for automatically moving the negative to printing position, maintaining the same in such position during exposure period and retracting the negative after exposure. The machine further provides means for spacing with micrometric accuracy, and eliminates the necessity for transfer of the plates or negative from one device or apparatus to another.

Having described my invention, I claim:

1. In a centering device in combination with means for supporting a negative, a frame supporting on its opposite faces in parallelism respectively translucent plates and a sensitized plate, said frame symmetrically rotatable for alternately opposing said plates to the negative, means for positionally adjusting the negative relative to the plates, mechanism for translating the negative supporting means from a given point toward and away from the frame in predetermined degree, means for connecting and disconnecting the negative supporting means respectively with and from the translating mechanism at the predetermined point, and mechanism for timing periods of movement of said translating mechanism in reverse directions and between movement periods.

2. In a centering machine, a translatable frame having means for supporting a marked negative, a tumbler having upon opposite sides respectively a translucent marked plate and a sensitized plate, means for rotating said tumbler for alternately bringing the plates in opposition to said negative, means for universally micrometrically adjusting said negative in a plane parallel to the plates, mechanism for moving said translatable frame toward and away from the tumbler in predetermined degree, and mechanism for timing movements of said translating mechanism, and dwell thereof between movements with the negative engaged against the sensitized plate of the tumbler.

3. In a centering machine, a translatable frame, having negative plate holding and adjusting means thereon, a tumbler adapted for supporting upon opposite sides, respectively, a translucent marked plate and sensitized plate, in opposition to said negative, means for micrometrically universally adjusting said negative in the plane parallel to the plates, mechanism for translating said frame from a given point to bring said negative toward, against and away from a tumbler face in predetermined degree, means for connecting and disconnecting said frame respectively with and from said translating mechanism at the point, means for positionally recording the connecting position of the frame, and mechanism for timing movements of said translating mechanism in reverse directions, and between movement periods, while the frame is positioned for engaging the negative with the sensitized plate of the tumbler.

4. In a centering machine, a translatable frame, having negative plate holding and adjusting means thereon, a tumbler adapted for supporting upon opposite sides respectively a translucent marked plate and a sensitized plate, means for rotating said tumbler for alternately bringing the plates in opposition to the negative, means for micrometrically universally adjusting said negative in planes parallel to the plates, means for micrometrically adjusting the negative toward and away from the tumbler, mechanism for translating said frame from a given point, to bring the negative toward, against and away from a tumbler face, in predetermined degree, means for connecting and disconnecting said frame respectively with and from said translating mechanism at the point, means for positionally recording the connecting position of the frame, and mechanism for timing movements of said translating mechanism, in reverse directions, and between movement periods while the frame is positioned for engaging the negative with the sensitized plate of the tumbler.

5. In a device of the class described, a translatable negative carrier frame, a tumbler toward and away form which said frame is adapted to move, mechanism for translating said frame from a given point toward and away form said tumbler in predetermined and exact degree, latch means for connecting and disconnecting said frame respectively with and from said translating mechanism, for allowing translation of said frame independently of the translating mechanism, means for positionally recording the latching position of the frame relative to the translating mechanism, and mechanism for timing movement periods of said translating mechanism in reverse direction and between movement periods.

6. In a device of the class described, a translatable frame for supporting a negative, a tumbler toward and away from which said frame is adapted to move, a first power controlled means for translating said frame forwardly to a given point spaced from the tumbler and retracting the frame from said point, a second power controlled means for translating said frame forwardly of the point toward the tumbler in micrometric degree, and retracting the frame to the point, means for coupling the frame to said second translating means for coupling said frame to said second translatable means, means for positively and positionally recording the connecting position of the frame with said second power controlled means, and mechanism for timing the movements of said second power controlled means in reverse directions and between movements, whereby the frame may be advanced to the given point connected with the second power controlled means for further advancement toward the tumbler by the other power controlled means, and returned to the coupling point.

7. In a device of the class described, a translatable negative carrier frame, a double-faced tumbler adapted to support in parallelism a centering plate and a sensitized plate at relatively opposite sides of the tumbler, a first power controlled means for translating the frame forwardly to a given point spaced from the tumbler, and retracting the frame from the point, a second power controlled means for translating said frame forwardly of the point toward the tumbler in micrometric degree and retracting the frame to the point, means for coupling the frame to said second translating means precisely at the point, means for positionally and positively recording the connecting position and positively recording the connecting position of the frame with said second power controlled means, and mechanism for timing the apparatus of said second power controlled means in reverse directions and between movements when the negative is engaged with the sensitized plate, whereby the frame may be advanced to the given point connected with the second power controlled means for further advance toward and against the tumbler in predetermined micrometric degree, held thereagainst for a predetermined period and withdrawn and returned to the coupling point.

8. In a machine of the class described, a tumbler, a negative supporting frame translatable toward and away from the tumbler, a first power means for independently translating said frame in reverse direction toward and away from a point spaced from the tumbler, a second power means for independently translating said frame in reverse directions forwardly of said point and between said point and the tumbler in micrometric degree, means for coupling said power translating means to the frame at the predetermined point, and means for preventing operation of said first power translating means when said coupling means is in coupling position.

9. In a centering machine, a translatable negative carrier frame having negative holding and adjusting means thereon, supporting a marked negative, a stationary frame supporting a photographically sensitized plate, a first power controlled mechanism for translating the negative carrier toward and away from a given point spaced from the stationary frame, a second power controlled mechanism for translating the frame forwardly of said point toward the sensitized plate in micrometric degree, to bring the negative toward, against and away from the sensitized plate, retracting the frame to the point, means for coupling the frame to the second translating mechanism at the point, means for controlling the operation of said first power controlled mechanism, means for controlling the coupling means, and interlock mechanism for preventing operation of the controller for the power means, when the coupler control means is in coupling position.

10. In a device of the class described, a tumbler, a negative supporting frame translatable toward and away from said tumbler, first power mechanism for translating said frame in reverse directions toward and away from a point spaced from said tumbler, second power mechanism for translating said frame in reverse directions away and toward the point, between the point and the tumbler, means for coupling said second power translating means to the frame at the predetermined point including a coupler operating lever, a power shaft, a reversing clutch for transmittably connecting the first power translating means with said power shaft, means for operating said clutch including a clutch operating lever swingable in a plane at right angles to said first mentioned lever, and means for interlocking said levers to prevent operation of said reversing clutch operating lever, when said coupling operating lever is in coupled position.

11. In a device of the class described, a tumbler a negative supporting frame translatable toward and away from said tumbler, power means for translating said frame in reverse directions toward and away from a predetermined point spaced from said tumbler; a second power means for translating said frame in reverse directions at the opposite side of the point toward and away from the tumbler between the point and the tumbler in micrometric degree, means for coupling said second power translating means with said frame at said predetermined point including an operating lever, a power shaft, a reversing clutch for transmittably connecting the first power transmission means with said power shaft, means for operating said clutch including a lever, and interlock means intermediate of and operable by said levers for preventing operation of said reversing clutch operating lever, when said coupling operating lever is in coupling position.

12. In a centering device in combination with means for supporting a negative, a frame supporting on its opposite faces in parallelism respectively a translucent plate and a sensitized plate, said frame symmetrically rotatable for alternately opposing said plates to the negative, means for positionally adjusting said negative relative to the plates, mechanism for translating said negative supporting means from a predetermined point, toward and away from said frame in predetermined degree, means for connecting and disconnecting said negative supporting means respectively with and from said translating mechanism, at the predetermined point, and electrically controlled mechanism for timing periods of movement of said translating mechanism in reverse directions, and between movement periods.

13. In a centering device, a translatable negative carrier frame, having a diametric edge-marked negative thereon, means for micrometrically adjusting said negative universally in one plane, a centrally pivoted double-faced frame having parallel faces respectively providing supports for diametrically related linear systems of ground glass, having aligned systems of cross lines thereon, and a photographically sensitized plate, means for rotating said frame for alternately opposing said ground glass and sensitized plate to said negative, means for recording the positional relations of said negative with said glass and plate, said means in fixed operable relation to the movements of said negative, mechanism for translating said carrier frame toward and away from said double-faced frame in predetermined and exact degree, and means for connecting and disconnecting said frame respectively with and from said translating mechanism.

14. In a centering device, a translatable negative carrier frame, having a diametric edge-marked negative thereon, means for micrometrically adjusting said negative universally in one plane, a centrally pivoted double-faced frame having parallel faces respectively providing supports for groundglass, having right angularly related diametric cross lines thereon, and a photographically sensitized plate, means for rotating said frame for alternately opposing said ground-glass and sensitized plate to said negative, means for recording the positional relations of said negative with said glass and plate, said means in fixed operable relation to the movements of said negative, mechanism for translating said carrier frame to move the negative from a predetermined point spaced from said double-faced frame toward, against and away from a face of said double-faced frame in predetermined degree, means for connecting and disconnecting said frame respectively with and from said translating mechanism, at the predetermined point, and electrically controlled mechanism for timing periods of movements of said frame translating mechanism in reverse directions and between movement periods, when the negative is against a face of said double-faced frame.

15. In a centering device, a movable frame, having thereon negative holding and adjusting means, having an index-marked negative attached thereto, a tumbler having parallel faces at opposite sides, respectively supporting a translucent plate provided with cross lines and a photographically sensitized plate, said tumbler symmetrically rotatable to bring respective plates in opposition to said negative, means for adjusting the marks of said negative for registration with said cross lines, mechanism releasably connected with said movable frame for translating said frame toward and away from the tumbler faces in predetermined degree, and mechanism for timing periods of movement of said frame translating mechanism in reverse directions and between movement periods.

16. In a centering device, the combination with an index-marked negative, a frame, having means thereon for supporting and micrometrically universally adjusting said negative in one plane, a tumbler of box-like configuration, providing means on opposite sides for securing in parallel relation respectively, translucent diametrically related system of plates having linearly related systems of lines thereon, and a sensitized plate, means for bringing the translucent and sensitized plate alternately in opposition to said index-marked negative, auxiliary means for micrometric adjustment of the index-negative in two planes at right angles to one another for registration of the index marks with said cross line, mechanism for translating said negative carrier frame toward and away from the tumbler faces in predetermined degree from a point spaced from said tumbler, means for connecting and disconnecting said frame respectively with and from said translating mechanism, means for positionally recording the connecting position of the frame relative to the translating mechanism, and for timing periods of movements of said translating mechanism in reverse directions, and between movement periods while the negative is in contact with one of the tumbler faces.

17. In a centering device, the combination with an index-marked transparent plate, of a frame having means thereon for supporting and micrometrically universally adjusting said plate in one plane, a tumbler of box-like configuration having on opposite sides in parallel relation respectively, a marked translucent plate having cross lines thereon, and a sensitized plate, means for bringing the translucent and sensitized plate alternately in opposition to said index-marked plate, auxiliary means for universally micrometrically adjusting the index-marked plate in three planes at right angles to each other to register the index marks with the cross lines, mechanism connected with the frame for translating said negative carrier frame and negative toward and away from the tumbler faces in predetermined exact degree, and electrically controlled mechanism for timing periods of movements of said translating mechanism in reverse directions between movement periods and when the negative is in contact with one of the tumbler faces.

18. In a centering machine, a translatable negative carrier frame, having negative holding and adjusting means thereon, a tumbler symmetrically rotatable, supporting on opposite sides respectively, a translucent marked plate and a sensitized plate, means for micrometrically and universally adjusting said negative in plane parallel with the tumbler faces, a first power controlled mechanism for translating the negative carrier frame forward to a given point and for retracting the frame from said point, a second power controlled mechanism for translating the frame forwardly of said point at the opposite side thereof in micrometric degree, between the point and said tumbler and for retracting the frame to said point, means for coupling said frame to said second translating means at the point including operating lever, a power shaft, a reversing clutch for transmittingly connecting said first translating means with said power shaft including a lever, and an interlock mechanism between said levers for preventing operation of said reversing clutch operating lever when said coupler means is engaged with said second power controlled frame translating means.

19. In a centering machine, a translatable negative carrier frame, a tumbler for supporting a sensitized plate, a first mechanism for translating the frame forwardly from and rearwardly to a point spaced from the tumbler between the point and said tumbler, a second mechanism for translating the frame at the opposite side of the point to and away therefrom, a clutch for connecting the second translating mechanism with the power, means for controlling the clutch including a terminal rotatable shaft, means for coupling the frame to the translating mechanism at the point, including a terminal slidable rack parallel with and adjacent said terminal rotatable shaft, and a segment rotatable with the shaft having a notch engaged with the rack to prevent rotation of the shaft from a position which corresponds to a neutral position of the clutch, said rack adapted to be withdrawn from said notch when the coupling means is operated and is disconnected from the frame.

20. In a device of the class described, a translatable frame adapted for supporting a negative, a tumbler toward and away from which the frame is adapted to move, a first power operating mechanism for translating the frame away from and back to the predetermined point spaced from the tumbler between the point and the tumbler, a second mechanism for translating the frame at the opposite side of the point to and away therefrom, means for coupling said first translating mechanism with the frame at the point, said means terminating in a translatable rack, a clutch for connecting power with the second translatable mechanism, means for operating the clutch including a terminal rotatable shaft parallel with the terminal rack, said shaft having a circular segmental projection having a rectangular notch in its periphery engaged with the rack when the rack is at one of its translation limits corresponding to a coupled position of the coupling mechanism, and adapted to be withdrawn from the notch and out of the rotative plane of the segmental projection when the coupling mechanism is in uncoupled position, whereby when the coupler mechanism is in uncoupling position the clutch control mechanism cannot be moved from neutral position.

21. In a device of the class described, a translatable frame, a first power operated mechanism for translating the frame toward a point spaced from the tumbler, including a transmission clutch and means for operating the same, including a rotatable shaft, a second power operated mechanism for continuing frame translation from the point toward the tumbler, means for coupling the second mechanism to the frame at the point including a rack adjacent said terminal shaft, a segment upon the shaft having a notch engaged with said rack when the position of the rack corresponds to coupled position of the coupling means, said rack adapted to be withdrawn from and clear of the notch when the coupling means is disconnected from the frame, permitting the shaft to be rotated to transmittably connect the clutch.

22. In a device of the class described, a negative carrier frame, a tumbler toward and away from which said frame is adapted to move, a first power controlled mechanism for translating said frame forwardly to a given point and for retracting the frame from said point, including a reversing clutch mechanism having a reverse clutch member, mechanism for operating said reversing clutch member, terminating in a translatable rack, a second power controlled mechanism for translating the frame forwardly of said point at opposite sides thereof in micrometric degree in reverse directions, means for coupling said frame to said second translating mechanism at the point, said means terminating in a translatable rack, a shaft having a gear thereon, a coupler operating lever for rotating the shaft, a second shaft having a gear thereon, in mesh with the rack of said first power controlled mechanism and having a segmental projection with a peripheral notch therein, said second lever disposed with its axis at a right angle to the axis of said first mentioned shaft, a clutch operating lever for rotating said second shaft, a gear on said second shaft connected with the terminal rack of said clutch operating means, a third rack translatable by said first gear parallel to the axis of said second shaft and adapted to intercept the rotative plane of said segment, to lie within said notch when said coupling lever is in coupling position and when said clutch operating lever is in neutral position and to be withdrawn from said notch and out of the rotative plane of the segmental projection when said coupling lever is in non-coupling position, and a gear transmittably connected with said rack of said coupler operating mechanism, whereby when the coupler operating lever is in coupling position, the first power controlled mechanism can be activated and whereby when the clutch controlled lever is in other than neutral position said segmental projection lies in the path of translation of said rack to prevent coupling of said frame to the second power controlled mechanism.

23. An interlock mechanism for preventing simultaneous operation of two independently operable control mechanisms including a translatable rack for operating the first control mechanism, a rotatable shaft for operating the second control mechanism, said shaft and rack disposed in parallel relation and said shaft having a segmental projection having a notch engaged with said rack for preventing shaft rotation when said rack is in a position corresponding to an active condition of one of the control mechanisms, said rack adapted to be withdrawn from the notch and beyond the rotative path of said segment when translated to a position corresponding to an inactive position of one of the control mechanisms, whereby when the rack is at one translative limit the shaft is locked against rotation and whereby when at the other limit the said shaft may be freely rotated.

24. In a machine of the class described, a tumbler, negative supporting means universally adjustable in one plane relative to the tumbler faces in micrometric degree, mechanism for adjusting said negative supporting means manually and by power, including a power operable negative support transmitting shaft, a reversing clutch mechanism for obtaining reverse rotative movement of said shaft, a dial independently mounted adjacent said shaft, having a series of openings concentric with the axis of the shaft, a setting handle rotatable upon said shaft, adapted to be locked in any opening of the dial, a clutch element translatable upon said shaft, adapted for locking the handle to said shaft, for rotating the shaft, a lever for operating said reversing clutch, having an extension, an element for translating said handle-locking clutch to locking and unlocking positions, having a notch position for engagement by the extension of said reversing clutch operating lever when the same is in neutral position, and when said locking clutch is in clutched position, and means in transmission connection with said transmitting shaft for positionally recording the movements of the negative supporting means, whereby when said reversing clutch lever is moved in either direction from its neutral position, said handle clutch will be disengaged from the handle before the reversing clutch reaches either of its clutching positions, whereby the said handle can remain in said engagement with a dial opening while the shaft is being power operated.

25. In a machine of the class described, an adjustable double faced tumbler, negative supporting means universally adjustable in respect to the tumbler faces in micrometric degree, mechanism for adjusting said negative supporting means manually and by power, including a power operable negative support transmitting shaft, a reversing clutch for obtaining reverse rotation movement of said shaft, including a slidable double clutch member shiftable in alternate directions from a neutral position for obtaining such reverse movements, a dial independently mounted, having a series of openings therein, a handle rotatable upon said shaft, adapted to be set and locked in any one of the openings of said dial, a clutch element translatable upon said shaft, adapted for locking said handle to said shaft for rotating the shaft, a lever operatively connected with said reversing clutch, having an extension, a rock lever for translating said handle-locking clutch to locking and unlocking positions, having a notch positioned for engagement by the extension of said reversing clutch operating lever when the same is in neutral position, when said handle-locking clutch is in clutch position, whereby when said reversing clutch lever is moved in either direction from its neutral direction, said handle clutch will be disengaged before the reversing clutch member reaches either of its clutching positions, and whereby the said setting handle can remain in set engagement with the dial while the shaft is being power operated.

26. In a device of the class described, a tumbler, a frame movable towards and away from the tumbler, a beam translatable vertically upon said frame, a rider upon said beam adapted to support a negative and translatable crosswise of the beam, common power mechanism for translating said beam and rider, hand operable shafts respectively for beam and rider, independent reversing clutch mechanism for transmittably connecting respective shafts with beam and rider, dials having circular rows of spaced openings therein, a handle rotatable upon each shaft, each handle adapted to be locked in any one of the openings of corresponding dials, a clutch upon each shaft engageable with its handle for locking the same to the shaft for manual rotation of the shaft, a lever for controlling each reversing mechanism, having an extension, a pivoted lever for translating said handle locking clutch providing a curved surface disposed substantially concentric with the pivot of said reversing clutch operating lever, said surface having a notch engageable by the extension of said lever when said handle clutch is clutched to said lever and when said reversing clutch control lever is in neutral position, whereby when said clutch reversing lever is moved in either direction said handle clutch will be disengaged before the reversing clutch mechanism reaches either of its clutch positions.

27. In a device of the class described, a tumbler, a frame movable towards and away from the tumbler, a beam vertically translatable upon said frame in reverse directions, a rider upon the beam adapted to support a negative and having means thereon for universally adjusting the negative in a plane parallel to the tumbler faces, said rider translatable crosswise of the beam, common power mechanism transmittably connectible with said beam and rider, independent handle operable shafts respectively for beam and rider, independent reverse clutch mechanisms for transmittably connecting said common power mechanism with said shafts, dials having circular rows of spaced openings therein, a handle rotatable upon each shaft and adapted to be locked in any of the openings of corresponding dials, a clutch upon each shaft engageable with its handle for locking the handle to the shaft to obtain a manual rotation of the shaft, a lever for controlling the clutch element of each reversing mechanism, having an extension, a lever for translating said handle-locking clutch, having a notch engageable by the extension of the lever when said clutch is clutched to the lever and when said reversing clutch control lever is in neutral position, whereby, when said clutch reversing lever is moved in either direction, said extension in disengaging from the notch, translates said handle clutch and disengages the same from the said handle before the clutch mechanism is activated.

28. In a machine of the class described, an adjustable tumbler, negative supporting means universally adjustable in one plane relative to the tumbler faces in micrometric degree, mechanism for adjusting said negative support manually and by power, including a power operable negative support transmitting shaft, a reversing clutch for obtaining reverse rotative movements of said shaft, a dial independently mounted adjacent said shaft, and having a series of openings therein, a handle rotatable upon said shaft, adapted to be locked in an opening of said dial, a clutch element translatable upon said shaft, adapted for locking the said handle to said shaft for rotating the shaft, a lever operatively connected with said reversing clutch, having an extension, an element for translating said handle-locking clutch to locking and unlocking positions, having a notch positioned for engagement by the extension of said reversing clutch operating lever when the same is in neutral position, and when said handle-locking clutch is in clutched position, whereby when said reversing clutch lever is moved in either direction from its neutral position, said handle clutch will be disengaged from the handle before the reversing clutch reaches either of its clutching positions, and whereby the said handle can remain in set engagement with the dial while the shaft is being power rotated.

29. In a machine of the class described, an adjustable double-faced tumbler, negative supporting means universally adjustable in respect to the tumbler faces in micrometric degree, mechanism for adjusting said negative support manually and by power, including a power operable negative support transmitting shaft, a reversing clutch for obtaining reverse rotative movements of said shaft, including a slidable double clutch member, shiftable in alternate directions from a neutral position for obtaining said reverse movements, a dial independently mounted having a series of openings therein, a handle rotatable upon said shaft, adapted to be set and locked in any one of the openings of said dial, a clutch element translatable upon said shaft, adapted for locking the said handle to said shaft for rotating the shaft, an independently pivoted lever operatively connected with said reversing clutch having an extension, a rock lever for translating said handle-locking clutch to locking and unlocking positions, providing a curved surface, substantially concentrically related to the axis of said reversing clutch operating lever, said surface having a notch positioned for engagement by the extension of said reversing clutch operating lever when the same is in neutral position, and when said handle locking clutch is in clutched position, whereby when said reversing clutch lever is moved in either direction from its neutral position, said handle clutch will be disengaged before the reversing clutch member reaches either of its clutching positions, and whereby the said handle can remain in set engagement with the dial while the shaft is being power rotated.

30. In a machine of the class described, an adjustable tumbler, negative supporting means, universally adjustable in one plane relative to the tumbler faces in micrometric degree, mechanism for adjusting said negative supporting means manually and by power, including a power operable negative supporting transmitting shaft, a reversing clutch mechanism for obtaining reverse rotative movement of said shaft, a dial independently mounted adjacent said shaft, having a series of openings concentric with the axis of the shaft, a setting handle rotatable upon said shaft, adapted to be locked in any opening of the dial, a clutch element translatable upon said shaft, adapted for locking the handle to said shaft, for rotating the shaft, a lever operatively connected with said reversing clutch, having an extension, an element for translating said handle-locking clutch to locking and unlocking positions, having a notch positioned for engagement by the extension of said reversing clutch operating lever when the same is in neutral position, and when said locking clutch is in clutched position, and means in transmission connection with said transmitting shaft for positionally recording the movements of the negative supporting means, whereby when said reversing clutch lever is moved in either direction from its neutral position, said handle clutch will be disengaged from the handle before the reversing clutch reaches either of its clutching positions, whereby the said handle can remain in said engagement with a dial opening while the shaft is being power operated.

31. In a device of the class described, an independently mounted dial, having a circular row of spaced openings therein, a transmitting shaft, reversing clutch mechanism operable for connecting power with, disconnecting power from, and obtaining reverse rotations of the shaft, a handle rotatable upon said shaft and adapted to be locked in any one of the openings, a clutch upon said transmitting shaft, slidable and adapted for locking the handle for rotation with the shaft, a lever operatively connected to said reversing clutch mechanism, having an extension, a lever for translating said handle-locking extension having a notch engageable or engaged by the extension of said reversing clutch lever when said handle-locking clutch is operative, and when said reversing clutch lever is in non-clutching position, whereby the shaft can be operated by the handle when reversing clutch member is in inoperative position, and whereby when said reversing clutch member is moved to clutch position, said handle-locking clutch will be disengaged before said reversing clutch mechanism reaches clutch position.

32. In a device of the class described, a tumbler adapted for symmetrical rotation about an axis, comprising a hollow rectangular box-like casing open at one side of greatest area and closed at the opposite side to provide a plane face, means for securing a plate upon the plane face, a series of translucent plates attached at the opposite side of the tumbler, comprising two linear systems arranged at right angles to one another substantially on the axes of the tumbler, each plate having marked thereon a line and the lines of each system collinear and forming systems of broken lines lying substantially along the axes of the tumbler with the surfaces of all slides in the same plane, and that plane parallel with the opposite face of the tumbler, and means within the tumbler for illuminating the plates.

33. In a device of the class described, a tumbler adapted for symmetrical rotation about an axis, comprising a hollow rectangular box-like casing open at one side of greatest area and closed at the opposite side to provide a plane face, means for securing a plate upon the plane face, a series of supports attached to the opposite face of the tumbler, having grooves therein, translucent plates removably attached within said grooves, comprising two linear systems arranged at right angles to one another substantially on the axes of the tumbler, each plate having marked thereon a line and the lines of each system collinear and forming systems of broken lines lying substantially along the axes of the tumbler with the surfaces of all slides in the same plane, and that plane parallel with the opposite face of the tumbler, and means within the tumbler for illuminating the plates.

34. In a device of the class described, a tumbler adapted for symmetrical rotation about an axis, comprising a hollow rectangular box-like casing open at one side of greatest area and closed at the opposite side to provide a plane face, means for securing a plate upon the plane face, a series of plates at the opposite side of the tumbler having dove-tail grooves therein, said plates attached at the opposite side of the tumbler comprising two linear systems arranged at right angles to one another substantially on the axes of the tumbler, each plate having engaged with its groove a translucent glass having marked thereon a line and the lines of each system of glasses collinear and forming systems of broken lines lying substantially along the axes of the tumbler with the surfaces of all slides in the same plane, and that plane parallel with the opposite face of the tumbler.

35. In a device of the class described, a pair of spaced frames, a shaft journaled upon the frames, a tumbler symmetrically mounted upon the shaft for rotation therewith, having faces at opposite sides for respectively supporting ground glasses, and a sensitized metal plate, in parallel relation, gearing connected with the shaft for rotating the same, to dispose the tumbler faces in predetermined position, a tubular support attached to one of the frames having a longitudinal key-way therein and threaded exteriorly at one end, a gear rotatably mounted upon said shaft and having a longitudinal key-way therein, said gear being a terminal element of said tumbler rotating gearing and having its longitudinal key-way registerable with the first mentioned key-way, a tumbler rotating wheel keyed to said sleeve, mechanism for locking the tumbler in predetermined position, including a terminal link, a rod traversing said tubular support rotatable and translatable therein, and connected with said link, a hand wheel having threaded connection with the threads of said support, and swiveled to said rod, a key swiveled to said rotatable member adapted to be guided by one of said key-ways and to enter both key-ways when said ways are registered, and having a broadened portion adapted to bridge the key-ways and lock said gear non-rotatably to said support, when said hand wheel is rotated and advanced sufficiently to bring said locking mechanism to locked position, whereby strain upon the tumbler rotating mechanism is prevented by the attempt to operate said mechanism when said tumbler is locked.

36. In a device of the class described, a pair of spaced frames, a shaft journaled crosswise between and upon the frames, a box-like casing mounted upon and in symmetrical relation to the shaft axis for rotation therewith, and having faces at opposite sides for respectively supporting ground glasses, and a sensitized metal plate, in parallel relation, gearing connected with the shaft for rotating the same, a tubular support attached to one of the frames having a longitudinal key-way therein and threaded exteriorly at one end, a gear rotatably mounted upon said shaft and having a longitudinal key-way therein, a tumbler rotating wheel keyed to said sleeve, said gear being the terminal gear of the tumbler rotating means and said sleeve having a longitudinal key-way therein registerable with the first mentioned key-way, mechanism for locking the tumbler in predetermined position including a terminal link, a rod traversing said tubular support rotatable and translatable therein and connected with said link, a rotatable member having threaded connection with the threads of said support and swiveled to said rod, a key swiveled to said rotatable member adapted to enter said key-ways when registered and having a broadened portion adapted to bridge the key-ways and lock said gear non-rotatably to said support when said rotatable element is rotated and advanced to bring said locking mechanism to locked position, whereby strain upon the tumbler rotating mechanism is prevented by the attempt to operate said mechanism when said tumbler is locked.

37. In a device of the class described, an interlock for preventing simultaneous actuation of two mechanisms, comprising a tubular support having a longitudinal key-way therein and threaded exteriorly at one end, a gear rotatably mounted upon said shaft, having a longitudinal key-way therein, and in transmission connection with one mechanism, an operating wheel keyed to said sleeve, said longitudinal key-ways registerable to form a socket, a link for operating another mechanism, a rod traversing said tubular support rotatable and translatable therein and connected with said link, a second hand wheel having threaded connection with the threads of said support and swiveled to said rod, a key swiveled to said rotatable member adapted to enter said keyways when registered and having a broadened portion adapted to bridge the keyways and lock said gear non-rotatably to said support when said rotatable element is rotated and advance to actuate the second mechanism whereby said gear cannot be rotated when said key is in advanced position.

38. In a device of the class described, a tumbler, a frame having thereon means for universally adjusting a negative in a plane parallel with the tumbler faces, a first power controlled means for translating the frame forwarded to a given point spaced from the tumbler and for retracting the frame from said point, a second power controlled means for translating the frame forwardly of said point at the opposite side thereof in micrometric degree and for retracting the same to said point, and means for independently adjusting said negative carrying means toward and away from said tumbler faces in micrometric degree whereby compensation or allowance may be made for differing thicknesses of negatives, to cause the outer face of the negative to be maintained in certain spaced relation to the tumbler faces when the frame is positioned at the given point.

39. In a device of the class described, a tumbler, a frame having thereon means for universally adjusting a negative in a plane parallel with the tumbler faces, a first power controlled means for translating the frame forwarded to a given point spaced from the tumbler and for retracting the frame from said point, a second power controlled means for translating the frame forwardly of said point at the opposite side thereof in micrometric degree and for retracting the same to said point, and means for independently adjusting said negative carrying means toward and away from said tumbler faces in micrometric degree and recording such adjustment whereby compensation or allowance may be made for differing thicknesses of negatives to cause the outer face of the negative to be maintained in certain spaced relation to the tumbler faces when the frame is positioned at the given point, and whereby such adjustment is registered.

40. In a device of the class described, a tumbler, a frame movable toward and away from the tumbler, having thereon means for universally adjusting a negative in a plane parallel with the tumbler faces, a first means for translating the frame forwarded to a given point, spaced from the tumbler, and for retracting the frame from said point, a second means for translating the frame forwardly of said point at the opposite side thereof in micrometric degree and for retracting the same to said point and means for independently adjusting said negative carrying means relative to said frame, toward and away from said tumbler faces in micrometric degree whereby compensation or allowance may be made for differing thicknesses of negatives to cause the outer face of the negative to be maintained in certain spaced relation to the tumbler faces when the frame is positioned at the given point.

41. In a device of the class described, a rotatable tumbler, having opposite plane faces in parallelism, a frame movable toward and away from said tumbler, a beam vertically translatable upon said frame, a rider transversely translatable upon said beam, a negative carrier slidable upon said rider toward and away from said tumbler independently of the movement of said movable frame, a screw shaft rotatable upon said rider, a nut upon said negative carrier having threads engaged with said screw, means for rotating said screw for adjusting the rider and negative carrier relative to one another, a dial rotatable upon said negative carrier having a gear thereon, a stationary pointer adjacent said dial, a lever pivoted to said negative carrier having rack teeth engaged with said gear, and having rack teeth adjacent its pivot, and a rack attached to said rider engageable with the second set of teeth of said lever whereby adjustment of negative carrier frame, and rider toward and away from said tumbler may be obtained in micrometric degree, and whereby such adjustment is registerable by dial and pointer as a recording means permitting the adjusted relations of carrier and rider to be duplicated.

42. In a machine of the class described, a tumbler, a frame movable toward and away from said tumbler, means connected with said movable frame for translating the same in reverse directions toward and away from said tumbler in predetermined degree, said means including a power shaft, a clutch element thereon, a driven shaft having a cam clutch element thereon, having a circumferential cam groove, means for urging the clutch toward the first mentioned clutch member, a solenoid having a plunger adapted when engaged with the groove of said clutch member to withdraw the same from engagement with the companion clutch member, a second driven shaft parallel with said first driven shaft in geared connection therewith, a disk keyed to said second driven shaft, a link mounted upon said disk for oscillation thereby, said link connected with said frame, a cam keyed to said second shaft having diametrically related peripheral projections, and independently pivoted spring retractable lever engageable by said projections and oscillatable thereby, a slide member connected with said lever and adapted to hold the plunger in upper position during rotation of said cam between projections, and electrically controlled timing means for periodically energizing said solenoid to raise said plunger.

43. In a machine of the class described, a stationary frame for supporting a photographically sensitized plate, a frame for supporting a negative translatable toward and away from said stationary frame, translating mechanism connected with said movable frame for moving the same in reverse directions including a transmission clutch, a solenoid having a plunger engageable with said clutch and adapted to release the same for transmission connection when said solenoid is energized and having its plunger adapted to withdraw the clutch when engaged therewith, a timer mechanism for timing the operation of the solenoid plunger, and a driving mechanism for actuating said timer.

44. In a machine of the class described, a stationary frame for supporting a photographically sensitized plate, a frame for supporting a negative translatable toward and away from said stationary frame, translating mechanism connected with said movable frame for moving the same in reverse directions including a transmission clutch adapted to release said transmission clutch for transmission connection when said solenoid is energized, and having its plunger adapted to engage and withdraw the clutch when engaged therewith, a timer mechanism for timing the operation of the solenoid plunger, a driving mechanism for actuating said timer including an electrically operable speed mechanism, a clutch for connecting said speed change with said timer mechanism, an arm for operating said clutch, an electrical switch operated by said arm acting when closed to obtain current through said timer mechanism, means for tripping said lever to engage the clutch and close said switch for cyclic operation of said clutch solenoid, and electrical devices in circuit connection with said solenoid and switch for tripping said lever to engage the clutch, causing the switch to initiate the timer operation and thereafter successively re'ease the clutch for power transmission operation, to bring the movable frame toward the stationary frame, causing a dwell of the same in forward position, return the frame to starting point, clutch disengagement and opening of said switch.

45. In a machine of the class described, a tumbler, a frame movable toward and away from said tumbler, means connected with said movable frame for translating the same in reverse directions toward and away from said tumbler in predetermined degree, said means including a power shaft, a clutch element thereon, said cam having a circumferential groove, means for urging the clutch toward the first mentioned clutch member, a solenoid having a plunger adapted when engaged with said clutch member to withdraw the same from engagement with the companion clutch member, a second driven shaft in geared connection therewith, concentric disks keyed to said second driven shaft, links mounted upon said disks for oscillation thereby, said links connected with said frame, a cam keyed to said second shaft having diametrically related peripheral projections, and independently pivoted spring retractable lever engageable by said projections and oscillatable thereby, a slide member connected with said lever and adapted to hold the plunger in upper position during rotation of said cam between projections and electrically controlled timing means for periodically energizing said solenoid to raise said plunger.

46. In a device of the class described, a tumbler, a negative supporting frame movable toward and away from the tumbler, a power shaft, a clutch element thereon, a driven shaft, a clutch element slidable thereon having a circumferential cam groove adapted for translating the element, means for positively urging the element in one direction for clutching engagement, a solenoid having a plunger adapted for engagement with and disengagement from the groove of the said clutch for withdrawing and releasing the clutch, a second driven shaft in geared connection with the first shaft, disks keyed to the second driven shaft, links mounted upon each disk for oscillation thereby, a disk keyed to said second shaft, having diametrically related peripheral radial projections, an independently pivoted spring retractable lever, engageable by said projections and oscillatable thereby, a slide member connected with said lever and adapted to hold the solenoid plunger in disengaged position during rotation of said disks at points between the projections, said frame coupled to the links, whereby the frame may be urged toward and away from the tumbler in predetermined and exact degree and caused to dwell at one of its positional limits.

47. In a device of the class described, a tumbler, a negative supporting frame movable toward and away from said tumbler, a power shaft, a clutch element thereon, a driven shaft, a clutch element thereon having a circumferential cam groove, said clutch spring urged toward said first mentioned clutch element for clutching engagement therewith, a solenoid having a plunger adapted for engagement with and disengagement from the groove for withdrawing and releasing said clutch, a second driven shaft parallel with said first driven shaft in geared connection therewith, concentric disks keyed to said second driven shaft, links mounted upon said disk for oscillation thereby, a disk keyed to said second shaft having diametrically related peripheral radial projections, an independently pivoted spring retractable lever engageable by said projections and oscillatable thereby, a slide member connected with said lever and adapted to hold said solenoid plunger in disengaged position during rotation of said disk at points between the projections, and means for coupling said frame to said links, whereby said frame may be urged toward said tumbler, and retracted therefrom.

48. A negative plate holder and adjusting device, comprising a base frame, a second frame slidable upon the front thereof in one direction, means for micrometrically adjusting said frame including a handle accessible from the rear of the first mentioned frame, a third frame slidable upon said second frame in one direction and at right angles to the second frame, means for obtaining micrometric adjustment of said third frame including a handle accessible from the rear of the first mentioned frame, a tubular negative supporting member rotatably mounted in the third frame and projecting forwardly from the same, having negative attaching means thereon, means for rotating said tubular negative supporting member including a shaft rotatable on said second frame, having a worm engageable with the tubular member for adjustment of the same in micrometric degree, said shaft accessible from the rear of said first mentioned frame.

49. In a machine of the class described, a tumbler, a frame movable toward and away from the tumbler, power means for translating the frame forwardly and rearwardly from a predetermined point, a second power means for translating the frame beyond the predetermined point and between the point and said tumbler in reverse directions and in micrometric degree, mechanism for coupling the movable frame to the second frame translating means when the frame is at the point, alignment indicating mechanism for visually indicating the coupling position of frame and coupler elements, and means for adjusting the relation between the coupler mechanism and the alignment indicating mechanism whereby coordinating adjustment may be obtained in a preliminary setting of the machine.

50. In a device of the class described, a tumbler, a frame translatable towards and away from the tumbler, having a negative thereon, means for translating the frame from a given point toward and away from the tumbler and for engaging the negative with the face of the tumbler, mechanism for coupling the frame to and uncoupling from the said translating mechanism at the point, including gearing, and an actuating shaft for said coupling mechanism rotatable in reverse directions respectively to couple and uncouple the mechanism, means for positionally and visually recording the coupling position of said frame at the point, including a terminal lever and roller thereon, an independently mounted stationary member having an inclined surface engageable by said roller for raising the lever, a second lever connected with said indicating means, a link connecting the said first and second levers, an adjustable link for connecting said coupler operating shaft and said indicator operating lever and adjustably engaged with said second lever whereby coordinating adjustment may be obtained in the preliminary setting between the position recording means and the coupler mechanism.

51. In a device of the class described, an electrically controlled timing mechanism, comprising a rotatable timer shaft, a timer arm attached thereto, having yieldable contact rings concentrically mounted relative to the axis of the shaft and insulated from one another, and adapted for connection with conducting elements, adjustable contact carrying elements slidable upon said rings, each having a pair of contacts engageable by corresponding timer arm contacts, adapting one of the rings to be successively, independently electrically connected by respective elements with each of the other rings, a worm gear at the opposite end of the shaft, a driven shaft, a second worm cooperable with said first worm, having clutch teeth thereon and mounted for rotation upon the driven shaft, a second clutch member splined to said driven shaft and adapted to cooperate with the first mentioned clutch member for obtaining rotation of the driven shaft, a disk upon said first worm having a projection, said disk adapted for limited independent movement in respect to the worm, a ratchet member attached to said disk, means for limiting the rotation of the disk upon the worm, a pawl swingably mounted and engageable with said ratchet for moving the same in limited degree from one of its positional limits, a solenoid having an armature connected with said pawl for rotating the disk to move the projection from an initial position, an independently pivoted lever adapted to move said second clutch member and adapted for engagement with said projection for normally holding said clutch member disengaged, whereby, when said pawl is advanced by energization of the solenoid, said driven shaft is clutched for rotation to the timer shaft. a motor speed change mechanism comprising two units, each having a terminal clutch element, said mechanism adapted for obtaining varying speeds of rotation of the timer shaft, including a clutch element, slidable upon the adjacent ends of shafts respectively of the units, and in intermediate position relative to the speed change units, said clutch having teeth at opposite ends alternately engageable with terminal clutch elements of respective speed change units and spring pressed towards one of said clutch elements, said intermediate clutch elements forming an armature, a solenoid surrounding the armature for translating the armature clutch against spring action for engagement of the clutch with a terminal clutch element of one of the speed change units, said clutch being restored to original clutch position upon deenergization of the solenoid.

52. In a device of the class described, an electrically controlled timing mechanism, comprising a rotatable timer shaft, a timer arm attached thereto, having yieldable contact rings concentrically mounted relative to the axis of the shaft and insulated from one another, and adapted for connection with conducting elements, adjustable contact carrying elements slidable upon said rings, each having a pair of contacts engageable by corresponding timer arm contacts, adapting one of the rings to be successively, independently electrically connected by respective elements with each of the other rings, a worm gear at the opposite end of the shaft, a driven shaft and a second worm cooperable with said first worm, having clutch teeth thereon and mounted for rotation upon the driven shaft, a second clutch member splined to said driven shaft and adapted to cooperate with the first mentioned clutch member for obtaining rotation of the driven shaft, a disk upon said first worm having a projection, said disk adapted for limited independent movement in respect to the worm, a ratchet member attached to said disk, means for limiting the rotation of the disk upon the worm, a pawl swingably mounted and engageable with said ratchet for moving the same in limited degree from one of its positional limits, a solenoid having an armature connected with said pawl for rotating the disk to move the projection from an initial position, an independently pivoted lever adapted to move said second clutch member and adapted for engagement with said projection for holding said clutch member disengaged, whereby, when said pawl is advanced by deenergization of the solenoid, said driven shaft is clutched for rotation to the timer shaft.

53. In a device of the class described, a speed change mechanism comprising two units, each having a terminal clutch element, said mechanism adapted for obtaining varying speeds of rotation of the timer shaft, including a clutch element, slidable upon the adjacent ends of shafts of respective units, and in intermediate position relative to the speed change units, said clutch having teeth at opposite ends alternately engageable with terminal clutch elements of respective units, and spring pressed towards one of said clutch elements, said intermediate clutch elements forming an armature, a coil magnet surrounding the armature for translating the armature clutch against spring action, when energized for engagement of the clutch with a terminal element of the other speed change unit, said clutch being restored to original clutch position upon deenergization of the solenoid.

54. In a device of the class described, a first shaft, a gear rotatable thereon and independently rotatably supported, said gear having clutch teeth thereon, an armature-clutch element splined to said shaft, having clutch teeth at opposite ends and normally urged to clutch engagement with said gear, a second shaft coaxial with said first shaft, having one end engaged within the clutch bore as a guide therefor, a gear rotative with said second shaft, having clutch teeth engageable by said armature-clutch when said magnet is energized, and gearing transmittably connecting said first and second clutch gears, whereby in one position of the clutch one of the shafts is in transmission connection with the other through the gearing for obtaining one speed change, and whereby in another position of the clutch, both shafts are directly coupled for rotation in unison to obtain another speed change.

In witness whereof, I hereunto subscribe my name.

OSCAR FOURNIER.